United States Patent
Zhou et al.

(10) Patent No.: US 11,477,792 B2
(45) Date of Patent: Oct. 18, 2022

(54) COMMUNICATION AND DATA PROCESSING IN WIRELESS COMMUNICATIONS

(71) Applicant: Comcast Cable Communications, LLC, Philadelphia, PA (US)

(72) Inventors: Hua Zhou, Herndon, VA (US); Esmael Dinan, McLean, VA (US); Alireza Babaei, Fairfax, VA (US); Ali Cirik, Herndon, VA (US); Hyoungsuk Jeon, Centreville, VA (US); Yunjung Yi, Vienna, VA (US); Youngwoo Kwak, Vienna, VA (US); Kai Xu, Herndon, VA (US); Kyungmin Park, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 159 days.

(21) Appl. No.: 16/936,046

(22) Filed: Jul. 22, 2020

(65) Prior Publication Data

US 2021/0029719 A1    Jan. 28, 2021

Related U.S. Application Data

(63) Continuation of application No. 16/935,648, filed on Jul. 22, 2020.
(Continued)

(51) Int. Cl.
*H04W 72/04* (2009.01)
*H04L 1/18* (2006.01)
(Continued)

(52) U.S. Cl.
CPC ....... *H04W 72/0493* (2013.01); *H04L 1/1819* (2013.01); *H04L 1/1874* (2013.01);
(Continued)

(58) Field of Classification Search
CPC ........... H04W 72/0493; H04W 72/042; H04W 72/10; H04W 72/1263; H04L 1/1819;
(Continued)

(56) References Cited

U.S. PATENT DOCUMENTS

2018/0279353 A1* 9/2018 Shaheen ........... H04W 72/1284
2018/0338307 A1* 11/2018 Feng .................... H04L 5/0064
(Continued)

FOREIGN PATENT DOCUMENTS

| WO | 2018204491 A1 | 11/2018 |
|---|---|---|
| WO | 2018228487 A1 | 12/2018 |
| WO | 2019031850 A1 | 2/2019 |

OTHER PUBLICATIONS

R1-1905833 3GPP TSG-RAN WG1 Meeting #96bis, Xi'an, China, Apr. 8-12, 2019, Source: Qualcomm Incorporated, Title: Summary of Enhancements to Scheduling/HARQ.
(Continued)

*Primary Examiner* — Kiet Tang
(74) *Attorney, Agent, or Firm* — Banner & Witcoff, Ltd.

(57) ABSTRACT

Wireless communications may be used to support data processing. Data processing may be performed based on a priority indication (or lack thereof) in a message for processing data. At least one parameter may be used to determine a priority associated with data processing if a message does not comprise a priority indication.

21 Claims, 41 Drawing Sheets

Related U.S. Application Data

(60) Provisional application No. 62/877,038, filed on Jul. 22, 2019.

(51) Int. Cl.
*H04L 5/00* (2006.01)
*H04W 72/12* (2009.01)
*H04W 72/10* (2009.01)

(52) U.S. Cl.
CPC ......... *H04L 5/0055* (2013.01); *H04W 72/042* (2013.01); *H04W 72/10* (2013.01); *H04W 72/1263* (2013.01)

(58) Field of Classification Search
CPC ... H04L 1/1874; H04L 5/0055; H04L 1/1822; H04L 1/1854; H04L 5/0042; H04L 5/0044; H04L 5/0053; H04L 5/0064; H04L 5/0094; H04L 5/0007
See application file for complete search history.

(56) References Cited

U.S. PATENT DOCUMENTS

| | | | |
|---|---|---|---|
| 2019/0246378 | A1 | 8/2019 | Islam et al. |
| 2020/0015250 | A1 | 1/2020 | Yang et al. |
| 2020/0037314 | A1* | 1/2020 | Xiong .................. H04L 5/0091 |
| 2020/0053748 | A1 | 2/2020 | Hosseini et al. |
| 2020/0053820 | A1* | 2/2020 | Chin ................. H04W 72/1242 |
| 2020/0092068 | A1 | 3/2020 | Yang et al. |
| 2020/0351903 | A1 | 11/2020 | Sarkis et al. |
| 2021/0014883 | A1 | 1/2021 | Khoshnevisan et al. |

OTHER PUBLICATIONS

R1-1808224 3GPP TSG RAN WG1 Meeting #94, Gothenburg, Sweden, Aug. 20-24, 2018, Source: vivo, Title: Remaining issues on PDCCH.
R1-1810486 3GPP TSG RAN WG1 Meeting #94bis, Chengdu, China, Oct. 8-12, 2018, Source: Fraunhofer HHI, Fraunhofer IIS, Title: Scheduling/HARQ Processing Timeline Enhancements for NR URLLC.
R1-1810660 3GPP TSG RAN WG1 Meeting #94bis, Chengdu, China, Oct. 8-12, 2018, Source: Nokia, Nokia Shanghai Bell, Title: On the L1 enhancements for NR URLLC.
R1-1810670 3GPP TSG RAN WG1 Meeting #94bis, Chengdu, China, Oct. 8-12, 2018, Source: Nokia, Nokia Shanghai Bell, Title: Enhancements to scheduling/HARQ/CSI processing timeline for NR URLLC.
R1-1810879 3GPP Tsg Ran WG1 Meeting #94bis, Chengdu, China, Oct. 8 - 12, 2018, Source: Samsung, Title: Layer 1 enhancements for URLLC.
R1-1811378 3GPP TSG RAN WG1 Meeting #94bis, Chengdu, China, Oct. 8-12, 2018, Source: NTT DOCOMO, Inc., Title: Layer 1 enhancements for NR URLLC.
R1-1811391 3GPP TSG RAN WG1 Meeting #94bis, Chengdu, China, Oct. 8-12, 2018, Source: Institute for Information Industry (III), Title: HARQ-ACK feedback enhancement for URLLC.
R1-1811522 3GPP TSG RAN WG1 Meeting #94bis, Chengdu, China, Oct. 8-12, 2018, Source: CAICT, Title: L1 enhancements to support URLLC.
R2-1816064 3GPP TSG RAN WG1 Meeting #94bis, Chengdu, China, Oct. 8-12, 2018, Source: RAN2, Title: LS on the search space of cross-carrier scheduling.
R1-1812885 3GPP TSG RAN WG1 Meeting #95, Spokane, USA, Nov. 12-16, 2018, Source: CMCC, China Southern Power Grid, Title: Discussion on out-of-order scheduling and HARQ.
R1-1813952 3GPP TSG RAN WG1 Meeting #95, Spokane, USA, Nov. 12-16, 2018, Source: RAN2, Title: Reply LS on MIMO layer configuration.
R1-1814117 3GPP TSG RAN WG1 Meeting #95, Spokane, USA, Nov. 12-16, 2018, Source: NTT DOCOMO, Inc., Title: On search space configuration for cross-carrier scheduling.
R1-1903535 3GPP TSG-RAN WG1 #96, Athens, Greece, Feb. 25-Mar. 1, 2019, Source: Nokia, Nokia Shanghai Bell, Title: Summary of Wednesday offline discussion on UL/DL intra-UE prioritization/multiplexing.
R1-1904237 3GPP TSG-RAN WG1 Meeting #96bis, Xi'an, China, Apr. 8-12, 2019, Source: Sony, Title: Intra-UE multiplexing/prioritisation under Out-of-Order Scheduling.
R1-1905683 3GPP TSG-RAN WG1 Meeting #96bis, Xi'an, China, Apr. 8-12, 2019, Title: Offline Note on Monday for M-TRP.
R1-1905915 3GPP TSG-RAN WG1 Meeting #96bis, Xi'an, China, Apr. 8-12, 2019, Source: Ericsson, Title: Summary of email discussion [96b-NR-11].
R1-1906060 3GPP TSG RAN WG1 Meeting #97, Reno, USA, May 13-17, 2019, Source: Huawei, HiSilicon, Title: Enhancements to scheduling/HARQ.
R1-1906094 3GPP TSG RAN WG1 Meeting #97, Reno, USA, May 13-17, 2019, Source: Ericsson, Title: Scheduling/HARQ Enhancements for NR URLLC.
R1-1906149 3GPP TSG RAN WG1 Meeting #97, Reno, USA, May 13-17, 2019, Source: vivo, Title: Enhancement for Scheduling/HARQ.
R1-1906214 3GPP TSG RAN WG1 Meeting #97, Reno, USA, May 13-17, 2019, Source: NTT DOCOMO, Inc., Title: Enhancements to scheduling/HARQ for URLLC.
R1-1906330 3GPP TSG RAN WG1 Meeting #97, Reno, USA, May 13-17, 2019, Source: CATT, Title: Discussion on out-of-order scheduling/HARQ.
R1-1906380 3GPP TSG RAN WG1 Meeting #97, Reno, USA, May 13-17, 2019, Source: Spreadtrum Communications, Title: Discussion on enhancements to scheduling and HARQ for URLLC.
R1-1906412 3GPP TSG RAN WG1 Meeting #97, Reno, USA, May 13-17, 2019, Source: ZTE, Title: On scheduling/HARQ enhancements for NR URLLC.
R1-1906519 3GPP TSG RAN WG1 Meeting #97, Reno, USA, May 13-17, 2019, Source: CMCC, China Southern Power Grid, Title: Discussion on enhancements on scheduling and HARQ.
R1-1906568 3GPP TSG RAN WG1 Meeting #97, Reno, USA, May 13-17, 2019, Source: MediaTek Inc., Title: Enhancements to eURLLC scheduling/HARQ.
R1-1906667 3GPP TSG RAN WG1 Meeting #97, Reno, USA, May 13-17, 2019, Source: LG Electronics, Title: Enhancements to scheduling/HARQ for NR URLLC.
R1-1906754 3GPP TSG RAN WG1 Meeting #97, Reno, USA, May 13-17, 2019, Source: Nokia, Nokia Shanghai Bell, Title: Discussion on enhancements to scheduling/HARQ for NR URLLC.
R1-1906809 3GPP TSG RAN WG1 Meeting #97, Reno, USA, May 13-17, 2019, Source: Intel Corporation, Title: On scheduling/HARQ enhancements for eURLLC.
R1-1906843 3GPP TSG RAN WG1 Meeting #97, Reno, USA, May 13-17, 2019, Source: Sony, Title: Considerations in scheduling enhancements for eURLLC.
R1-1906867 3GPP TSG RAN WG1 Meeting #97, Reno, USA, May 13-17, 2019, Source: Panasonic, Title: Discussion on scheduling/HARQ enhancement for URLLC.
R1-1906958 3GPP TSG RAN WG1 Meeting #97, Reno, USA, May 13-17, 2019, Source: Samsung, Title: On enhancements to scheduling/HARQ for eURLLC.
R1-1907195 3GPP TSG RAN WG1 Meeting #97, Reno, USA, May 13-17, 2019, Source: InterDigital Inc., Title: Enhancements to Scheduling/HARQ for eURLLC.
R1-1907222 3GPP TSG RAN WG1 Meeting #97, Reno, USA, May 13-17, 2019, Source: Sharp, Title: Discussion on enhancements to scheduling/HARQ.
R1-1907284 3GPP TSG RAN WG1 Meeting #97, Reno, USA, May 13-17, 2019, Source: Qualcomm Incorporated, Title: Enhancements to Scheduling and HARQ for eURLLC.
R1-1907350 3GPP TSG RAN WG1 Meeting #97, Reno, USA, May 13-17, 2019, Source: Institute for Information Industry (III), Title: Discussion on out-of-order scheduling/HARQ.

(56) References Cited

OTHER PUBLICATIONS

R1-190abcd 3GPP TSG-RAN WG1 Meeting #96bis, Xi'an, China, Apr. 8-12, 2019, Source: Huawei, HiSilicon, Title: Summary of AI: 7.2.8.2 Enhancements on Multi-TRP/Panel Transmission of Offline Discussion.
QUALCOMM Incorporated:" Multi-TRP Enhancements" 3GPP Draft; RI-1907289 Multi-TRP Enhancements, 3rd Generation Partnership Project (3GPP), Mobile Competence Centre. 650, Route Des Lucioles; F-06921 Sophia-Antipolis Cedex; France.
Intel Corporation: "On mult-TRP/multi-panel transmission", 3GPP Draft; R1-1904313_MULTITRP, 3rd Generation Partnership Project (3GPP), Mobile Competence Centre ; 650, Route Des Lucioles ; F-06921 SophiaAntipolis Cedex; France, vol. RAN WG1, No. Xi'an, China; Apr. 8, 2019-Apr. 12, 2019 Apr. 7, 2019 (2Apr. 7, 2019), XP051699615, Retrieved from the Internet: URL:http://www.3gpp.org/ftp/Meetings%5F3GPP%5FSYNC/RAN 1 / Docs/R 1 %2 D 1 90431 3%2 Ezi p.
Nov. 20, 2020—EP Search Report—EP 20187170.4.
Dec. 18, 2020—Extended European Search Report—EP 20187137. 3.
R1-1901917 3GPP TSG RAN WG1 Meeting #96, Athens, Greece, Feb. 25-Mar. 1, 2019, Title: "On intra-UE DL/UL prioritization for NR URLLC", Source: Nokia et al., Retrieved from the Internet: URL:http://www.3gpp.org/ftp/tsg%5Fran/WG1%5FRL1/TSGR1%5F96/Docs/R1%2D1901917%2Ezip [retrieved on Feb. 15, 2019].
May 30, 2022—EP Office Action—EP App. No. 20187137.3.

\* cited by examiner

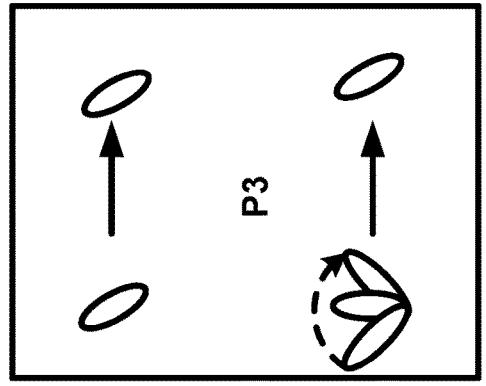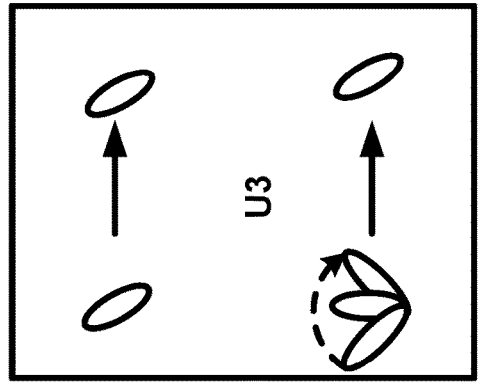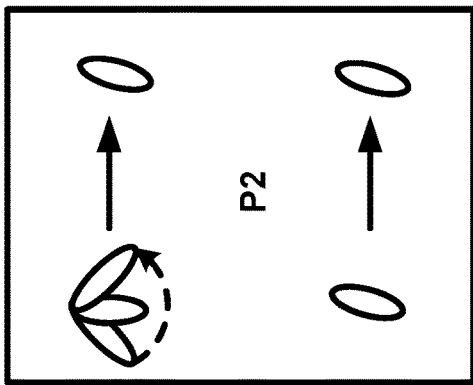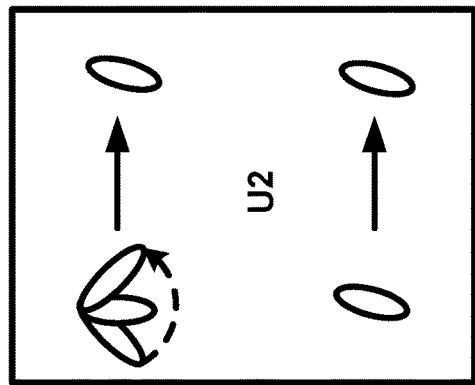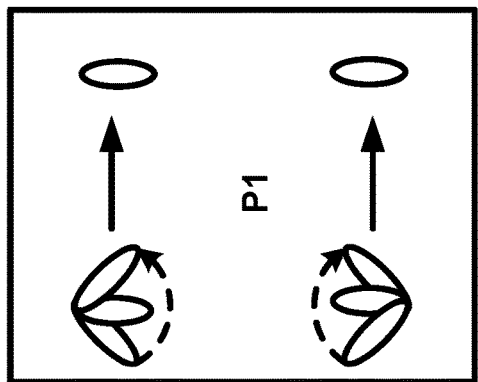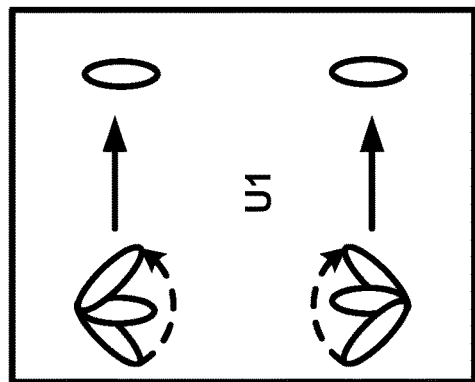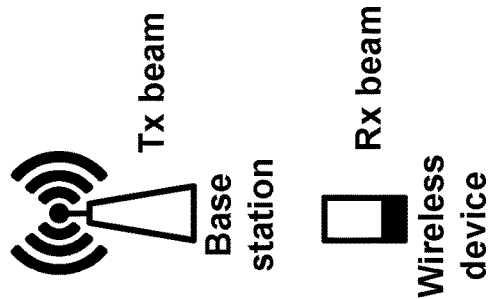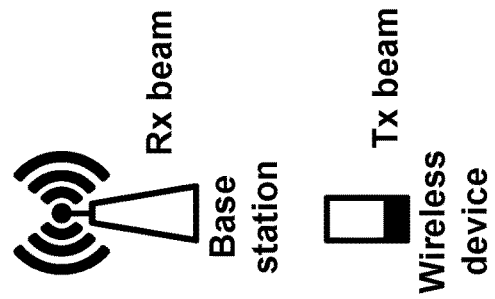
FIG. 12A
FIG. 12B

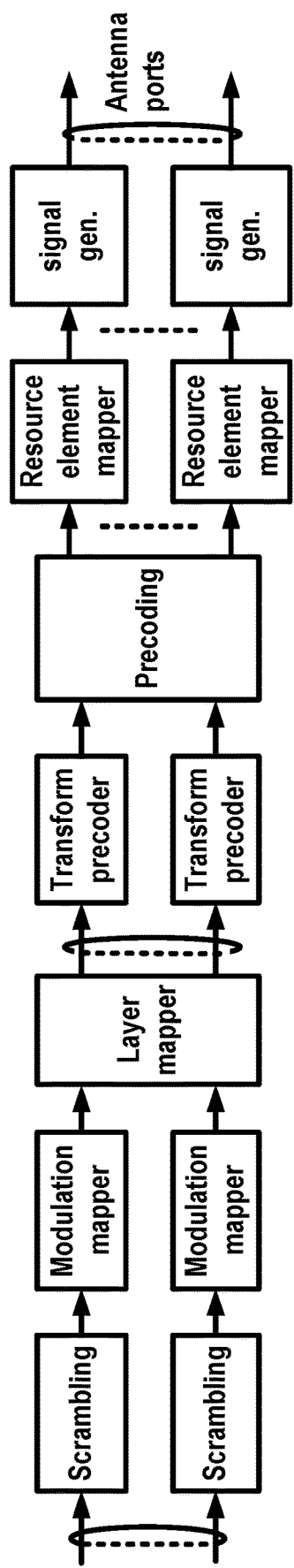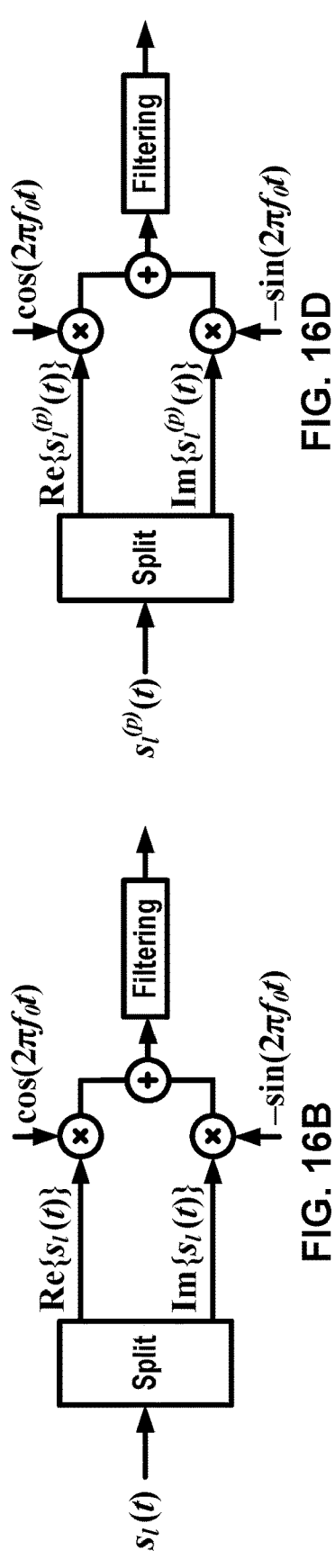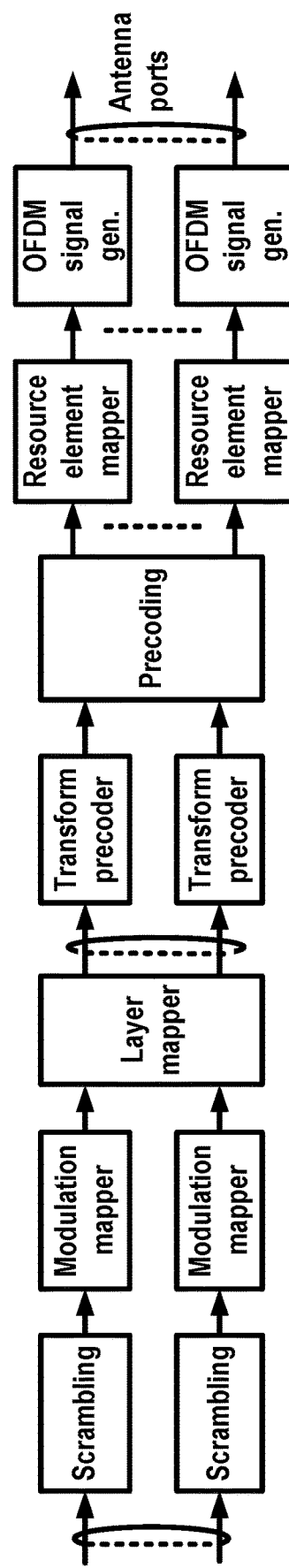
FIG. 16A
FIG. 16B
FIG. 16C
FIG. 16D

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

Receive one or more messages configuring resources (e.g., multiple CORESETs grouped into CORESET groups, multiple TRPs, multiple antenna panels, etc.) 3702

Receive first DCI (e.g., via a first resource group) 3704

Determine whether a wireless device use different resource groups (e.g., different CORESET groups, different TRPs, different antenna panels, etc.) 3706

YES → Receive second DCI (e.g., via a second resource group) 3708

Process a plurality of channels and/or data transmitted via different resource groups 3710

NO → Receive third DCI (e.g., via a same resource group) 3712

Process and drop channels and/or data transmitted via same resource groups 3714

FIG. 37

COMMUNICATION AND DATA PROCESSING IN WIRELESS COMMUNICATIONS

CROSS-REFERENCE TO RELATED APPLICATIONS

This application is a continuation of U.S. application Ser. No. 16/935,648, filed on Jul. 22, 2020, which claims the benefit of U.S. Provisional Application No. 62/877,038, filed on Jul. 22, 2019. Each of the above-referenced applications is hereby incorporated by reference in its entirety.

BACKGROUND

A base station and a wireless device in a communication network establish and use channels for signal transmissions. The wireless device receives downlink channel transmissions, from the base station, to determine uplink transmissions.

SUMMARY

The following summary presents a simplified summary of certain features. The summary is not an extensive overview and is not intended to identify key or critical elements.

Wireless communications may be used to support data processing. A plurality of resources may be indicated for a wireless device to use to communicate and/or process data. At least some data may be indicated to be processed in-order, out-of-order, and/or overlapping with other data. Data may be processed based on groups of the plurality of resources to be used. For example, the plurality of resources to be used may be associated with different resource groups. A wireless device may be capable of processing out-of-order and/or overlapping data transmissions if the wireless device is configured to use different resource groups, whereas a wireless device may not be capable of processing out-of-order and/or overlapping data transmissions if the wireless device is not configured to use different resource groups. Additionally or alternatively, data processing may be performed based on a priority indication (or lack thereof) in a message for processing data. For example, if a message does not comprise, or lacks, a priority indication, a wireless device may not process data associated with the message. Various operations described herein may provide advantages such as improved channel processing efficiencies, improved system throughput, reduced misalignment between a base station and a wireless device, reduced overhead/retransmissions, and/or reduced delay/latency of communication.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 19 shows example LCID values.

FIG. 20 shows example LCID values.

FIG. 37 shows an example of out-of-order processing for multiple TRPs and/or multiple antenna panels.

DETAILED DESCRIPTION

Figure 1A:
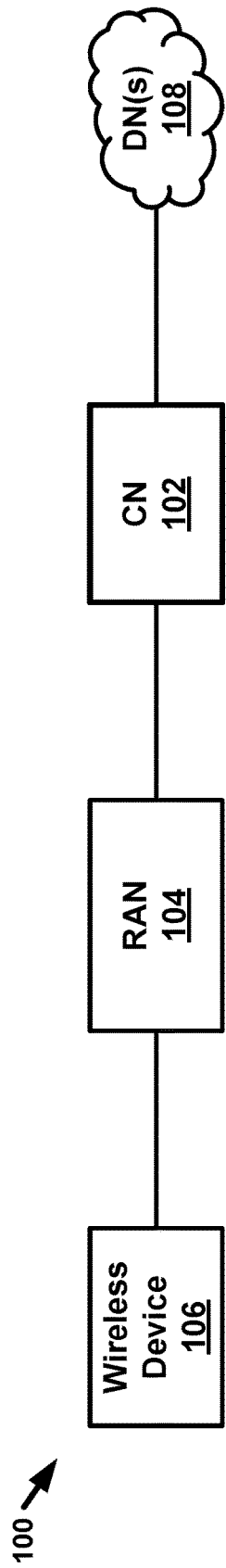
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to processing of downlink channels and uplink channels.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (JAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n)

may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
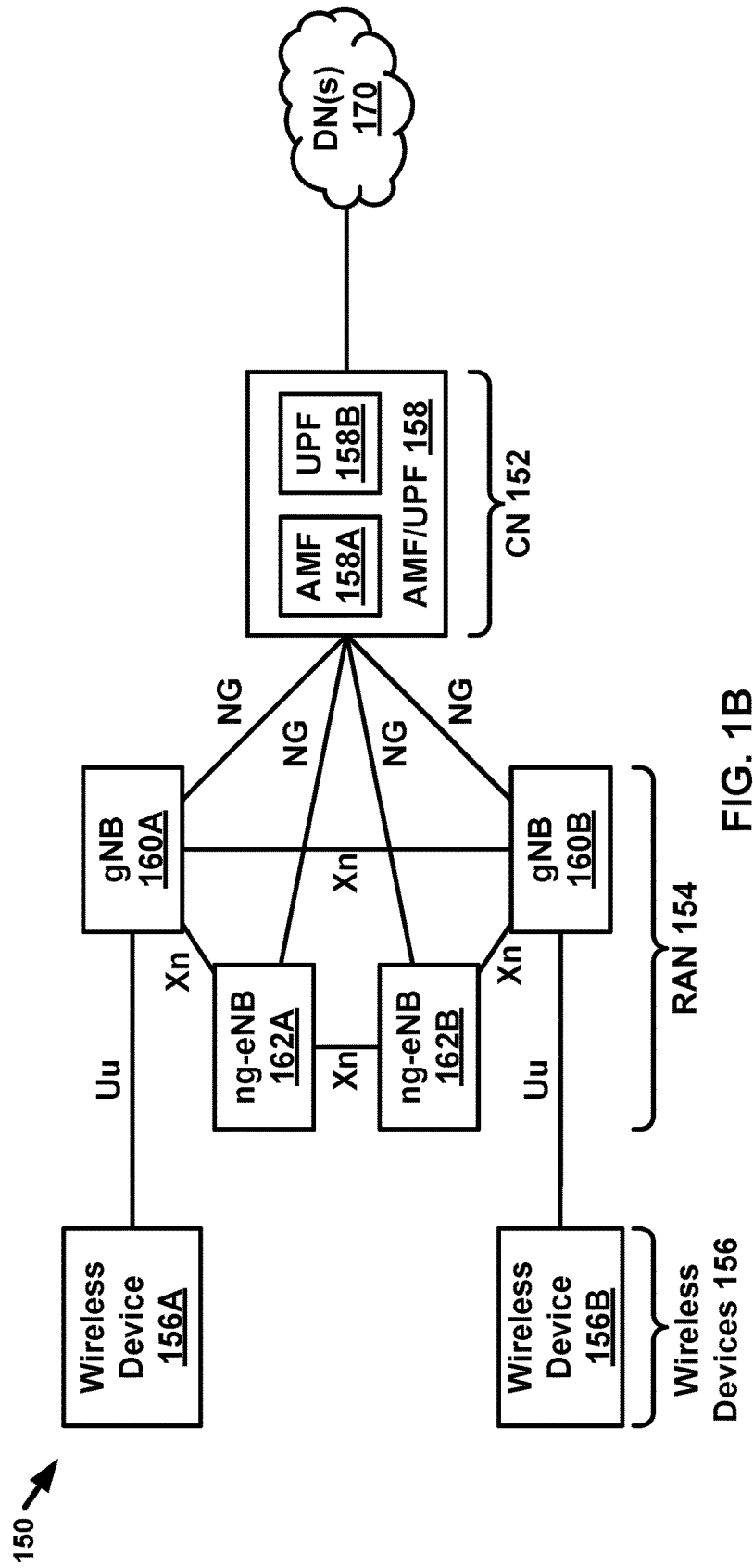

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
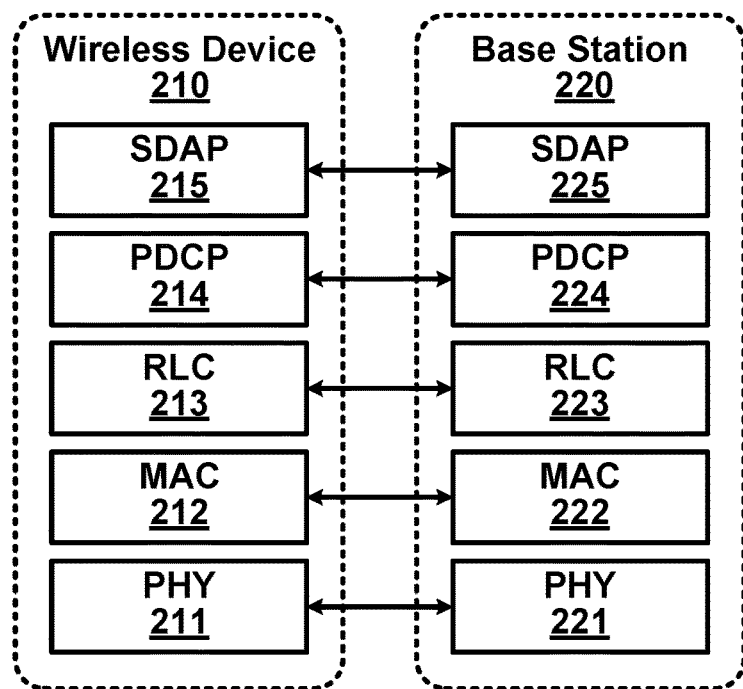
FIG. 2A shows an example user plane.
Figure 2B:
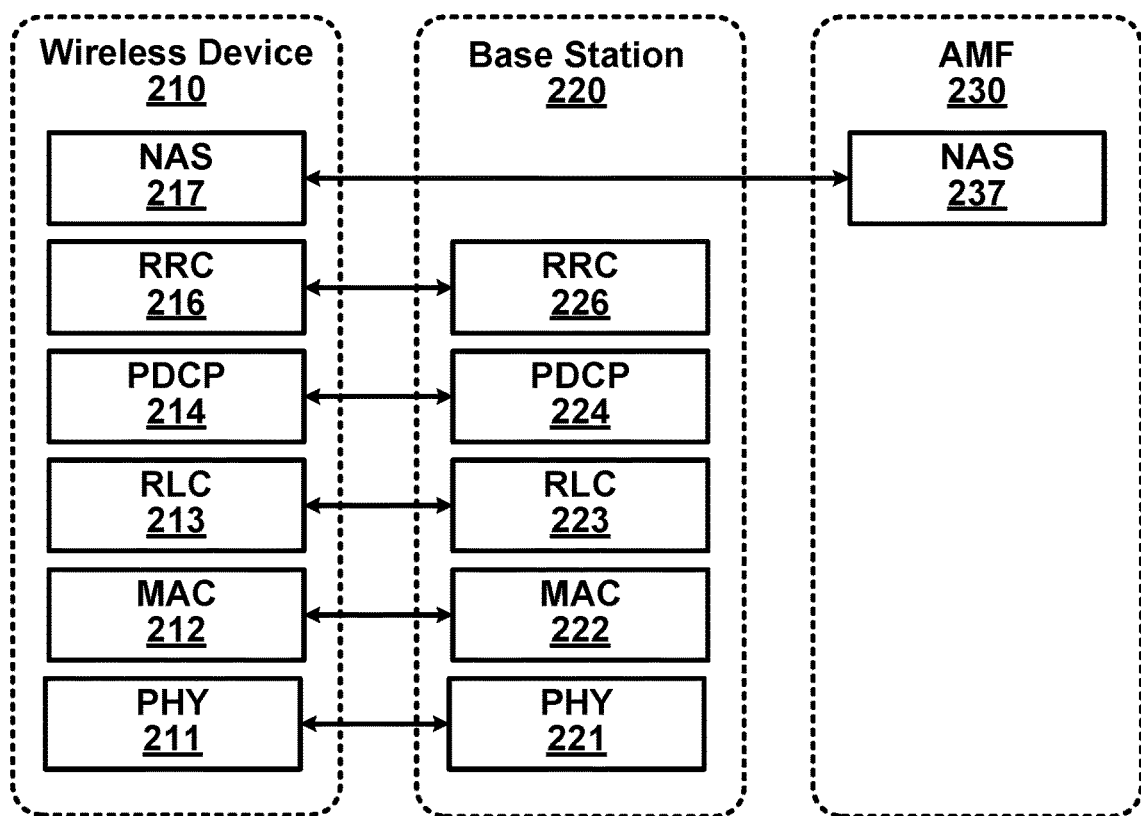
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
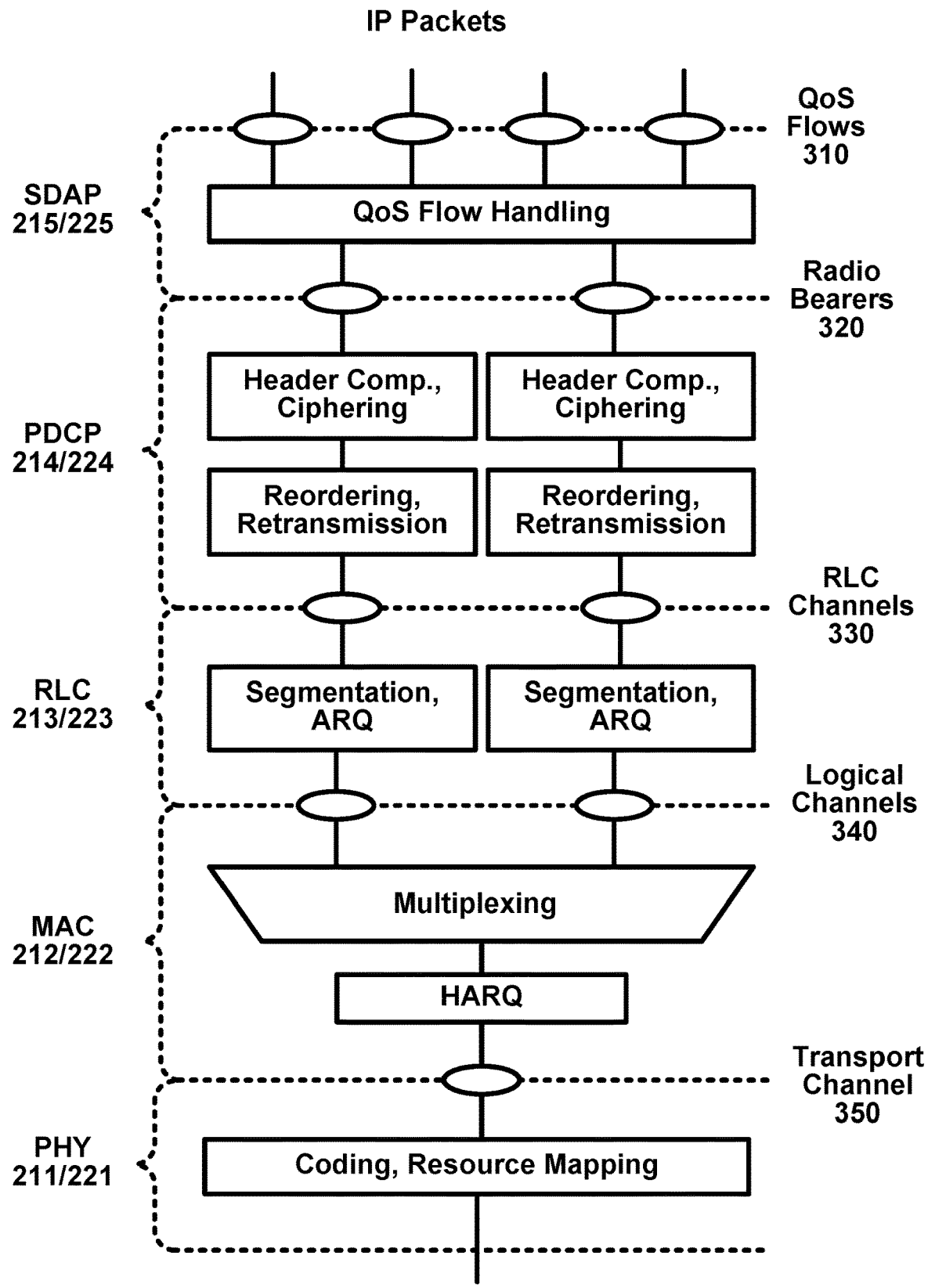
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4:
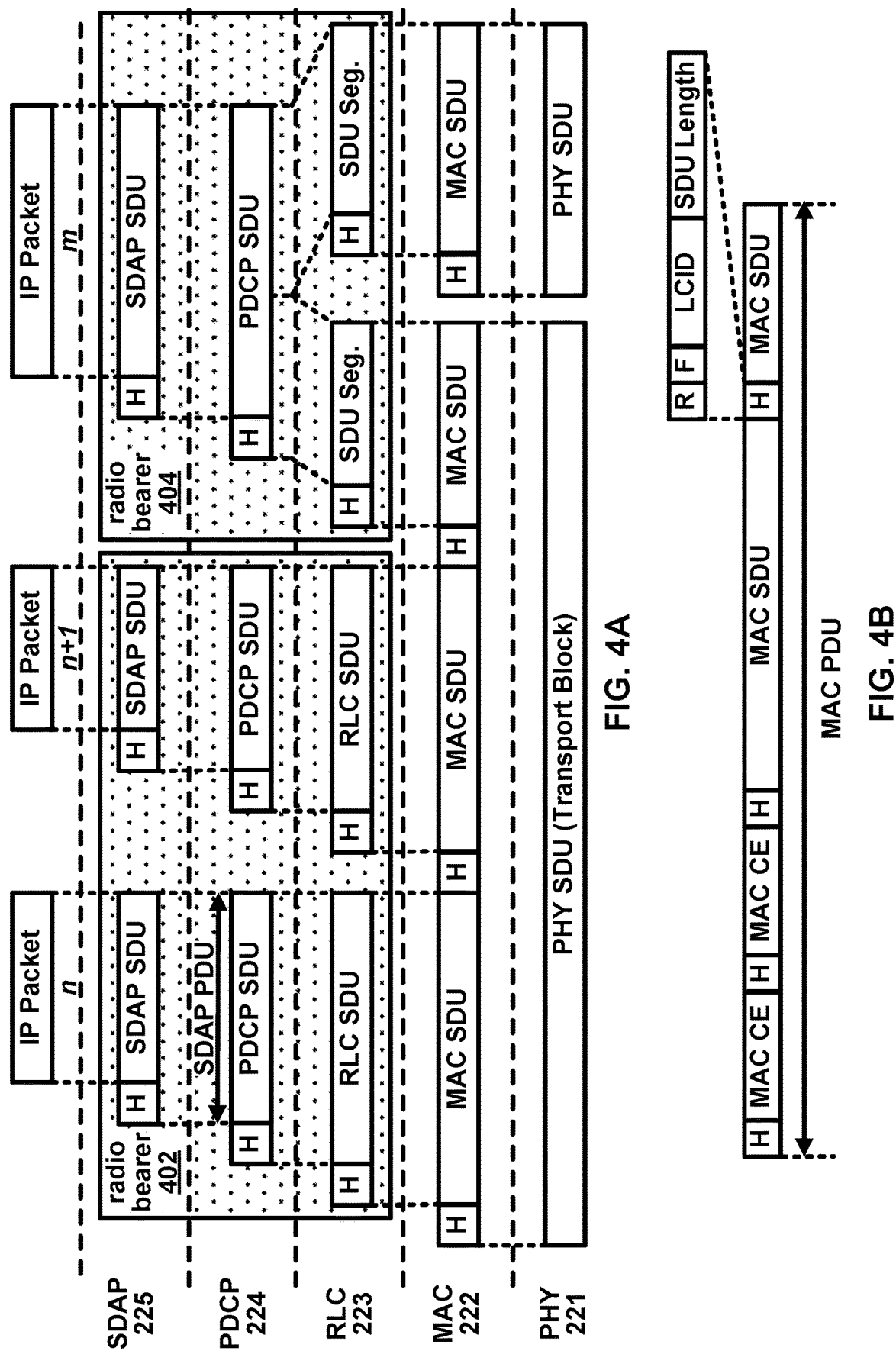
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5:
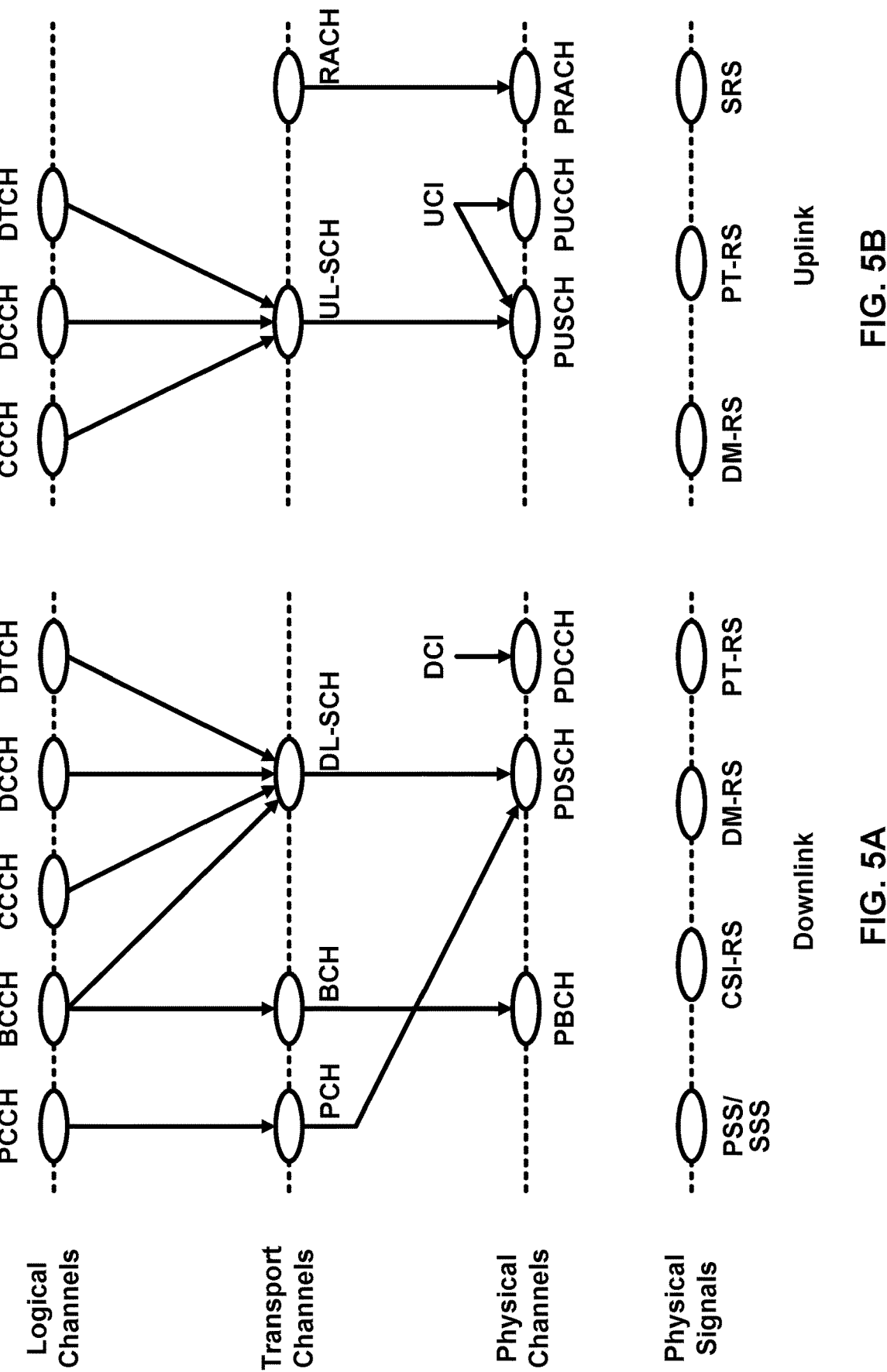
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
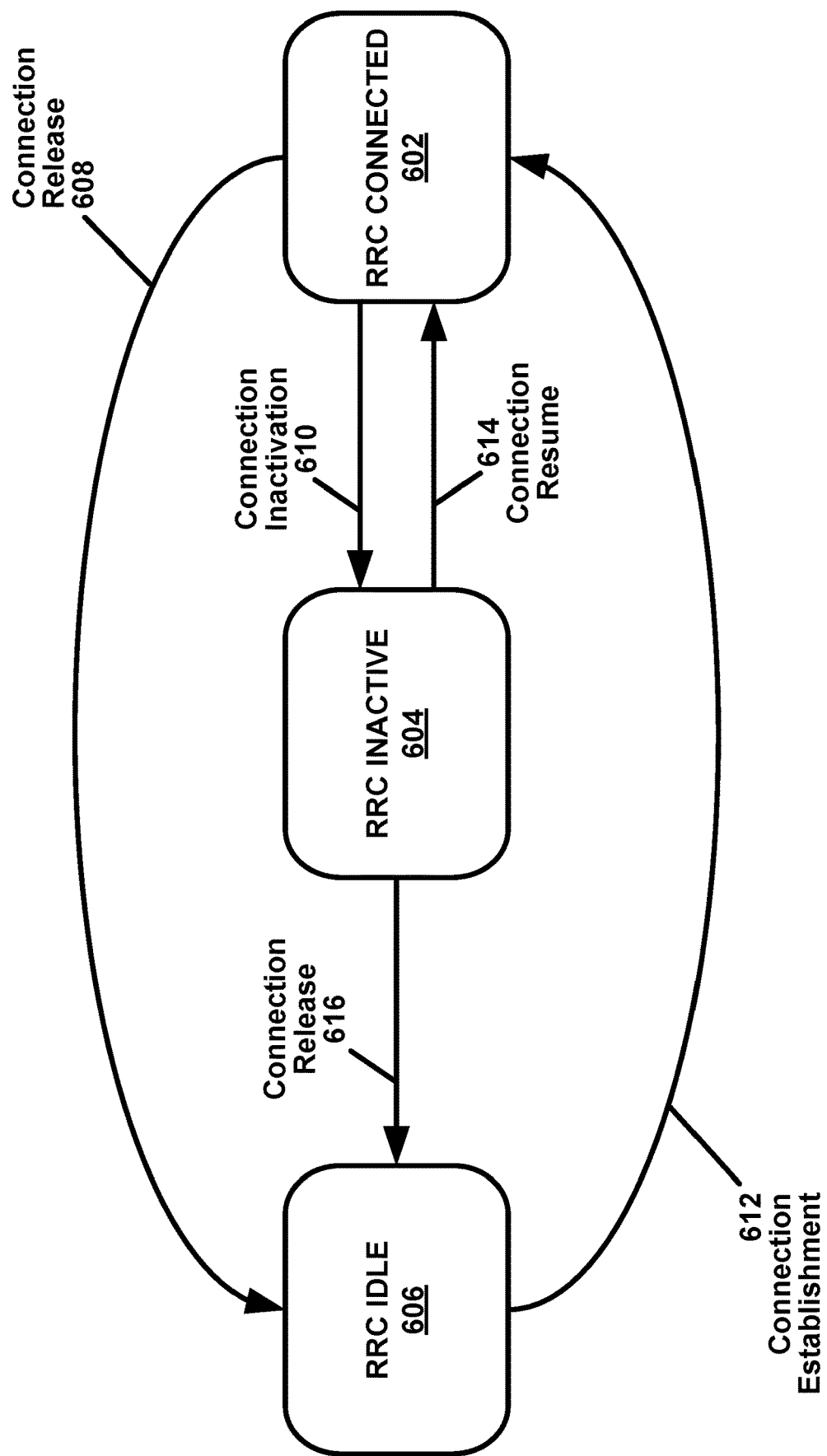
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
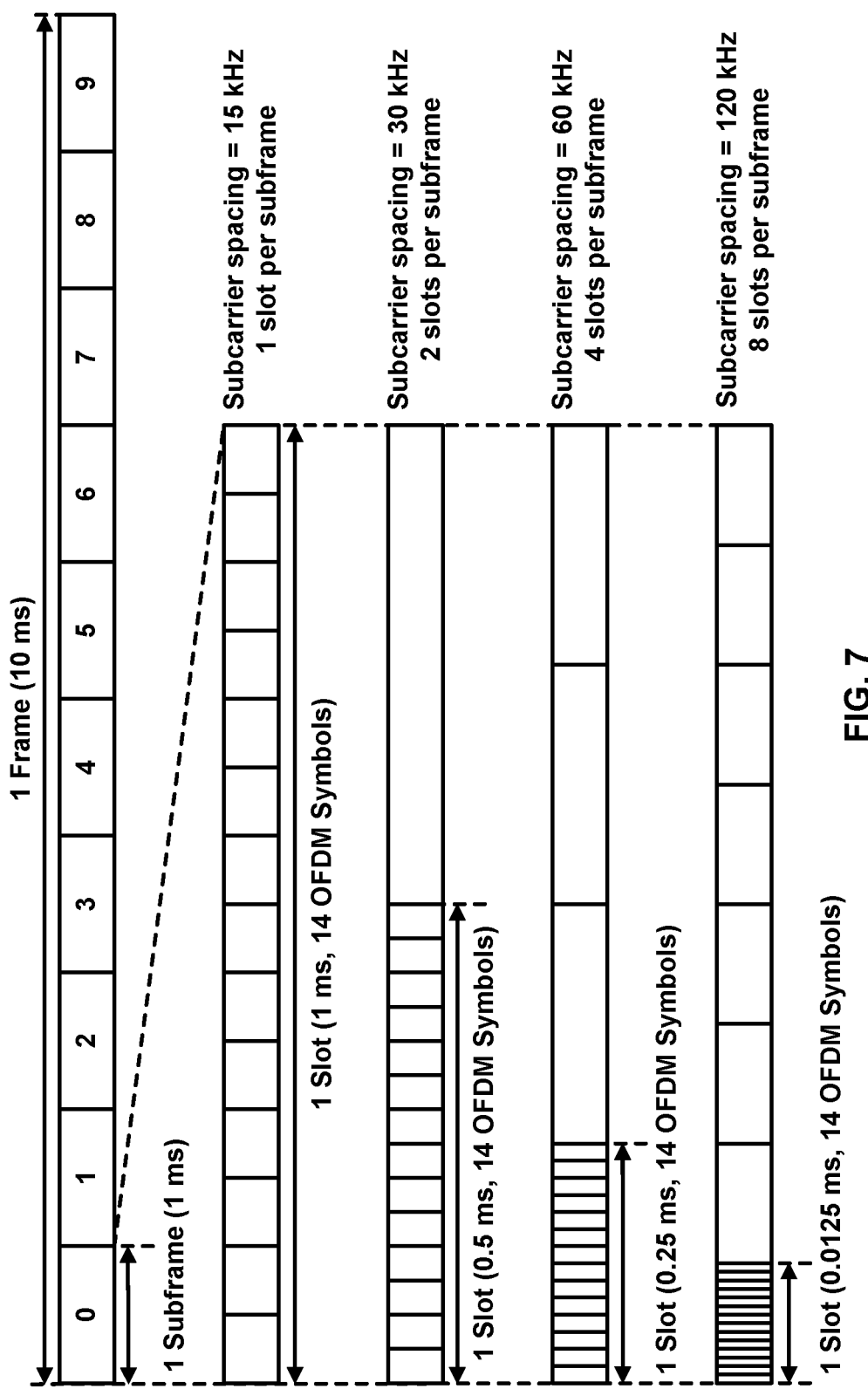
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
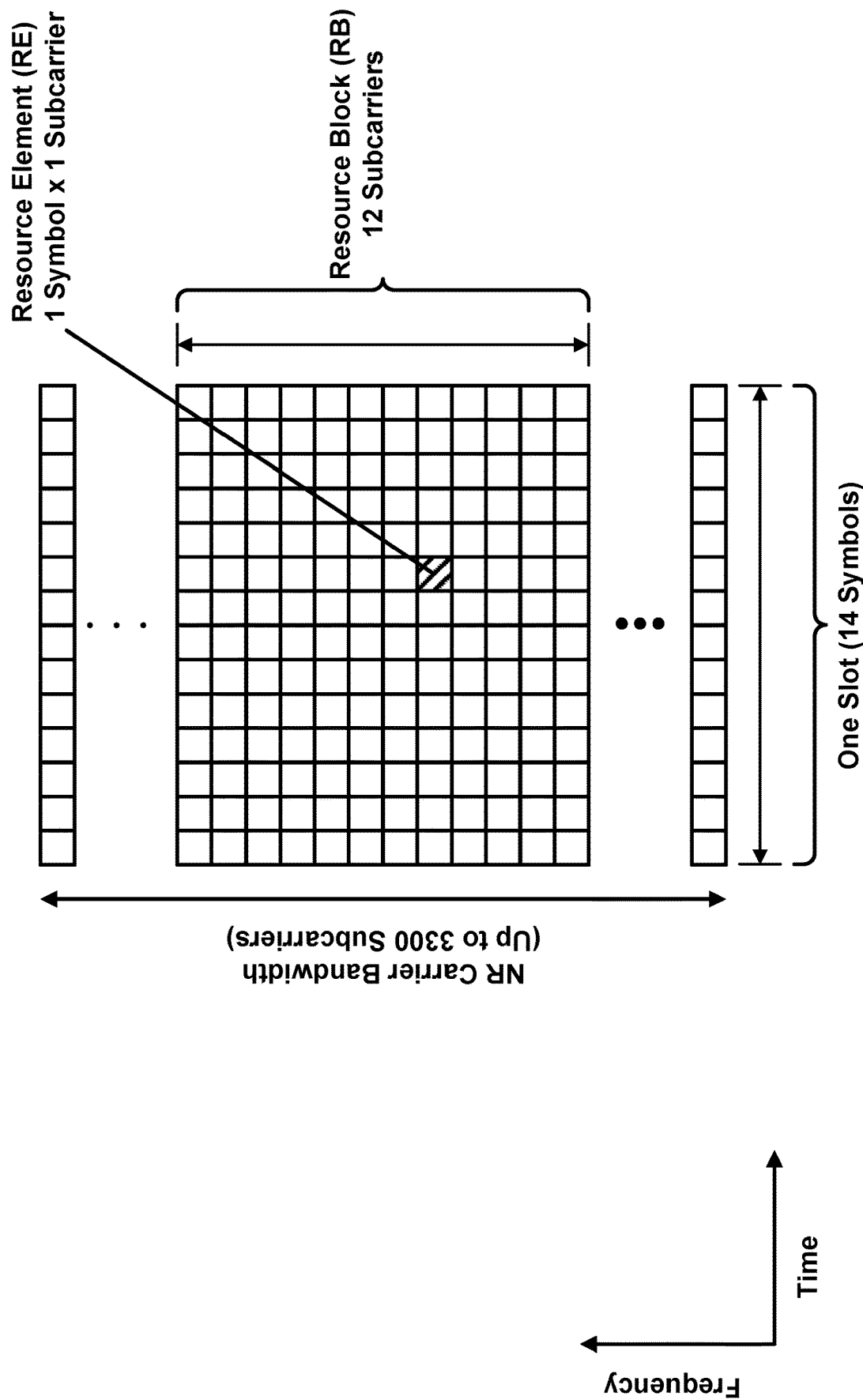
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESTS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
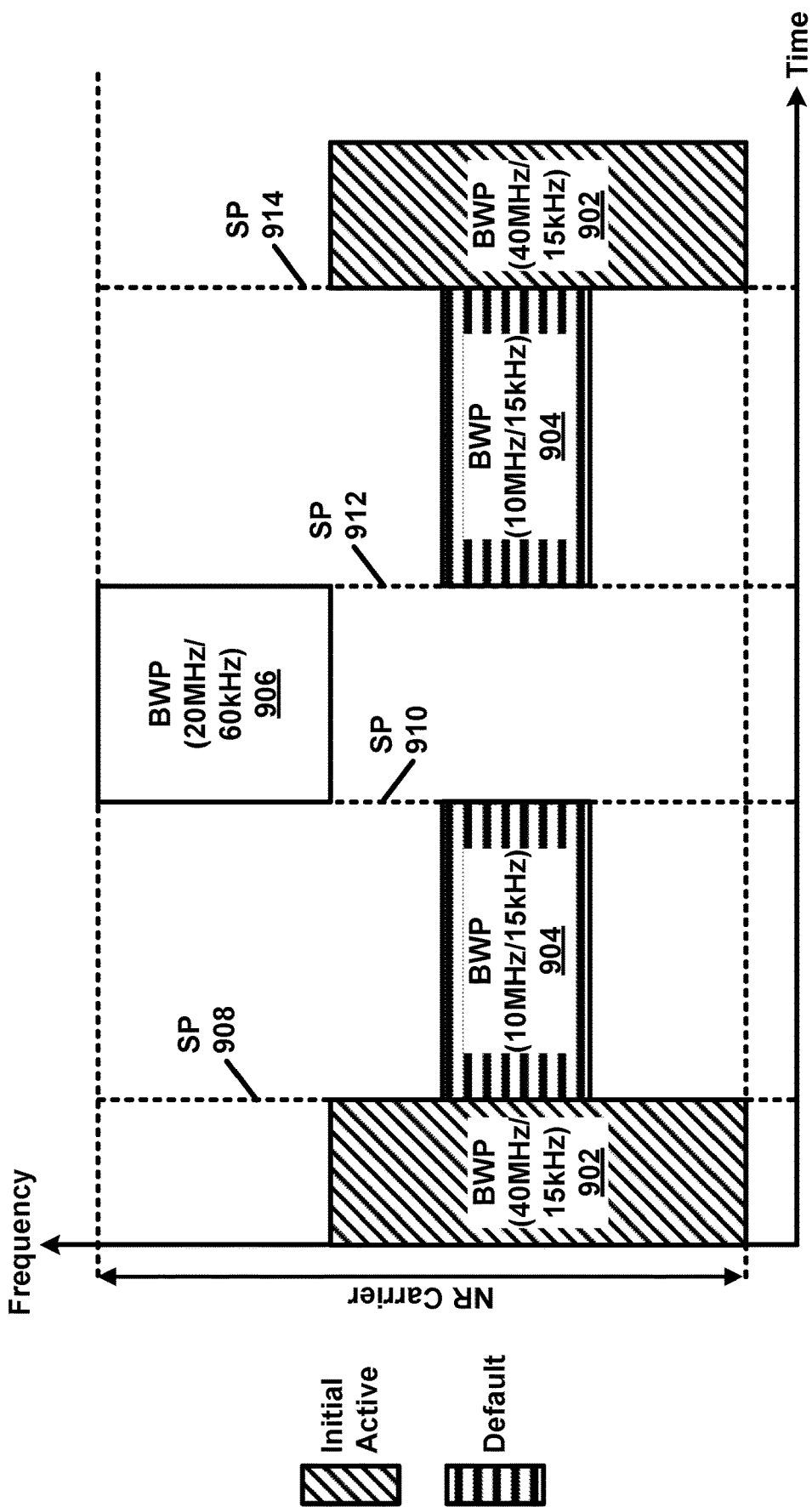
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
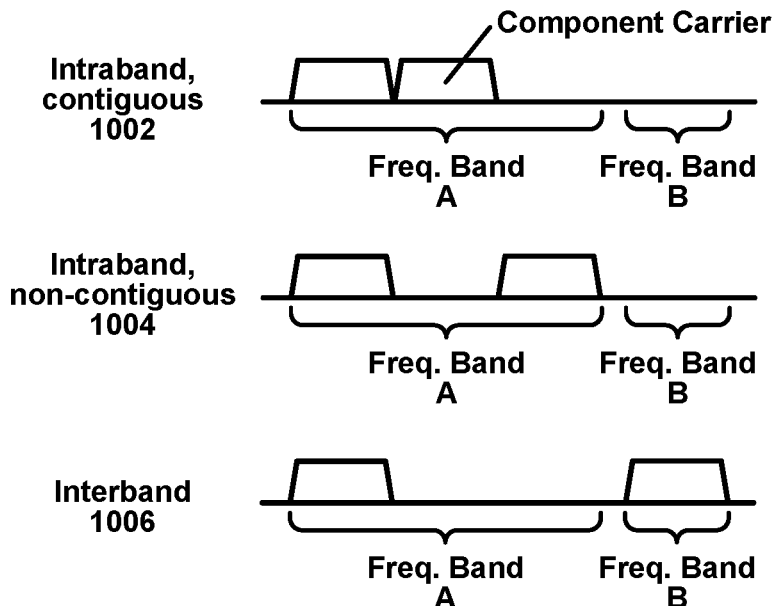
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
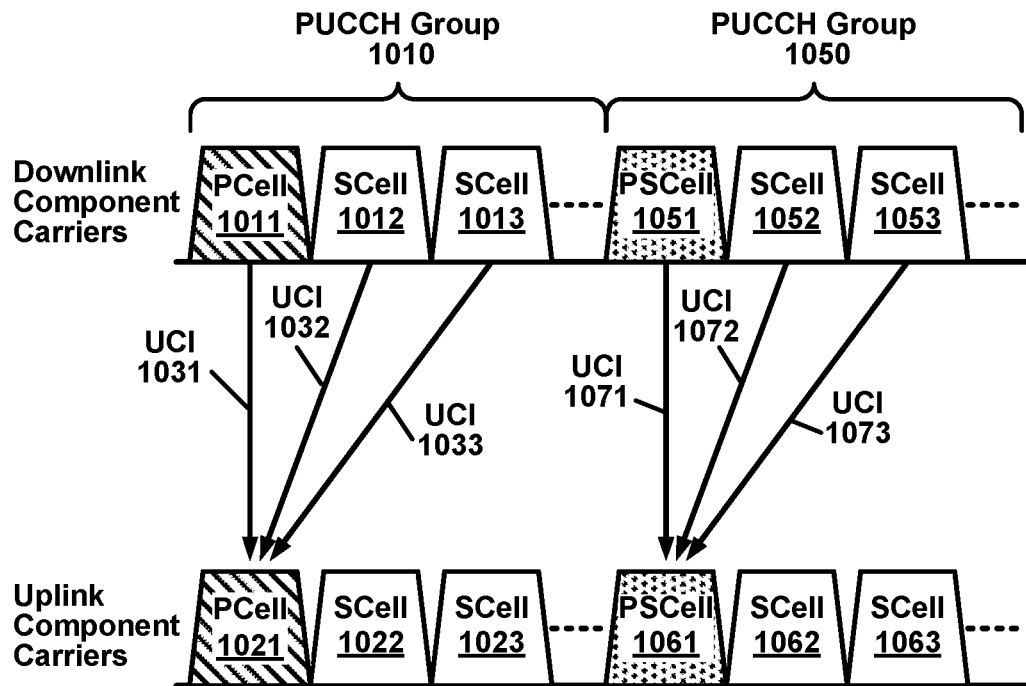
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
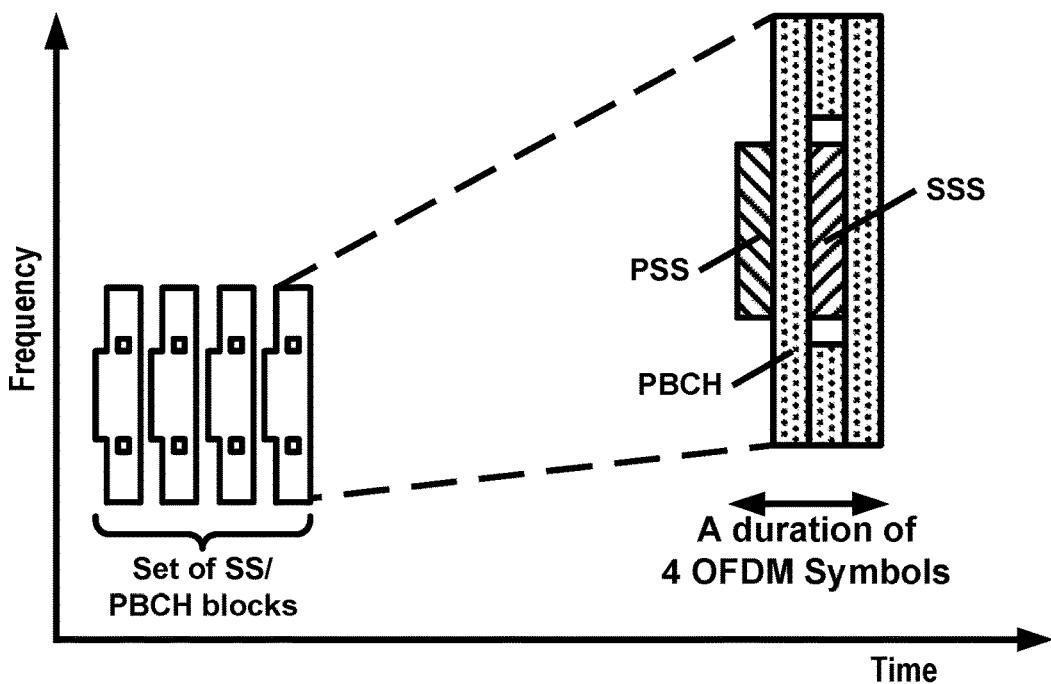
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
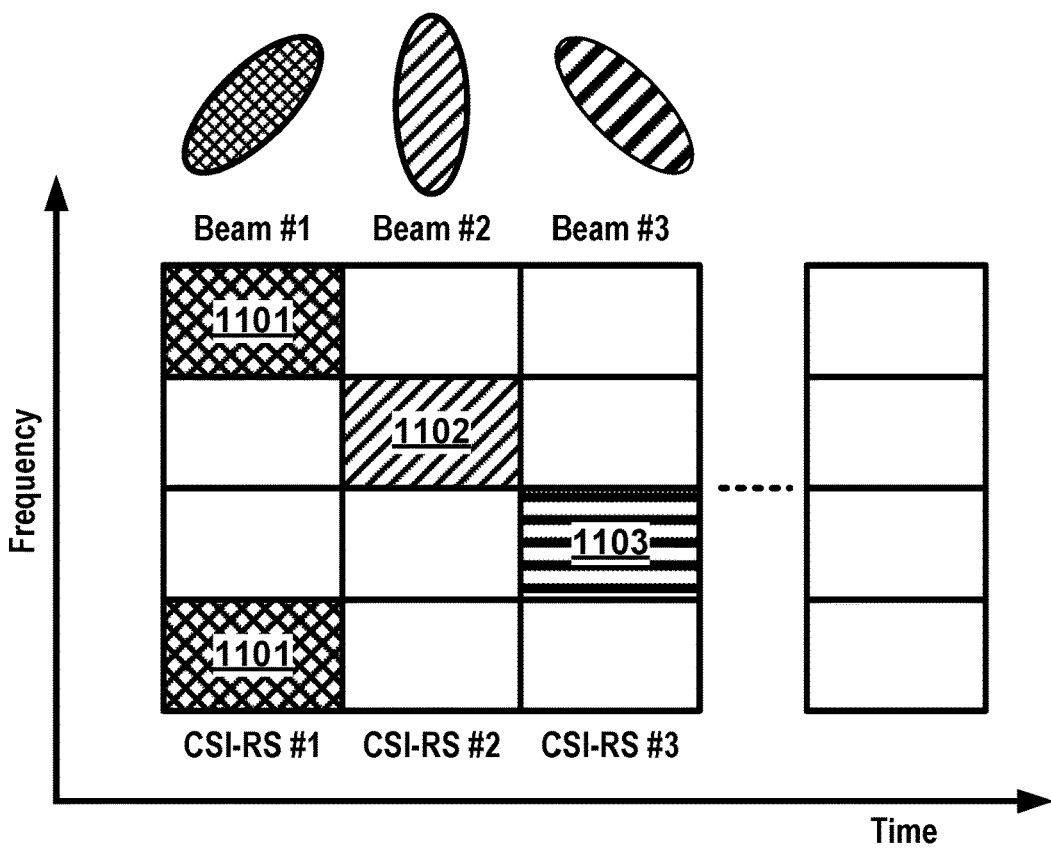
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
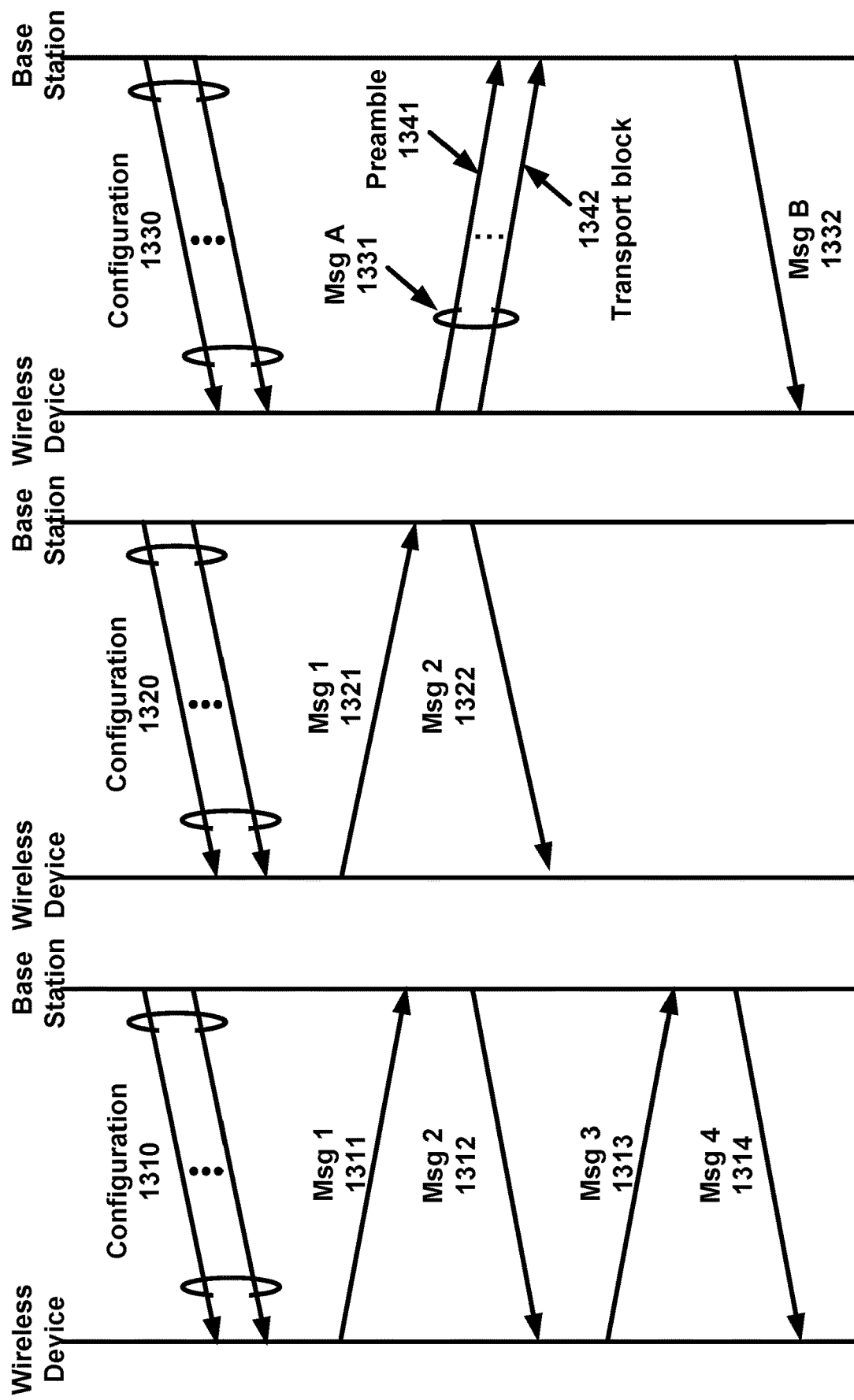
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

RA-RNTI=1+$s$_id+14×$t$_id+14×80×$f$_id+14×80×8×ul_carrier_id where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 10 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 21 may be used for informing/notifying a group of wireless devices of a physical resource block and/or an OFDM symbol where the group of wireless devices may assume no transmission is intended to the group of wireless devices. DCI format 22 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
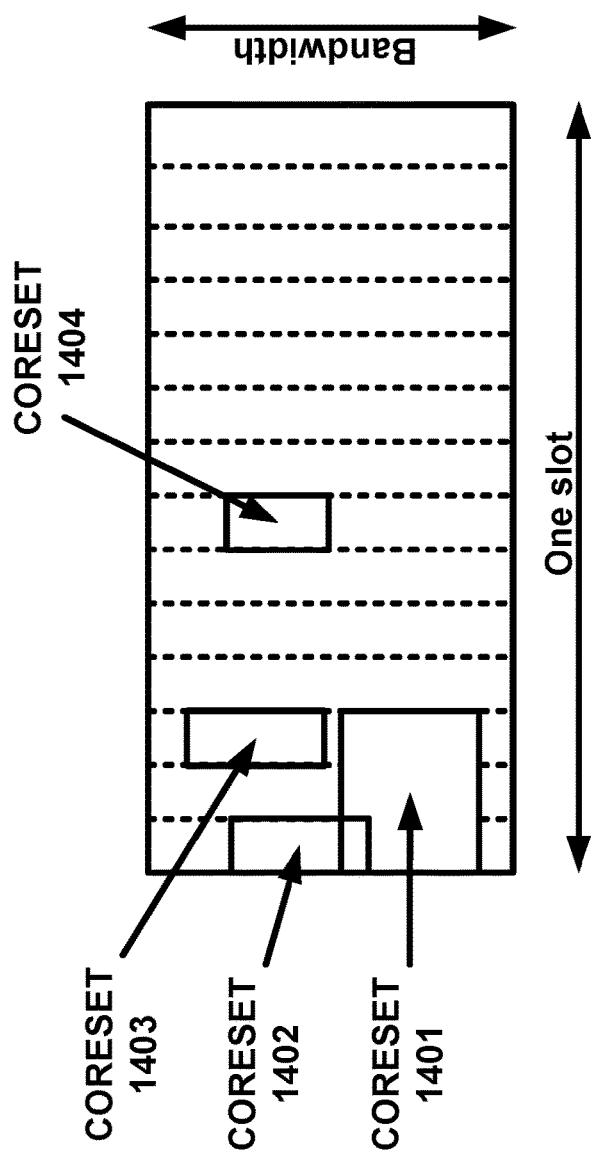
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
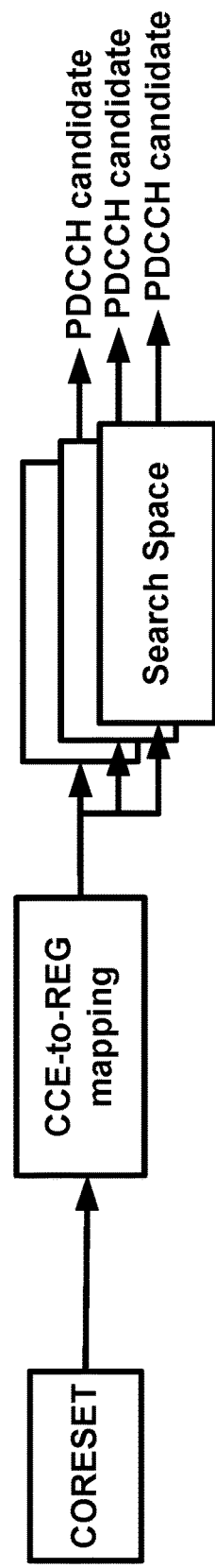
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
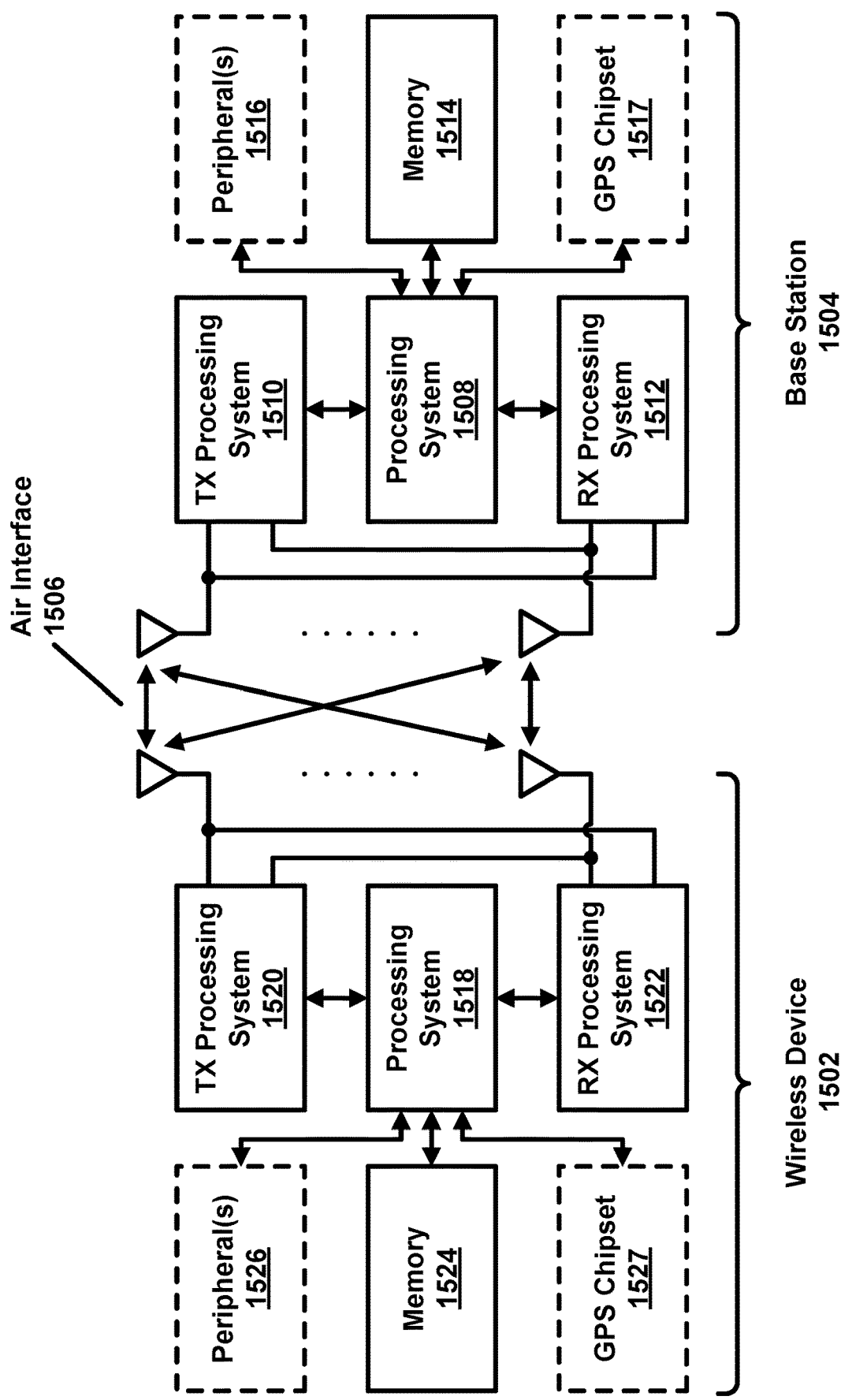
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multiuser MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
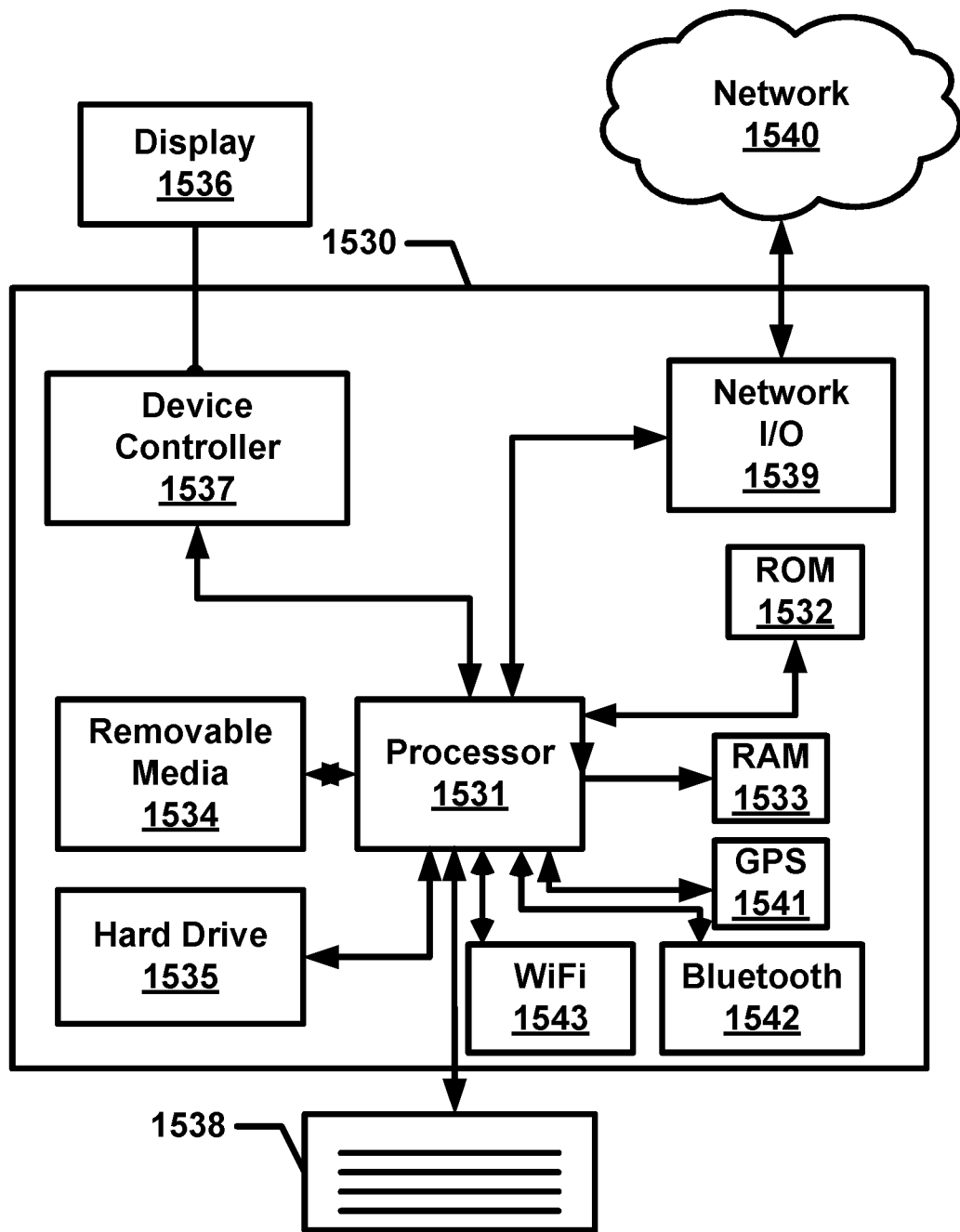
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., a multiple of eight bits) in length. Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottom-most line of the table). The bit order of a parameter field within a MAC PDU may be represented with the first and most significant bit in the leftmost bit and the last and least significant bit in the rightmost bit.

A MAC SDU may be a bit string that is byte aligned (e.g., a multiple of eight bits) in length. A MAC SDU may be comprised in a MAC PDU from the first bit onward. A MAC CE may be a bit string that is byte aligned (e.g., a multiple of eight bits) in length. A MAC subheader may be a bit string that is byte aligned (e.g., a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; and/or an L field with a multi-bit length, for example, if the MAC subheader corresponds to a MAC SDU, a variable-sized MAC CE, or padding.

Figure 17A:
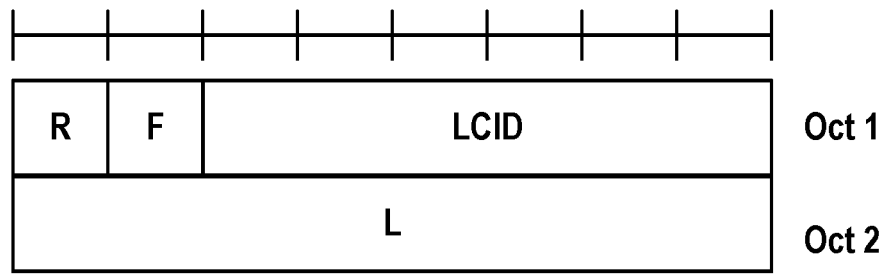
FIG. 17A, FIG. 17B, and FIG. 17C show example MAC subheaders.
Figure 17B:
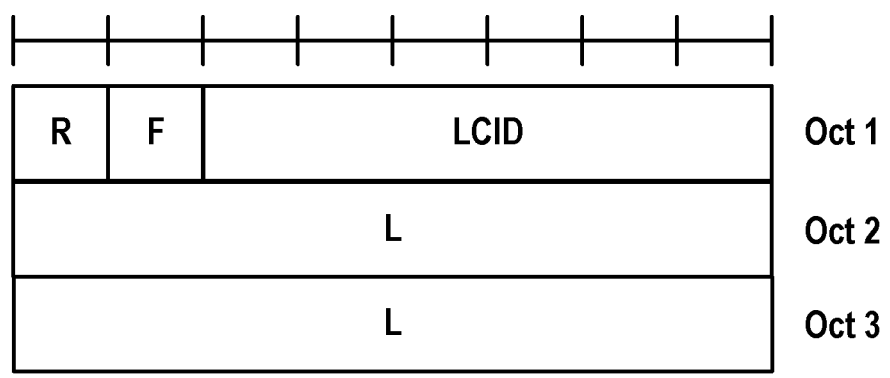
Figure 17C:
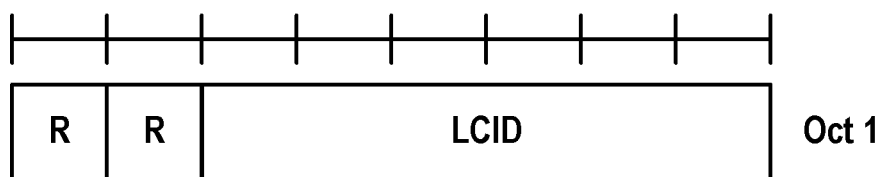

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field. Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

Figure 18A:
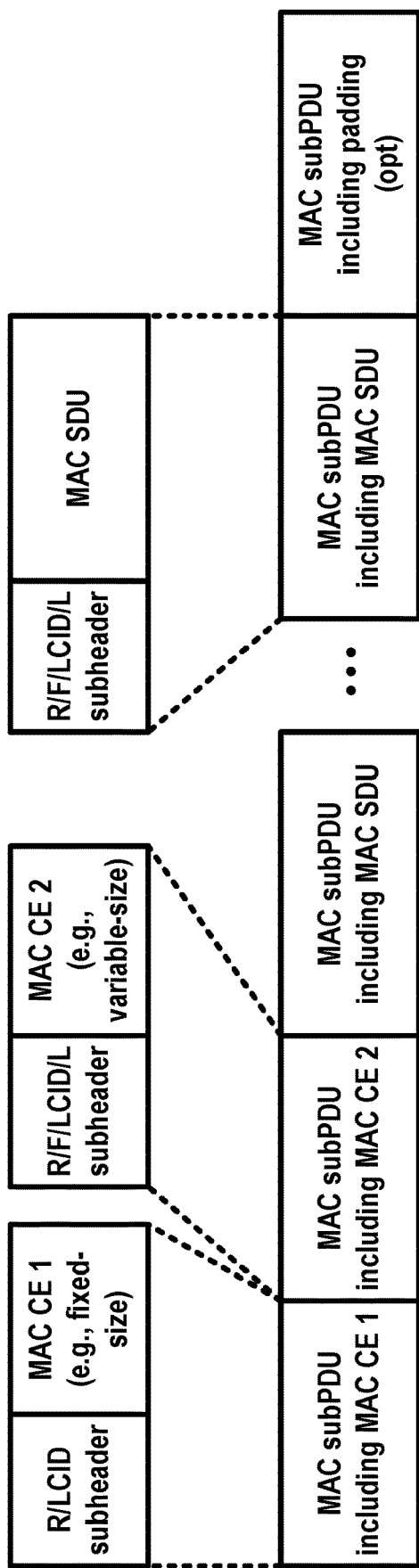
FIG. 18A and FIG. 18B show example MAC PDUs.

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

Figure 18B:
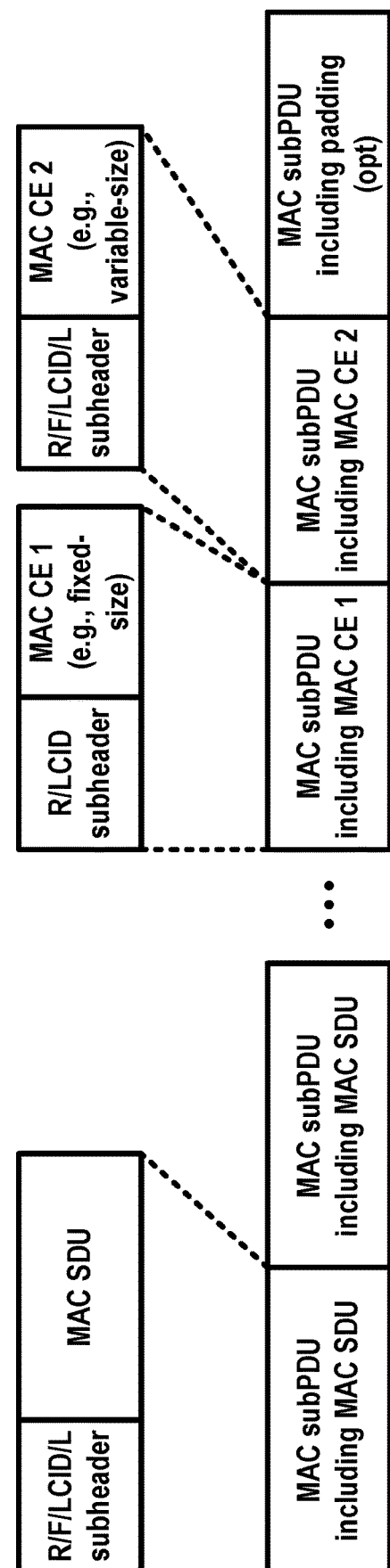

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the corresponding MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more component carriers (CCs) may be aggregated, such as in carrier aggregation (CA). A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., "activated") or a dormant state (e.g., "dormant"), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

Figure 21A:
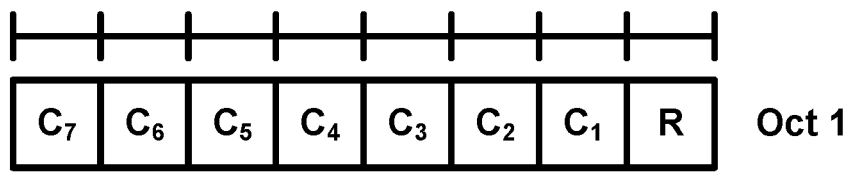
FIG. 21A and FIG. 21B show example SCell Activation/Deactivation MAC CEs.

FIG. 21A shows an example SCell Activation/Deactivation MAC CE of one octet. A first MAC PDU subheader comprising a first LCID (e.g., '111010' as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

Figure 21B:
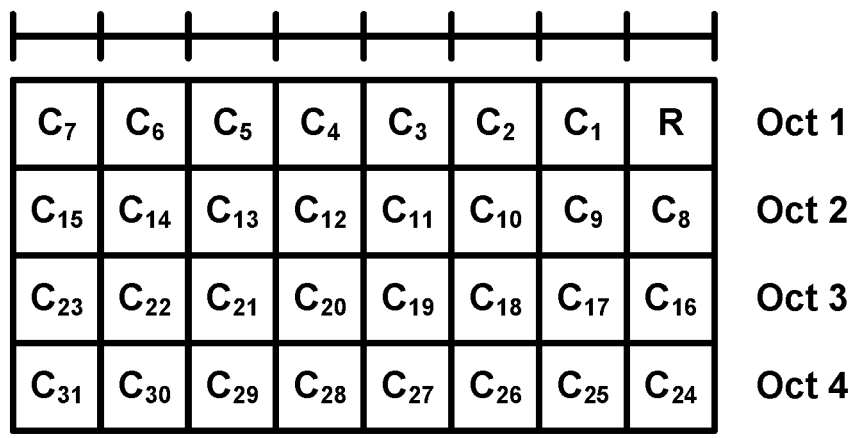

FIG. 21B shows an example SCell Activation/Deactivation MAC CE of four octets. A second MAC PDU subheader comprising a second LCID (e.g., '111001' as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

A base station may send/transmit, to a wireless device, one or more messages comprising an SCell timer (e.g., sCellDeactivationTimer). A wireless device may deactivate an SCell, for example, based on (e.g., after or in response to) an expiry of the SCell timer. An SCell configured with an uplink control channel (e.g., a PUCCH SCell) may not be configured with an SCell timer. Each other SCell (e.g., except for the SCell configured with an uplink control channel) may run the SCell timer.

A wireless device may activate an SCell, for example, if the wireless device receives an SCell Activation/Deactivation MAC CE activating the SCell. A wireless device may perform one or more first operations, for example, based on (e.g., after or in response to) the activating the SCell. The one or more first operations may comprise at least one of: SRS transmissions on/via the SCell; CQI/PMI/RI/CSI-RS resource indicator (CRI) reporting for the SCell; PDCCH monitoring on/via the SCell; PDCCH monitoring for the SCell (e.g., on/via a PCell or another SCell); and/or PUCCH transmissions on/via the SCell.

The wireless device may start or restart a first SCell timer (e.g., sCellDeactivationTimer) associated with the SCell, for example, based on (e.g., after or in response to) the activating the SCell. The wireless device may start or restart the first SCell timer in the slot, for example, in which the SCell Activation/Deactivation MAC CE activating the SCell is received. The wireless device may (re-)initialize one or more suspended configured uplink grants of a configured grant (e.g., a configured grant Type 1) associated with the SCell according to a stored configuration, for example, based on (e.g., after or in response to) the activating the SCell. The wireless device may trigger PHR, for example, based on (e.g., after or in response to) the activating the SCell.

A wireless device may deactivate the activated SCell, for example, if the wireless device receives an SCell Activation/Deactivation MAC CE deactivating an activated SCell. The wireless device may deactivate the activated SCell, for example, if a first SCell timer (e.g., sCellDeactivationTimer) associated with an activated SCell expires. The wireless device may stop the first SCell timer associated with the activated SCell, for example, based on (e.g., after or in response to) the deactivating the activated SCell. The wireless device may clear one or more configured downlink assignments and/or one or more configured uplink grants of a configured grant (e.g., a configured uplink grant Type 2) associated with the activated SCell, for example, based on (e.g., after or in response to) the deactivating the activated SCell. The wireless device may suspend one or more configured uplink grants of a configured uplink grant (e.g., a configured uplink grant Type 1) associated with the activated SCell and/or flush HARQ buffers associated with the activated SCell, for example, based on (e.g., after or in response to) the deactivating the activated SCell.

A wireless device may not perform one or more second operations, for example, if an SCell is deactivated. The one or more second operations may comprise at least one of: transmitting SRS on/via the SCell; reporting CQI/PMI/RI/CRI for the SCell; transmitting UL-SCH on/via the SCell; transmitting RACH on/via the SCell; monitoring at least one first PDCCH on/via the SCell; monitoring at least one second PDCCH for the SCell (e.g., on/via a PCell or another SCell); and/or transmitting a PUCCH on/via the SCell.

A wireless device may restart a first SCell timer (e.g., sCellDeactivationTimer) associated with an activated SCell, for example, if at least one first PDCCH on the activated SCell indicates an uplink grant or a downlink assignment. A wireless device may restart the first SCell timer (e.g., sCellDeactivationTimer) associated with the activated SCell, for example, if at least one second PDCCH on/via a serving cell (e.g., a PCell or an SCell configured with PUCCH, i.e., PUCCH SCell) scheduling the activated SCell indicates an uplink grant or a downlink assignment for the activated SCell. A wireless device may abort an ongoing random access procedure on the SCell, for example, if an SCell is deactivated and if there is an ongoing random access procedure on the SCell.

A base station may configure a wireless device with uplink (UL) bandwidth parts (BWPs) and/or downlink (DL) BWPs, for example, to enable bandwidth adaptation (BA) on a PCell. The base station may further configure the wireless device with at least DL BWP(s) (e.g., there may be no UL BWPs in the UL) to enable BA on an SCell, for example, if a carrier aggregation is configured for the wireless device. For the PCell, an initial active BWP may be a first BWP used for initial access. For the SCell, a first active BWP may be a second BWP configured for the wireless device to operate on the SCell upon the SCell being activated.

A base station and/or a wireless device may independently switch a DL BWP and/or an UL BWP, for example, in a paired spectrum (e.g., FDD). A base station and/or a wireless device may simultaneously switch a DL BWP and an UL BWP, for example, in an unpaired spectrum (e.g., TDD).

A base station and/or a wireless device may switch a BWP between configured BWPs, for example, based on DCI or a BWP inactivity timer. A base station and/or a wireless device may switch an active BWP to a default BWP, for example, based on (e.g., after or in response to) an expiry of a BWP inactivity timer associated with a serving cell if the BWP inactivity timer is configured for the serving cell. The default BWP may be configured by the network (e.g., via one or more RRC message).

One UL BWP for each uplink carrier and one DL BWP may be active at a time in an active serving cell, for example, for FDD systems if configured with BA. One DL/UL BWP pair may be active at a time in an active serving cell, for example, for TDD systems. Operating on the one UL BWP and the one DL BWP (or the one DL/UL pair) may improve wireless device battery consumption efficiencies. BWPs, other than the one active UL BWP and the one active DL BWP, (e.g., configured for the wireless device and/or that the wireless device may work on) may be deactivated. The wireless device may not monitor PDCCH on/via the deactivated BWPs and/or not send/transmit, on/via the deactivated BWPs, PUCCH, PRACH, and/or UL-SCH. A serving cell may be configured with at most a first quantity/number (e.g., four or any other quantity/number) of BWPs. There may be one active BWP at any point in time, for example, for an activated serving cell.

A BWP switching for a serving cell may be used to activate an inactive BWP and/or deactivate an active BWP at a time. In The BWP switching may be controlled by a PDCCH indicating a downlink assignment and/or an uplink grant. The BWP switching may be controlled by a BWP inactivity timer (e.g., bwp-InactivityTimer). The BWP switching may be controlled by a base station and/or a wireless device (e.g., a MAC entity of a base station and/or a wireless device), for example, based on (e.g., after or in response to) initiating a random access procedure. A BWP may be initially active without receiving a PDCCH indicating a downlink assignment or an uplink grant, for example, after an addition of an SpCell or activation of an SCell. The active BWP for a serving cell may be indicated by an RRC message and/or a PDCCH. A DL BWP may be paired with a UL BWP, and BWP switching may be common for both UL and DL, for example, for an unpaired spectrum.

Figure 22:
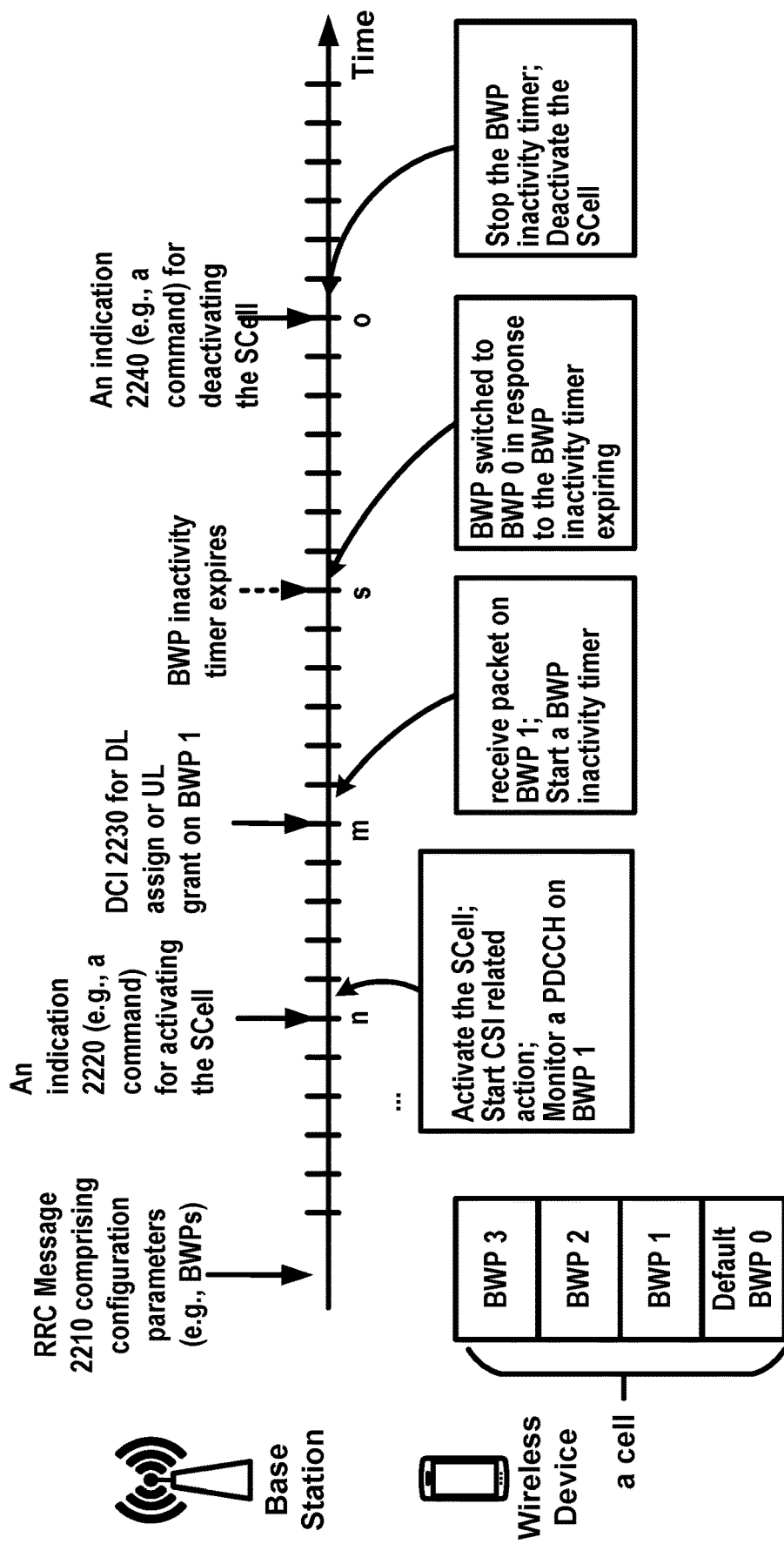
FIG. 22 shows an example of bandwidth part (BWP) management.

FIG. 22 shows an example of BWP management. BWP management may comprise BWP switching (e.g., switching on an SCell). A wireless device may receive one or more RRC messages 2210 comprising parameters of an SCell and one or more BWP configurations associated with the SCell. The one or more RRC messages 2210 may comprise at least one of: an RRC connection reconfiguration message (e.g., RRCReconfiguration); an RRC connection reestablishment message (e.g., RRCRestablishment); and/or an RRC connection setup message (e.g., RRCSetup). Among the one or more BWPs, at least one BWP may be configured as the first active BWP (e.g., BWP 1 shown in FIG. 22), one BWP as the default BWP (e.g., BWP 0 shown in FIG. 22). The wireless device may receive an activation indication 2220 (e.g., a command, a MAC CE) to activate the SCell (e.g., during n-th slot). The wireless device may start an SCell deactivation timer (e.g., sCellDeactivationTimer), and start CSI-related actions for the SCell, and/or start CSI-related actions for the first active BWP of the SCell. The wireless device may start monitoring a PDCCH on/via BWP 1, for example, based on (e.g., after or in response to) activating the SCell.

The wireless device may start or restart a BWP inactivity timer (e.g., bwp-InactivityTimer) (e.g., during m-th slot), for example, based on (e.g., after or in response to) receiving DCI 2230 indicating a DL assignment on BWP 1. The wireless device may switch back to the default BWP (e.g., BWP 0) as an active BWP, for example, if the BWP inactivity timer expires (e.g., during s-th slot). The wireless device may deactivate the SCell and/or stop the BWP inactivity timer, for example, if the sCellDeactivationTimer expires.

Using the BWP inactivity timer may further reduce power consumption of a wireless device, for example, if the wireless device is configured with multiple cells and/or one or more cells having a wide bandwidth (e.g., 1 GHz). The wireless device may only send/transmit or receive via a narrow-bandwidth BWP (e.g., 5 MHz) on the PCell or an SCell, for example, if there is no activity on an active BWP. The wireless device may determine an expiry of the BWP inactivity timer (e.g., during s-th slot). The wireless device may switch the active BWP (e.g., the BWP 1) to the default BWP (e.g., the BWP 0), for example, based on (e.g., after or in response to) the .expiry of the BWP inactivity timer.

A wireless device (e.g., a MAC entity of the wireless device) may apply normal operations on an active BWP for an activated serving cell configured with a BWP. The normal operations may comprise at least one of: transmitting on/via a UL-SCH; transmitting on/via a RACH; monitoring a PDCCH; transmitting a PUCCH; and/or receiving a DL-SCH; and/or (re-) initializing any suspended configured uplink grants of a configured grant (e.g., configured grant Type 1) according to a stored configuration, if any.

A wireless device (e.g., a MAC entity of the wireless device) may not perform one or more operations, for example, on/via an inactive BWP for each activated serving cell configured with a BWP. The one or more operations not performed by the wireless device (e.g., a MAC entity of the wireless device) may comprise at least one of: transmitting on/via a UL-SCH; transmitting on/via a RACH; monitoring a PDCCH; transmitting a PUCCH; transmitting an SRS, receiving a DL-SCH; clearing any configured downlink assignment and/or configured uplink grant of a configured grant (e.g., configured grant Type 2); and/or suspending any configured uplink grant of a configured grant (e.g., configured Type 1).

A wireless device may perform BWP switching to a BWP indicated by a PDCCH transmission (e.g., DCI, a PDCCH order, etc.), for example, if the wireless device (e.g., a MAC entity of the wireless device) receives the PDCCH transmission for a BWP switching of a serving cell at time that a random access procedure associated with this serving cell is not ongoing. A bandwidth part indicator field value may indicate an active DL BWP, from a configured DL BWP set, for DL receptions, for example, if the bandwidth part indicator field is configured in DCI format 1_1. A bandwidth part indicator field value may indicate an active UL BWP, from a configured UL BWP set, for UL transmissions, for example, if the bandwidth part indicator field is configured in DCI format 0_1.

A wireless device may be provided with, by a higher layer parameter (e.g., Default-DL-BWP), a default DL BWP among the configured DL BWPs, for example, for a primary cell and/or a secondary cell. The default DL BWP may be the initial active DL BWP, for example, if the wireless device is not provided with a default DL BWP by the higher layer parameter (e.g., Default-DL-BWP).

A wireless device may be provided with a timer value for the primary cell by a higher layer parameter (e.g., bwp-InactivityTimer). The wireless device may increment the configured timer (if running), for example, every interval of 1 millisecond for frequency range 1, every 0.5 milliseconds for frequency range 2, or any other interval for another frequency range. The wireless device may increment the configured timer, for example, if the wireless device does not detect DCI format 1_1 for a paired spectrum operation or if the wireless device does not detect DCI format 1_1 or DCI format 0_1 for an unpaired spectrum operation during the interval. The wireless device may receive a deactivation indication 2240 (e.g., a command, a MAC CE) for deactivating one or more SCells. The wireless device may stop the BWP inactivity timer and/or deactivate the one or more SCells, for example, based on (e.g., after or in response to) receiving the deactivation indication 2240.

The wireless device procedures on a secondary cell may be the same as, or similar to, the wireless device procedures on the primary cell, for example, if the wireless device is configured for the secondary cell with a higher layer parameter (e.g., Default-DL-BWP) indicating a default DL BWP among the configured DL BWPs and/or the wireless device is configured with a higher layer parameter (e.g., bwp-InactivityTimer) indicating a timer value. The wireless device may perform the same or similar procedures, for example, using the timer value for the secondary cell and/or the default DL BWP for the secondary cell. The wireless device may use the indicated DL BWP and the indicated UL BWP on the secondary cell as the respective first active DL BWP and first active UL BWP on a secondary cell or carrier, for example, if the wireless device is configured with, by a higher layer parameter (e.g., Active-BWP-DL-SCell), a first active DL BWP and with, by a higher layer parameter (e.g., Active-BWP-UL-SCell), a first active UL BWP on the secondary cell or carrier.

A wireless device may receive an uplink grant dynamically, for example, via a PDCCH or a random access response (RAR). The wireless device may receive an uplink grant configured semi-persistently, for example, by a radio resource control (RRC) message. The wireless device may send/transmit, via the uplink grant, an uplink transport block (TB) on/via an uplink shared channel (UL-SCH). To send/transmit the uplink transport block, a medium access control (MAC) layer of the wireless device may receive one or more HARQ information from lower layers (e.g., a PHY layer) of the wireless device. The one or more HARQ information may comprise at least one of: a HARQ process identifier (ID); a new data indicator (NDI); a redundancy version (RV); and/or a transport block size (TBS). A wireless device (e.g., a MAC entity of the wireless device) may deliver an uplink grant and one or more associated HARQ information to a HARQ entity, for example, if the MAC entity of the wireless device has a C-RNTI, a Temporary C-RNTI (TC-RNTI), or a configured scheduling RNTI (CS-RNTI), for each PDCCH occasion and for each serving cell belonging to a time alignment group (TAG) that has a running time-AlignmentTimer and for each uplink grant received for the PDCCH occasion, if the uplink grant for the serving Cell has been received on the PDCCH for the MAC entity's C-RNTI or TC-RNTI.

A wireless device (e.g., a MAC entity of a wireless device) may set a HARQ Process ID to a HARQ Process ID associated with a PUSCH duration for each serving cell and each configured uplink grant, if configured and activated, for example, if the PUSCH duration of the configured uplink grant does not overlap with a second PUSCH duration of an uplink grant received on the PDCCH or in an RAR for the serving cell. The wireless device (e.g., a MAC entity of the wireless device) may determine the NDI bit for the corresponding HARQ process to have been toggled and deliver the configured uplink grant and the associated HARQ information (e.g., to the HARQ entity), for example, if configuredGrantTimer for the corresponding HARQ process is not running. For a configured uplink grant, a wireless device and/or a base station may determine a HARQ Process ID associated with a first symbol of a UL transmission as: HARQ Process ID=[floor(CURRENT_symbol/periodicity)] modulo nrofHARQ-Processes, where CURRENT_symbol= (SFN×numberOfSlotsPerFrame×numberOfSymbolsPerSlot+slot number in the frame×numberOfSymbolsPerSlot+symbol number in the slot), SFN is a system frame number of a frame of the current symbol, numberOfSlotsPerFrame and numberOfSymbolsPerSlot refer to the number of consecutive slots per frame and the number of consecutive symbols per slot. A quantity/number of HARQ processes (e.g., nrofHARQ-Processes) may be a maximum quantity/number of parallel HARQ processes configured by an RRC message. CURRENT_symbol may refer to a symbol index of the first transmission occasion of a repetition bundle that takes place.

A wireless device (e.g., a MAC entity of a wireless device) may comprise a HARQ entity for each serving cell with a configured uplink (e.g., configured with a SUL and/or an NUL). The wireless device (e.g., the HARQ entity of the wireless device) may maintain a number of parallel HARQ processes. Each HARQ process of the number of parallel HARQ processes may support one TB. The HARQ process may be associated with a HARQ process identifier (ID). For UL transmission with UL grant in an RAR, HARQ process identifier 0 may be used.

Figure 23:
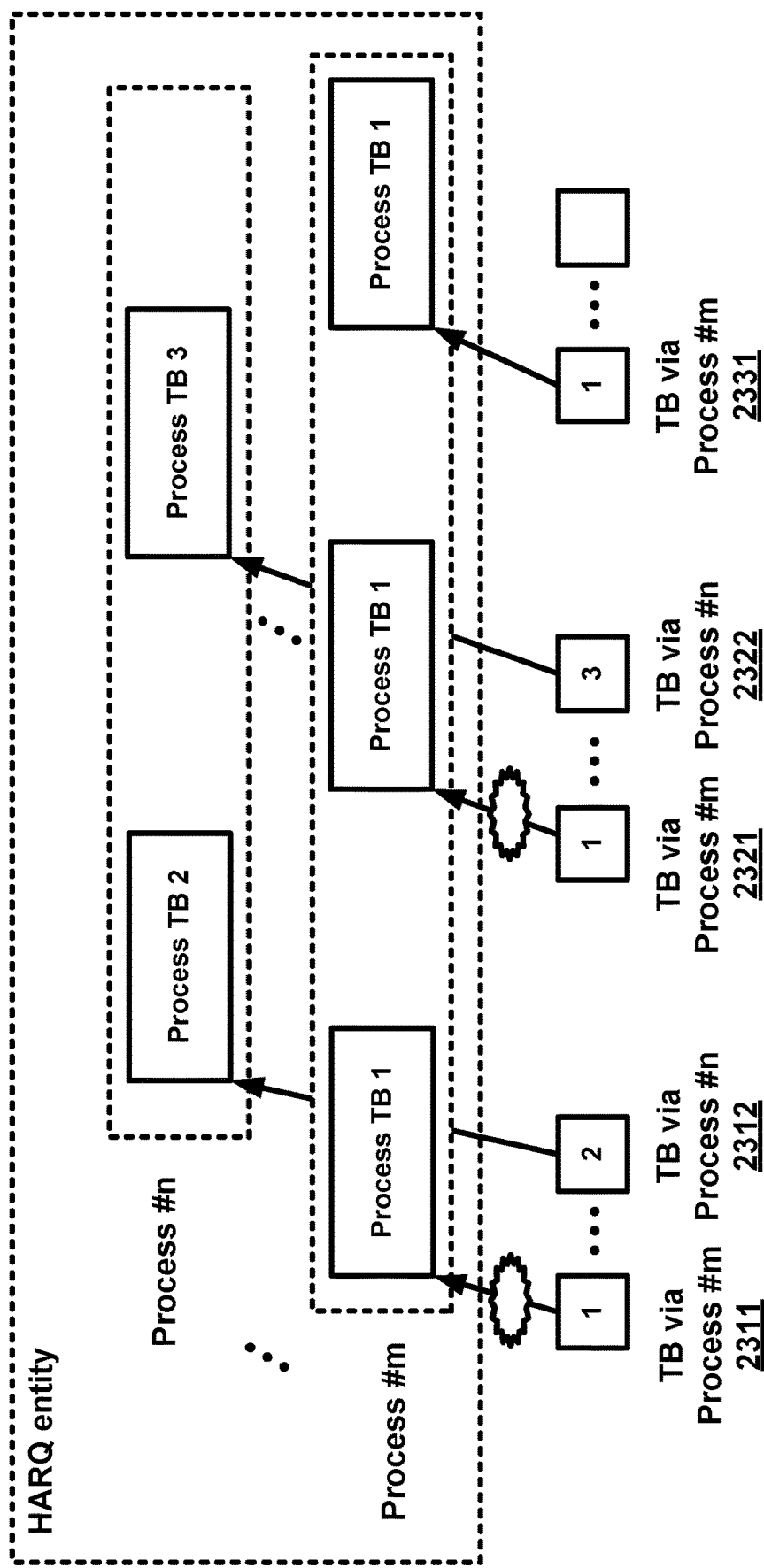
FIG. 23 shows an example of a HARQ entity configured with multiple HARQ processes.

FIG. 23 shows an example of a wireless device (e.g., a HARQ entity of a wireless device) configured with multiple HARQ processes. A wireless device may send/transmit uplink data to a base station. A HARQ entity may comprise a number of parallel HARQ processes (e.g., Process #m, Process #n, etc.). Process #m may be indicated/identified with, or determined based on, a first HARQ process identifier (e.g., m). Process #n may be indicated/identified with, or determined based on, a second HARQ process identifier (e.g., n). The wireless device may process TB 1 in Process #m (e.g., at step 2311), for example, if the wireless device transmits uplink data (e.g., the TB 1) to the base station. The wireless device may process TB 2 in Process #n (e.g., at step 2312), for example, if the wireless device transmits uplink data (e.g., the TB 2) to the base station. The base station may require a retransmission of TB 1 from the wireless device, for example, based on (e.g., after or in response to) TB 1 being not successfully decoded by the base station. The wireless device may resend/retransmit at least a portion of the TB 1, for example, based on a HARQ buffer of Process #m (e.g., at step 2321). The base station may indicated to the wireless device a new data transport block (e.g., TB 3) for Process #n (e.g., at step 2322), for example, based on (e.g., after or in response to) TB 2 being successfully decoded. The base station may require a retransmission of TB 1 from the wireless device, for example, based on (e.g., after or in response to) TB 1 being not successfully decoded by the base station. The wireless device may resend/retransmit at least a portion of the TB 1, for example, based on a HARQ buffer of Process #m (e.g., at step 2331).

A wireless device may receive downlink data from a base station. As shown in FIG. 23, a HARQ entity may comprise a number of parallel HARQ processes (e.g., Process #m, Process #n, etc.). Process #m may be indicated/identified with, or determined based on, a first HARQ process identifier (e.g., m). Process #n may be indicated/identified with, or determined based on, a second HARQ process identifier (e.g., n). A wireless device may process TB 1 in Process #m (e.g., at step 2311), for example, if the wireless device receives downlink data (e.g., the TB 1) from the base station. The wireless device may process TB 2 in Process #n (e.g., at step 2312), for example, if the wireless device receives downlink data (e.g., the TB 2) from the base station. The wireless device may store received data of TB1 in a soft buffer of Process #m, for example, based on (e.g., after or in response to) the TB 1 being not successfully decoded by the wireless device. The wireless device may send/transmit, to the base station, a negative acknowledgement (NACK) associated with the TB 1. The base station may resend/retransmit at least a portion of the TB 1, for example, based on (e.g., after or in response to) receiving the NACK. The wireless device may process TB 1 in Process #m (e.g., at step 2321), for example, if the wireless device receives downlink data (e.g., at least a portion of the TB 1) from the base station. The wireless device may attempt to decode TB 1, for example, based on the stored data of TB 1 in the soft buffer and received data of retransmission of TB 1. The wireless device may send/transmit, to the base station, a positive acknowledgement (ACK) for TB 2, for example, based on (e.g., after or in response to) TB 2 being successfully decoded. The wireless device may deliver decoded data (e.g., a MAC PDU) to a disassembly and demultiplexing entity of the wireless device, for example, based on (e.g., after or in response to) TB 2 being successfully decoded. The base station may send/transmit a new transport block (e.g., TB 3). The wireless device may process the new transport block (e.g., the TB 3) by using Process #n (e.g., at step 2322), for example, based on (e.g., after or in response to) receiving the new transport block and/or receiving the positive acknowledgement. The wireless device may send/transmit, to the base station, a negative acknowledgement (NACK) associated with the TB 1. The base station may resend/retransmit at least a portion of the TB 1, for example, based on (e.g., after or in response to) receiving the NACK. The wireless device may process TB 1 in Process #m (e.g., at step 2331), for example, if the wireless device receives downlink data (e.g., at least a portion of the TB 1) from the base station.

A PUSCH transmission parameter (e.g., parameter pusch-AggregationFactor) may indicate a quantity/number of transmissions of a TB within a bundle of a dynamic grant, for example, if a wireless device (e.g., a MAC entity of a wireless device) is configured with a PUSCH repetition (e.g., pusch-AggregationFactor>1). The wireless device may perform the PUSH retransmissions (e.g., pusch-AggregationFactor−1 HARQ retransmissions) within a bundle, for example, after the initial transmission. A repetition parameter (e.g., parameter repK) may indicate a quantity/number of transmissions of a TB within a bundle of a configured uplink grant, for example, if the wireless device (e.g., a MAC entity of the wireless device) is configured with the repetition parameter satisfying a first value (e.g., repK>1). HARQ retransmissions may follow within a bundle, for example, after the initial transmission. Bundling operation may rely on the HARQ entity for invoking the same HARQ process for each transmission that is part of the same bundle, for example, for both dynamic grant and configured uplink grant. The wireless device may trigger HARQ retransmissions (e.g., within a bundle), for example, without waiting for feedback from a previous transmission according to the PUSCH transmission parameter (e.g., pusch-AggregationFactor) for the dynamic grant and the repetition parameter (e.g., the repK) for the configured uplink grant, respectively. Each transmission within a bundle may be a separate uplink grant, for example, after the initial uplink grant within a bundle is delivered to the wireless device (e.g., the HARQ entity of the wireless device).

The wireless device may determine a sequence of redundancy versions. The wireless device may determine the sequence of redundancy versions, for example, for each transmission within a bundle of a dynamic grant, based on one or more fields of DCI carrying the dynamic grant. The wireless device may determine a sequence of redundancy versions, for example, for each transmission within a bundle of a configured uplink grant, based on one or more configuration parameters in an RRC message.

A wireless device (e.g., a HARQ entity of a wireless device) may indicate/identify a HARQ process associated with an uplink grant. For the indicated/identified HARQ process, the wireless device (e.g., the HARQ entity of the wireless device) may obtain a MAC PDU to send/transmit from a multiplexing and assembly entity, for example, if the received uplink grant is not addressed to a TC-RNTI on PDCCH, and/or if an NDI provided/configured in the associated HARQ information has been toggled compared to an NDI value in the previous transmission of the TB of the HARQ process. The wireless device (e.g., the HARQ entity of the wireless device) may deliver/send the MAC PDU, the uplink grant, and/or the HARQ information of the TB to the indicated/identified HARQ process. The wireless device (e.g., the HARQ entity of the wireless device) may instruct/cause the indicated/identified HARQ process to trigger a new transmission, for example, based on (e.g., after or in response to) obtaining the MAC PDU. For the indicated/identified HARQ process, the wireless device (e.g., the HARQ entity of the wireless device) may deliver/send the uplink grant and/or the HARQ information (e.g., redundancy version) of the TB to the indicated/identified HARQ process. The wireless device (e.g., the HARQ entity of the wireless device) may instruct/cause the indicated/identified HARQ process to trigger a retransmission, for example, if the received uplink grant is addressed to a TC-RNTI on PDCCH, and/or if the NDI provided/configured in the associated HARQ information has not been toggled compared to the NDI value in the previous transmission of the TB of the HARQ process.

A HARQ process may be associated with a HARQ buffer. A wireless device may perform a new transmission on/via a resource and with a modulation coding scheme (MCS) indicated on/via a PDCCH, an RAR, or an RRC message. The wireless device may perform a retransmission on/via a resource and (if provided/configured) with an MCS indicated on/via a PDCCH, or on/via a same resource and with a same MCS as was used for the last transmission attempt within a bundle.

A HARQ process may store the MAC PDU in an associated HARQ buffer, store the uplink grant received from the HARQ entity, and/or generate a transmission for a TB, for example, if a HARQ entity requests a new transmission of the TB. The HARQ process may cause storing the uplink grant received from the wireless device (e.g., the HARQ entity of the wireless device) and generate a transmission for a TB, for example, if the wireless device (e.g., the HARQ entity of the wireless device) requests a retransmission for the TB. The HARQ process may instruct/cause the physical layer to generate a transmission signal, for example, to generate a transmission for a TB. The wireless device (e.g., the HARQ process and/or the HARQ entity of the wireless device) may instruct/cause the physical layer to generate the transmission signal, for example, according to the stored uplink grant if the MAC PDU was obtained from a buffer (e.g., a Msg3 buffer). The wireless device (e.g., the HARQ process and/or the HARQ entity of the wireless device) may instruct/cause the physical layer to generate the transmission signal, for example, if there is no measurement gap at the time of the transmission and/or if a retransmission (e.g., in case of a retransmission) does not collide with a transmission for the MAC PDU obtained from the Msg3 buffer.

Figure 24:
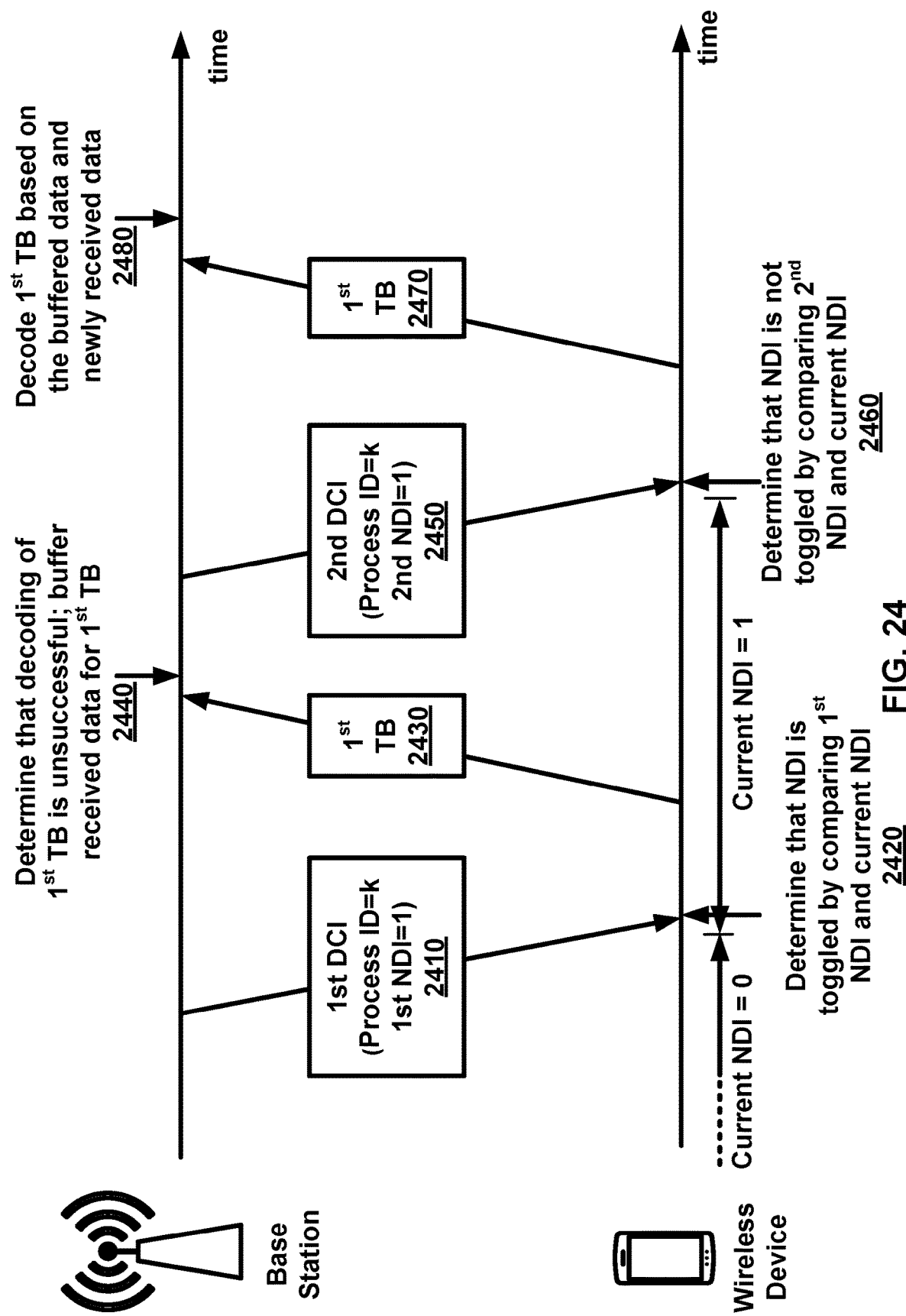
FIG. 24 shows an example uplink (re)transmission.

FIG. 24 shows an example uplink (re)transmission. The uplink re(transmission) may be based on a HARQ procedure. A base station may send/transmit to a wireless device, first DCI comprising an uplink grant and/or HARQ information (e.g., at step 2410). The HARQ information may comprise a HARQ Process ID (e.g., Process ID=k as shown in FIG. 24), and/or a first NDI value (e.g., 1st NDI=1). Before receiving the first DCI, the wireless device may have a current NDI value (e.g., Current NDI=0 as shown in FIG. 24). The wireless device may determine that the first NDI has been toggled, for example, based on (e.g., after or in response to) receiving the first DCI. The wireless device may determine that the first NDI has been toggled (e.g., at step 2420), for example, based on the first NDI value (e.g., 1) being different from the current NDI value (e.g., 0). A wireless device (e.g., a HARQ entity of the wireless device) may obtain a MAC PDU (e.g., from a multiplexing and assembly entity of the wireless device), for example, based on the first NDI being toggled. The wireless device (e.g., the HARQ entity of the wireless device) may deliver/send the MAC PDU, the uplink grant, and the HARQ information to a HARQ process. The HARQ process may be indicated/identified by, or determined based on, the HARQ process ID (e.g., Process ID=k as shown in FIG. 24). The wireless device (e.g., the HARQ entity of the wireless device) may instruct/cause the HARQ process to trigger a new transmission for a TB comprising the MAC PDU. The wireless device (e.g., the HARQ process of the wireless device) may cause storing the MAC PDU in an associated HARQ buffer and/or storing the uplink grant. The wireless device (e.g., the HARQ process of the wireless device) may determine/cause (e.g., instruct/cause a physical layer of the wireless device to generate) a new transmission for the TB, for example, according to the stored uplink grant. At step 2430, the wireless device (e.g., the physical layer of the wireless device) may send/transmit the TB (e.g., a first TB), for example, according to the stored uplink grant. The base station may attempt to decode the TB, for example, based on received data of the TB. The base station may determine that the decoding of the TB is unsuccessful (e.g., at step 2440). The base station may provide/send/transmit a subsequent uplink grant to the wireless device for a retransmission of the TB, for example, if the base station does not successfully decode the TB sent/transmitted by the wireless device. At step 2440, the base station may store the received data of the TB in a buffer (e.g., the soft buffer of a HARQ process), for example, if the base station does not successfully decode the TB transmitted by the wireless device. The base station may send/transmit second DCI indicating the retransmission (e.g., at step 2450). The second DCI may comprise the same HARQ Process ID as the first HARQ Process ID, a second uplink grant, an RV value, and a second NDI value (e.g., 2nd NDI=1). The wireless device may determine that the second NDI is not toggled (e.g., at step 2460), for example, based on the second NDI value (e.g., 1) being equal to the first NDI value (e.g., 1). The second NDI value may become the new current NDI value. The wireless device (e.g., the HARQ entity of the wireless device) may deliver/send, to a HARQ process indicated/identified by the HARQ process ID (e.g., HARQ Process ID=k), the second uplink grant, and/or the RV value, for example, based on the second NDI not being toggled. The wireless device (e.g., the HARQ entity of the wireless device) may instruct/cause the HARQ process to trigger a retransmission of the TB, for example, based on the second NDI not being toggled. The wireless device (e.g., the HARQ process of the wireless device) may cause storing of the second uplink grant. The wireless device (e.g., the HARQ process of the wireless device) may determine/cause (e.g., instruct/cause the physical layer of the wireless device to generate) a retransmission for the TB, for example, according to the second uplink grant. At step 2470, the wireless device (e.g., the physical layer of the wireless device) may resend/retransmit the TB (e.g., the first TB) according to the second uplink grant. The base station may attempt to decode the TB (e.g., at step 2480), for example, based on the buffered data and a received data of the retransmitted TB.

A base station may send/transmit second DCI indicating a transmission of a new TB (e.g., a second TB), for example, if the base station successfully decodes the TB. The second DCI may comprise a HARQ Process ID, which may be the same as the first HARQ Process ID, a second uplink grant, a RV value, and a second NDI value. A wireless device may determine that the second NDI is toggled, for example, based on the second NDI value (e.g., 0) being different from the first NDI value (e.g., 1). The second NDI value may become the new current NDI value. The wireless device (e.g., the HARQ entity of the wireless device) may obtain a second MAC PDU (e.g., from the multiplexing and assembly entity), for example, based on (e.g., after or in response to) the second NDI being toggled. The wireless device (e.g., the HARQ entity of the wireless device) may deliver/send the second MAC PDU, the second uplink grant, and/or second HARQ information to the HARQ process (e.g., indicated/identified by Process ID=k). The wireless device (e.g., the HARQ entity of the wireless device) may instruct/cause the HARQ process to trigger a new transmission for the second TB comprising the second MAC PDU. The wireless device (e.g., the HARQ process of the wireless device) may cause storing of the second MAC PDU in a HARQ buffer of the HARQ process and/or storing of the second uplink grant. The wireless device (e.g., the HARQ process of the wireless device) may determine/cause (e.g., instruct/cause the physical layer of the wireless device to generate) a new transmission for the second TB, for example, according to the second uplink grant. The wireless device (e.g., the physical layer of the wireless device) may send/transmit the second TB, for example, based on the instruction and according to the second uplink grant.

A wireless device may receive one or more downlink assignments. The one or more downlink assignment may be received on/via a PDCCH. The one or more downlink assignments may indicate that there is a transmission on/via a downlink shared channel (DL-SCH) for the wireless device (e.g., a MAC entity of the wireless device). The one or more downlink assignments may indicate HARQ information. The HARQ information may comprise at least one of: a HARQ process identifier (ID); an NDI; an RV; and/or a TBS. The wireless device (e.g., the MAC entity of the wireless device) may indicate a presence of a downlink assignment and deliver/send associated HARQ information to the HARQ entity, for example, if the wireless device (e.g., the MAC entity of the wireless device) has a C-RNTI, TC-RNTI or CS-RNTI, for each PDCCH occasion during which it monitors a PDCCH and for each serving cell. The wireless device (e.g., the MAC entity of the wireless device) may indicate the presence of a downlink assignment and deliver/send the associated HARQ information (e.g., to the HARQ entity of the wireless device), for example, if the downlink assignment for the PDCCH occasion and the serving cell is received on the PDCCH for the MAC entity's C-RNTI or TC-RNTI. The wireless device (e.g., the MAC entity of the wireless device) may determine an NDI for a corresponding HARQ process not to have been toggled and indicate the presence of a downlink assignment and deliver/send the associated HARQ information (e.g., to the HARQ entity of the wireless device), for example, if the downlink assignment for the PDCCH occasion is received on/via the PDCCH for the MAC entity's CS-RNTI. If the NDI in the received HARQ information is 1 (or any other value), the wireless device (e.g., the MAC entity of the wireless device) may: determine the NDI for the corresponding HARQ process not to have been toggled, indicate the presence of a downlink assignment, and/or deliver/send the associated HARQ information (e.g., to the HARQ entity of the wireless device). The wireless device (e.g., the MAC entity of the wireless device) may store the downlink assignment and the associated HARQ information as configured downlink assignment and/or initialize the configured downlink assignment to start in the associated PDSCH duration and recur, for example, if the downlink assignment for the PDCCH occasion is received on/via the PDCCH for the CS-RNTI associated with the wireless device (e.g., the CS-RNTI of the MAC entity). The wireless device (e.g., the MAC entity of the wireless device) may cause storing of the downlink assignment and the associated HARQ information as the configured downlink assignment and/or may initialize the configured downlink assignment to start in the associated PDSCH duration and recur, for example, if the NDI in the received HARQ information is 0 (or any other value) and/or if PDCCH content indicates an SPS activation.

The wireless device (e.g., the MAC entity of the wireless device) may receive a TB according to a configured downlink assignment. The wireless device may instruct/cause (e.g., the physical layer of the wireless device) to receive, in the PDSCH duration, the TB on/via the DL-SCH, for example, for a serving cell and the configured downlink assignment (if configured and activated) and/or if a PDSCH duration of the configured downlink assignment does not overlap with a second PDSCH duration of a downlink assignment received on/via a PDCCH. The wireless device (e.g., the MAC entity of the wireless device) may deliver/send the TB to the HARQ entity of the wireless device. The wireless device (e.g., the MAC entity of the wireless device) may set a HARQ Process ID to the HARQ Process ID associated with the PDSCH duration. The wireless device (e.g., the MAC entity of the wireless device) may determine the NDI bit for the corresponding HARQ process to have been toggled. The wireless device (e.g., the MAC entity of the wireless device) may indicate the presence of the configured downlink assignment and deliver/send the stored HARQ information (e.g., to the HARQ entity).

A wireless device and/or a base station may determine an HARQ process for a configured downlink assignment and/or an uplink grant. For a configured downlink assignment, a wireless device and/or a base station may determine a HARQ Process ID associated with a slot in which the downlink transmission starts as: HARQ Process ID=[floor(CURRENT_slot×10/(numberOfSlotsPerFrame×periodicity))] modulo nrofHARQ-Processes, where CURRENT_slot=[(SFN×numberOfSlotsPerFrame)+slot number in the frame], SFN may be a system frame number of the slot, and numberOfSlotsPerFrame may refer to the number of consecutive slots per frame. A quantity/number of HARQ processes (e.g., nrofHARQ-Processes) may be the maximum quantity/number of parallel HARQ processes configured by an RRC message. For a downlink assignment (dynamic) received in DCI via a PDCCH, the wireless device may obtain the HARQ Process ID associated with a TB from a HARQ Process ID field of the DCI. A base station may set a value of the HARQ Process ID field of the DCI indicating a HARQ Process ID for the associated TB.

A wireless device (e.g., the MAC entity of the wireless device) may comprise a HARQ entity for each serving cell, which may maintain a number of parallel HARQ processes (e.g., as shown in FIG. 23). Each HARQ process may be associated with a HARQ process identifier (ID). The wireless device (e.g., the HARQ entity of the wireless device) may direct/deliver/send HARQ information and associated TBs received on/via the DL-SCH to corresponding HARQ processes. A HARQ process may support one TB, for example, if a physical layer of the wireless device is not configured for downlink spatial multiplexing. The HARQ process may support one or two TBs, for example, if the physical layer is configured for downlink spatial multiplexing.

A PDSCH parameter (e.g., the parameter pdsch-AggregationFactor) may indicate a quantity/number of transmissions of a TB. The PDSCH parameter may indicate the quantity/number of transmissions of a TB (e.g., within a bundle of the downlink assignment), for example, if the wireless device (e.g., the MAC entity of the wireless device) is configured with the PDSCH parameter satisfying a first value (e.g., pdsch-AggregationFactor>1). Bundling operation may rely on the wireless device (e.g., the HARQ entity of the wireless device) for invoking the same HARQ process for each transmission that is part of the same bundle. The base station may perform a quantity/number of (e.g., pdsch-AggregationFactor−1) HARQ retransmissions within a bundle, for example, after the initial transmission.

The wireless device (e.g., the MAC entity of the wireless device) may allocate TB(s) received from the physical layer and the associated HARQ information to the HARQ process indicated by the associated HARQ information, for example, if a downlink assignment has been indicated. The wireless device (e.g., the HARQ process of the wireless device) may receive one or two TBs (e.g., in case of downlink spatial multiplexing), or any other quantity of TBs, and/or may receive the associated HARQ information (e.g., from the HARQ entity of the wireless device), for example, if a transmission takes place for a HARQ process. For each received TB and the associated HARQ information, the wireless device (e.g., the HARQ process of the wireless device) may determine a transmission to be a new transmission, for example, if an NDI has been toggled compared to a value of a previous received transmission corresponding to the TB, and/or if the transmission is the first received transmission for the TB (e.g., if there is no previous NDI for the TB); otherwise the HARQ process may determine the transmission to be a retransmission. The wireless device (e.g., the MAC entity of the wireless device) may attempt to decode received data of the TB, for example, based on the transmission being a new transmission. The wireless device (e.g., the MAC entity of the wireless device) may combine (e.g., instruct/cause the physical layer to combine) the received data with the data currently in the soft buffer for the TB and attempt to decode the combined data, for example, based on the transmission being a retransmission, if the data for the TB has not been successfully decoded. The wireless device may not successfully decode the TB, for example, if checking cyclic redundancy check (CRC) bits of the received data fails. The wireless device (e.g., the MAC entity of the wireless device) may deliver/send the decoded MAC PDU (e.g., to a disassembly and demultiplexing entity of the wireless device), for example, if the data which the wireless device (e.g., the MAC entity) attempted to decode is successfully decoded for the TB, and/or if the data for the TB was successfully decoded before; otherwise the wireless device (e.g., the MAC entity) may replace (e.g., instruct/cause the physical layer to replace) the data in a buffer (e.g., the soft buffer for the TB) with the data which the wireless device (e.g., the MAC entity) attempted to decode. The wireless device (e.g., the MAC entity) may generate (e.g., instruct/cause the physical layer to generate) acknowledgement(s) for the data in the TB.

Figure 25:
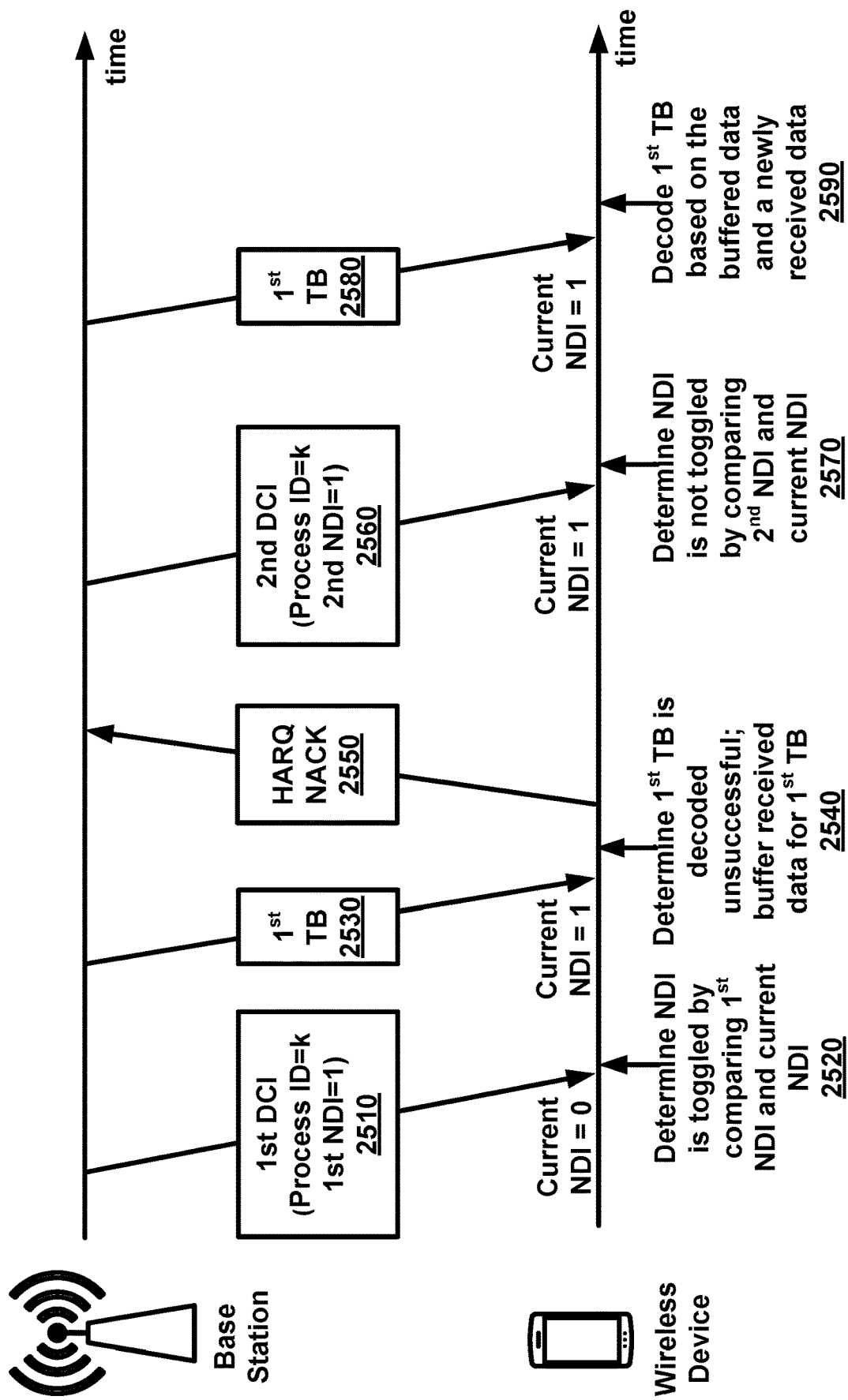
FIG. 25 shows an example downlink (re)transmission.

FIG. 25 shows an example downlink (re)transmission. The downlink (re)transmission mechanism may be based on a HARQ procedure. A base station may send/transmit, to a wireless device, first DCI comprising a downlink assignment and HARQ information (e.g., at step 2510). The HARQ information may comprise a HARQ process ID (e.g., Process ID=k as shown in FIG. 25), a first NDI value (e.g., 1st NDI=1), and/or the like. The wireless device (e.g., the physical layer of the wireless device) may receive the data of a first TB, for example, based on the downlink assignment. Before receiving the first DCI, the wireless device may have a current NDI value (e.g., Current NDI=0 as shown in FIG. 25). The wireless device may determine that the first NDI has been toggled, for example, based on (e.g., after or in response to) receiving the first DCI. The wireless device may determine that the first NDI has been toggled (e.g., at step 2520), for example, based on the first NDI value (e.g., 1) being different from the current NDI value (e.g., 0). The wireless device may receive the first TB (e.g., at step 2530). The wireless device (e.g., the MAC entity of the wireless device) may determine a transmission of the first TB to be a new transmission, and attempt to decode the received data of the first TB, for example, based on the first NDI being toggled. The wireless device (e.g., the MAC entity of the wireless device) may not successfully decode the received data (e.g., at step 2540). The wireless device (e.g., the MAC entity of the wireless device) may replace (e.g., instruct/cause the physical layer of the wireless device to replace) a soft buffer for the first TB with the data which the wireless device (e.g., the MAC entity of the wireless device) attempted to decode (e.g., at step 2540), for example, based on (e.g., after or in response to) not successfully decoding the received data. The wireless device (e.g., the MAC entity of the wireless device) may generate (e.g., instruct/cause the physical layer to generate) a negative acknowledgement (NACK) for the data in the first TB. The wireless device may send/transmit the NACK to the base station (e.g., at step 2550), for example, based on (e.g., after or in response to) not successfully decoding the received data. The base station may send/transmit second DCI indicating a retransmission of the first TB (e.g., at step 2560), for example, based on (e.g., after or in response to) receiving the NACK. The second DCI may comprise a HARQ process ID, which may be the same as the first HARQ process ID, a second downlink assignment, an RV value, and/or a second NDI value (e.g., 2nd NDI=1). The wireless device may determine that the second NDI is not toggled (e.g., at step 2570), for example, based on the second NDI value (e.g., 1) being equal to the first NDI value (e.g., 1). The second NDI value may become the new current NDI value. The wireless device (e.g., the physical layer of the wireless device) may receive the data of the retransmitted first TB (e.g., at step 2580), for example, via the second downlink assignment. The wireless device (e.g., the MAC entity of the wireless device) may determine the transmission via the second downlink assignment to be a retransmission of the first TB, for example, based on the second NDI not being toggled. The wireless device may attempt to decode the first TB (e.g., at step 2590), for example, based on the newly received data of the first TB and/or the current data in a buffer (e.g., the soft buffer associated with the HARQ process indicated/identified by HARQ Process ID k).

The wireless device (e.g., the MAC entity of the wireless device) may successfully decode the received data of the first TB. The wireless device (e.g., the MAC entity of the wireless device) may deliver/send a decoded data (e.g., a MAC PDU) to a disassembly and demultiplexing entity of the wireless device, for example, based on (e.g., after or in response to) successfully decoding the received data. The wireless device (e.g., the MAC entity of the wireless device) may generate (e.g., instruct/cause the physical layer to generate) an acknowledgement (ACK) for the data in the first TB. The wireless device may send/transmit, to the base station, the ACK for the first TB.

The wireless device may process downlink TBs associated with multiple HARQ processes in a way of in-order processing (e.g., a pipeline processing). The wireless device may process the downlink TBs, for example, if the wireless device is capable of in-order processing and the multiple HARQ processes are supported in the wireless device. For any two HARQ processes (e.g., HARQ process A and HARQ process B) for a given cell, the wireless device may not be required to send/transmit second HARQ-ACK information for the HARQ process B before sending/transmitting first HARQ-ACK information for the HARQ process A, for example, in in-order processing. The wireless device may not be required to send/transmit the second HARQ-ACK information for the HARQ process B before sending/transmitting the first HARQ-ACK information for the HARQ process A, for example, if a scheduled unicast PDSCH transmission for the HARQ process A comes before a scheduled unicast PDSCH transmission for the HARQ process B. In a pipeline processing, a wireless device may process a first TB associated with a HARQ process A and may send/transmit first HARQ-ACK information for the first TB before processing the second TB. The wireless device may process the second TB associated with HARQ process B and generate second HARQ-ACK information for the second TB, for example, after processing the first TB and sending/transmitting the first HARQ-ACK information for the first TB. The in-order processing may reduce implementation complexity of the wireless device.

A wireless device may be required to be capable of out-of-order processing (e.g., to reduce HARQ feedback delay and/or data transmission latency), for example, if the wireless device supports a low-latency data service. A low-latency data service may comprise at least one of: ultra-reliable low-latency communication (URLLC), industrial internet of things (JOT), vehicle to everything (V2X) communication, enhanced URLLC, and/or any other communications such as those compatible with one or more 3GPP releases or any other communication technologies.

Figure 26A:
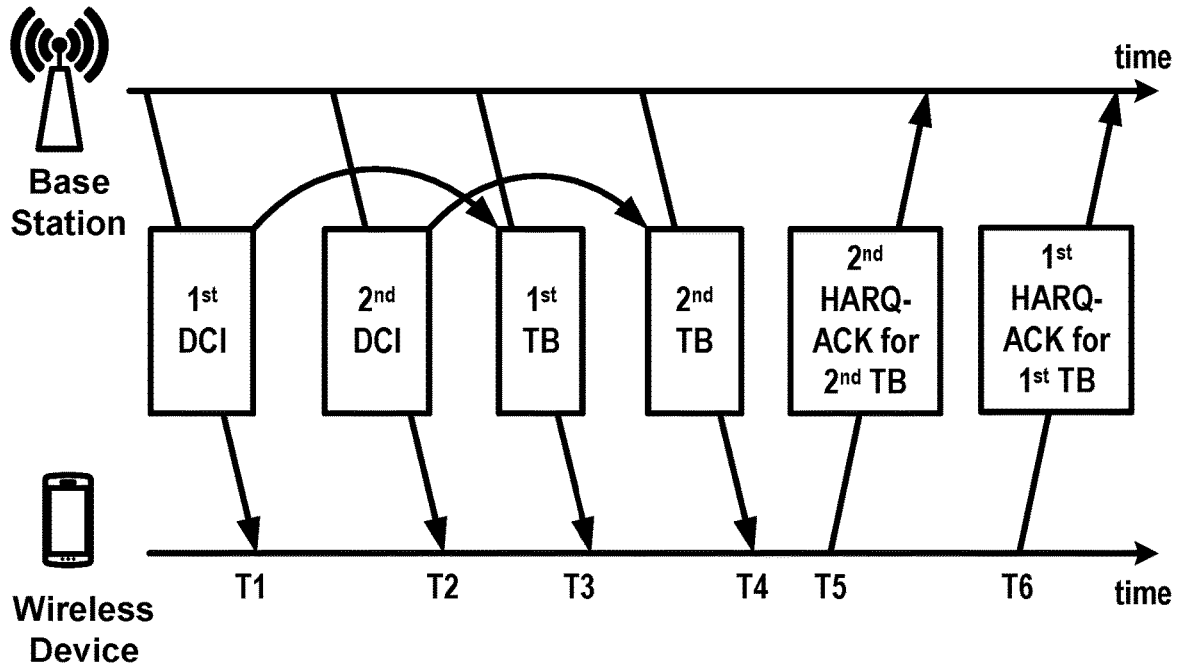
FIG. 26A and FIG. 26B show examples of out-of-order processing.

FIG. 26A shows an example of out-of-order processing. Out-of-order processing may comprise an in-order scheduling and an out-of-order HARQ processing. As shown in FIG. 26A, a wireless device may receive at least a portion of first DCI scheduling a first TB (e.g., at or during a time period T1) before receiving at least a portion of second DCI scheduling a second TB (e.g., at or during a time period T2). The first DCI and/or the second DCI, comprising a CRC scrambled by a C-RNTI, may indicate a dynamic downlink scheduling (or any other scheduling). The first DCI and/or the second DCI, comprising a CRC scrambled by a CS-RNTI, may indicate a semi-persistent scheduling (or any other scheduling). The first TB may be associated with a first HARQ process. The second TB may be associated with a second HARQ process. The first DCI may indicate a first HARQ process ID of the first HARQ process. The second DCI may indicate a second HARQ process ID of the second HARQ process. The wireless device may receive at least a portion of the first TB (e.g., at or during a time period T3) before receiving at least a portion of the second TB (e.g., at or during a time period T4). The first and second TB may be referred to as in-order scheduled, for example, because the first TB scheduled by the first received first DCI may be received before the second TB scheduled by the second received second DCI, which may be received after receiving the first DCI. TBs may be referred to as in-order scheduled if the TBs are scheduled to be received in the same order that their respective scheduling DCI messages are received. As shown in FIG. 26A, the wireless device may send/transmit an uplink signal comprising second HARQ-ACK information for the second TB (e.g., at or during a time period T5) before sending/transmitting an uplink signal comprising first HARQ-ACK information for the first TB (e.g., at or during a time period T6). The first and second HARQ-ACK information may be referred to as out-of-order HARQ processed, for example, because the second HARQ-ACK information for the second TB scheduled by the second DCI may be sent/transmitted before the first HARQ-ACK information for the first TB scheduled by the first DCI. HARQ-ACK information may be referred to as out-of-order HARQ processed if the HARQ-ACK information is sent/transmitted in a different order than the DCI messages, which schedule their respective associated TBs, are received. HARQ-ACK information may be out-of-order HARQ processed if the HARQ-ACK information is sent/transmitted in a different order than their respective associated TBs are received. By using in-order scheduling and out-of-order HARQ processing, advantages may be achieved such as a base station and a wireless device may improve/reduce latency (e.g., reduce URLLC transmission latency).

Figure 26B:
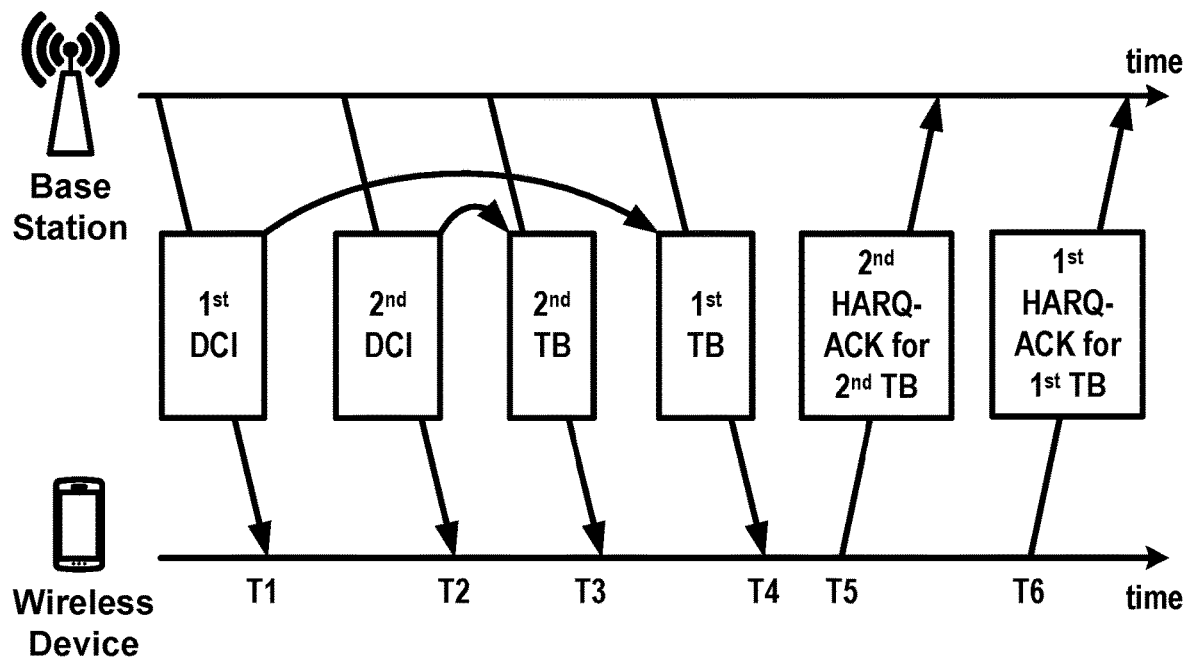

FIG. 26B shows an example of out-of-order processing. An in-order scheduling may reduce scheduling flexibility of a base station. A base station and/or a wireless device may implement an out-of-order scheduling, for example, to improve scheduling flexibility and reduce URLLC transmission latency. The out-of-order processing may comprise an out-of-order scheduling and/or an out-of-order HARQ processing. The out-of-order processing may comprise an out-of-order scheduling and an in-order HARQ processing. The out-of-order processing may comprise an in-order scheduling and an out-of-order HARQ processing. As shown in FIG. 26B, a wireless device may receive at least a portion of first DCI scheduling a first TB (e.g., at or during a time period T1) before receiving at least a portion of second DCI scheduling a second TB (e.g., at or during a time period T2). The first TB may be associated with a first HARQ process. The second TB may be associated with a second HARQ process. The first DCI may indicate a first HARQ process ID of the first HARQ process. The second DCI may indicate a second HARQ process ID of the second HARQ process. The wireless device may receive at least a portion of the second TB (e.g., at or during a time period T3) before receiving at least a portion of the first TB (e.g., at or during a time period T4). The first and second TB may be referred to as out-of-order scheduled because the first TB scheduled by the first received first DCI is received after the second TB scheduled by the second received second DCI, which was received after receiving the first DCI. As shown in FIG. 26B, the wireless device may send/transmit second HARQ-ACK information for the second TB (e.g., at or during a time period T5), for example, before sending/transmitting first HARQ-ACK information for the first TB (e.g., at or during a time period T6). The first and second HARQ-ACK information may be referred to as out-of-order HARQ processed. The first and second HARQ-ACK information may be out-of-order HARQ processed, for example, because the second HARQ-ACK information for the second TB scheduled by the second DCI may be sent/transmitted before the first HARQ-ACK information for the first TB scheduled by the first DCI and the first DCI may be received before receiving the second DCI. HARQ-ACK information may be referred to as out-of-order HARQ processed, for example, if the order of sending/transmitting the HARQ-ACK information associated with the first TB (and/or the first DCI) and the HARQ-ACK information associated with the second TB (and/or the second DCI) is different from the order of receiving the first DCI and the second DCI.

HARQ-ACK information may be out-of-order HARQ processed. HARQ-ACK information may be out-of-order HARQ processed, for example, if the order of sending/transmitting the HARQ-ACK information associated with the first TB and the HARQ-ACK information associated with the second TB is different from the order of receiving their respective associated TBs. The wireless device may send/transmit first HARQ-ACK information for the first TB (e.g., at or during a time period T5), for example, before sending/transmitting second HARQ-ACK information for the second TB (e.g., at or during a time period T6). The first and second HARQ-ACK information may be referred to as out-of-order HARQ processed, for example, because the first HARQ-ACK information for the first TB scheduled by the first DCI may be sent/transmitted before the second HARQ-ACK information for the second TB scheduled by the second DCI and the second TB may be received before receiving the first TB. By using out-of-order scheduling and/or out-of-order HARQ processing, a base station and a wireless device may improve scheduling flexibility and/or transmission latency.

An out-of-order scheduling may be similarly implemented as an out-of-order grant in uplink transmission. A wireless device may receive first DCI indicating a first uplink TB transmission via a first PUSCH and second DCI indicating a second uplink TB transmission via a second PUSCH. The first uplink TB may be associated with a first HARQ process. The second uplink TB may be associated with a second HARQ process. The wireless device may receive the first DCI before receiving the second DCI. The wireless device may be required to transmit the second TB via the second PUSCH before transmitting the first TB via the first PUSCH. Transmitting the second TB before transmitting the first TB, and receiving the first DCI before the second DCI, may be referred to as an out-of-order grant. The wireless device may be capable of processing an out-of-order grant. The wireless device may reduce uplink transmission latency, for example, if the out-of-order grant is used for sending/transmitting an urgent data packet (e.g., URLLC, industrial IOT, V2X communication, sidelink communication, or enhanced URLLC in future 3GPP releases or any other communications). As further described herein, out-of-order processing, out-of-order scheduling, out-of-order grant, and/or out-of-order HARQ processing may be performed for a configuration of multiple TRPs, a configuration of different CORESET groups, a configuration of multiple antenna panels, and/or a configuration of any other multiple/different resources, devices, functions, etc.

Figure 27:
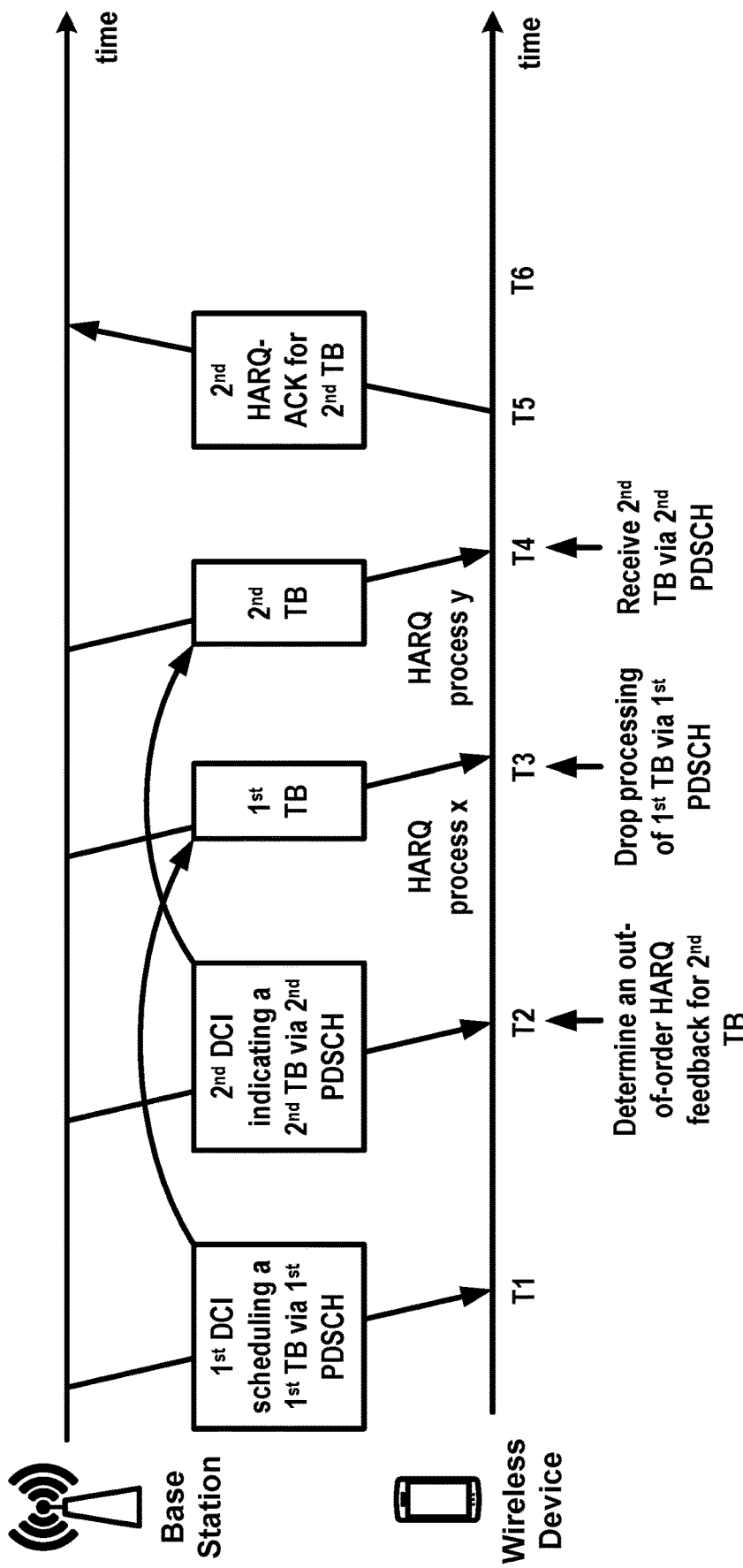
FIG. 27 shows an example of a prioritization for HARQ processing.

FIG. 27 shows an example of a prioritization for HARQ processing. Out-of-order processing may increase implementation complexity of a wireless device and/or a base station. The wireless device may prioritize processing of one TB over another (e.g., by dropping the processing of a low-priority TB), for example, to reduce the implementation complexity of the wireless device. Dropping information/ data or the dropping the processing of information/data may comprise, for example, at least one of: ignoring the information/data; stopping processing the information/data; avoiding processing the information/data; not storing the information/data; not configuring to receive the information/ data; not receiving the information/data; not scheduling to receive the information/data; skipping allocating the information/data to a resource/process; skipping decoding the information/data; skipping generating an ACK or NACK for the information/data; not sending (e.g., dropping) a HARQ-ACK, refraining from a channel estimation associated with the information/data; refraining from decoding and/or demodulating the information/data; refraining from buffering received data for the information/data; and/or clearing a buffered data associated with the information/data, etc. As shown in FIG. 27, a wireless device may receive first DCI scheduling a first TB via a first PDSCH (e.g., at or during a time period T). The wireless device may receive second DCI scheduling a second TB via a second PDSCH (e.g., at or during a time period T2). The first DCI may indicate a first HARQ-ACK transmission timing for the first TB associated with a first HARQ process (e.g., HARQ process x). The second DCI may indicate a second HARQ-ACK transmission timing for the second TB associated with a second HARQ process (e.g., HARQ process y). The scheduling of the first TB and the second TB may be an in-order scheduling (e.g., as shown in FIG. 27) or an out-of-order scheduling. The wireless device may determine a second HARQ-ACK information transmission for the second TB is out-of-order compared with a first HARQ-ACK information transmission for the first TB, for example, based on the first DCI received before receiving the second DCI. The out-of-order HARQ processing may comprise sending/transmitting the second HARQ-ACK information for the second TB (e.g., at or during a time period T5) before sending/transmitting the first HARQ-ACK information for the first TB (e.g., at or during a time period T6). The wireless device may drop and/or not process the first TB (e.g., at or during a time period T3), for example, based on the determining that the second HARQ-ACK information transmission is out-of-order compared with the first HARQ-ACK information transmission. Dropping and/or not processing the first TB may comprise, for example, at least one of: ignoring the first TB; stopping processing the first TB; avoiding processing the first TB; not storing the first TB; not configuring to receive the first TB; not receiving the first TB; not scheduling to receive the first TB; skipping allocating the first TB to a resource/process; skipping decoding the first TB; skipping generating an ACK or NACK for the first TB; refraining from a channel estimation of the first PDSCH based on a DM-RS of the first PDSCH; refraining from decoding and/or demodulating the first TB; refraining from buffering the received data for the first TB; and/or clearing a buffered data for the first HARQ process, etc. The wireless device may receive and/or process the second TB via the second PDSCH (e.g., at or during a time period T4), for example, based on dropping and/or not processing the first TB. The wireless device may generate second HARQ-ACK information for the second TB and send/transmit the second HARQ-ACK information to the base station (e.g., at or during the time period T5). The second HARQ-ACK information may comprise a positive acknowledgement, for example, based on (e.g., after or in response to) successfully decoding the second TB. The second HARQ-ACK information may comprise a negative acknowledgement, for example, based on (e.g., after or in response to) unsuccessfully decoding the second TB. The wireless device may generate first HARQ-ACK information for the first TB and may send/transmit the first HARQ-ACK information to the base station (e.g., at or during the time period T6) (not shown). The first HARQ-ACK information may comprise a negative acknowledgment, for example, based on (e.g., after or in response to) dropping the reception of the first TB. Dropping processing of a low-priority data packet for the purpose of reducing processing latency for a high-priority data packet may simplify implementation of a wireless device, reduce power consumption of the wireless device, and/or reduce cost of the wireless device, for example, if out-of-order processing (e.g., out-of-order scheduling, out-of-order HARQ processing, and/or out-of-order grant) is supported. Omitting to specify/indicate whether processing of a low-priority data packet is dropped may result in misalignment of the wireless device's behavior on the processing of the low-priority data packet, increase signaling overhead, and/or reduce system throughput. Dropping processing of a low-priority data packet may be specified/indicated to align with a base station regarding the behavior of the wireless device for the low-priority data packet, for example, if out-of-order processing is supported.

A wireless device may drop processing of a low-priority TB, for example, in at least some types of communications (e.g., communications by wireless devices compatible with 3GPP Release [15], earlier/later 3GPP releases, and/or any other access technologies). A wireless device may drop processing of a low-priority TB (e.g., a first TB as shown in FIG. 26A, FIG. 26B, and FIG. 27), for example, if the wireless device performs out-of-order processing. A wireless device may automatically support out-of-order HARQ processing, for example, if the wireless device is capable of carrier aggregation and/or MIMO processing. A wireless device may process the low-priority TB (e.g., the first TB as shown in FIG. 26A, FIG. 26B, and FIG. 27), for example, if the wireless device is performing the out-of-order processing. A wireless device may process the low-priority TB, in addition to processing the high-priority TB, for example, if the wireless device is capable of processing an out-of-order scheduling and/or an out-of-order HARQ-ACK feedback (e.g., by using carrier aggregation capability and/or MIMO capability). Reliance (e.g., overreliance) on CA and/or MIMO capability to support out-of-order processing may increase device implementation cost and/or power consumption (e.g., if a low-price wireless device may not be capable of CA processing and/or MIMO processing). Dropping processing of a low-priority TB, without considering some cases if a low-priority TB requires less processing complexity and/or time than a high-priority TB, may reduce system throughput. A wireless device may not be required to send/transmit a HARQ-ACK feedback for a TB. A wireless device may be allowed to delay a HARQ-ACK feedback for the TB. The HARQ-ACK feedback not being required, or the HARQ-ACK feedback being allowed to be delayed, may relax out-of-order processing. Dropping processing of the low-priority TB without considering a HARQ-ACK processing requirement for a TB may result in a reduction of system throughput. Processing of the low-priority TB using CA capability and/or MIMO capability without considering a HARQ-ACK processing requirement for the low-priority TB may result in a reduction of system throughput, and/or increase power consumption or implementation cost. As described further herein, out-of-order processing may be improved, for example, if a HARQ-ACK processing requirement for a TB is relaxed. Various configurations described herein may improve system throughput and/or data transmission latency, or reduce power consumption of the wireless device and/or implementation cost.

Figure 28:
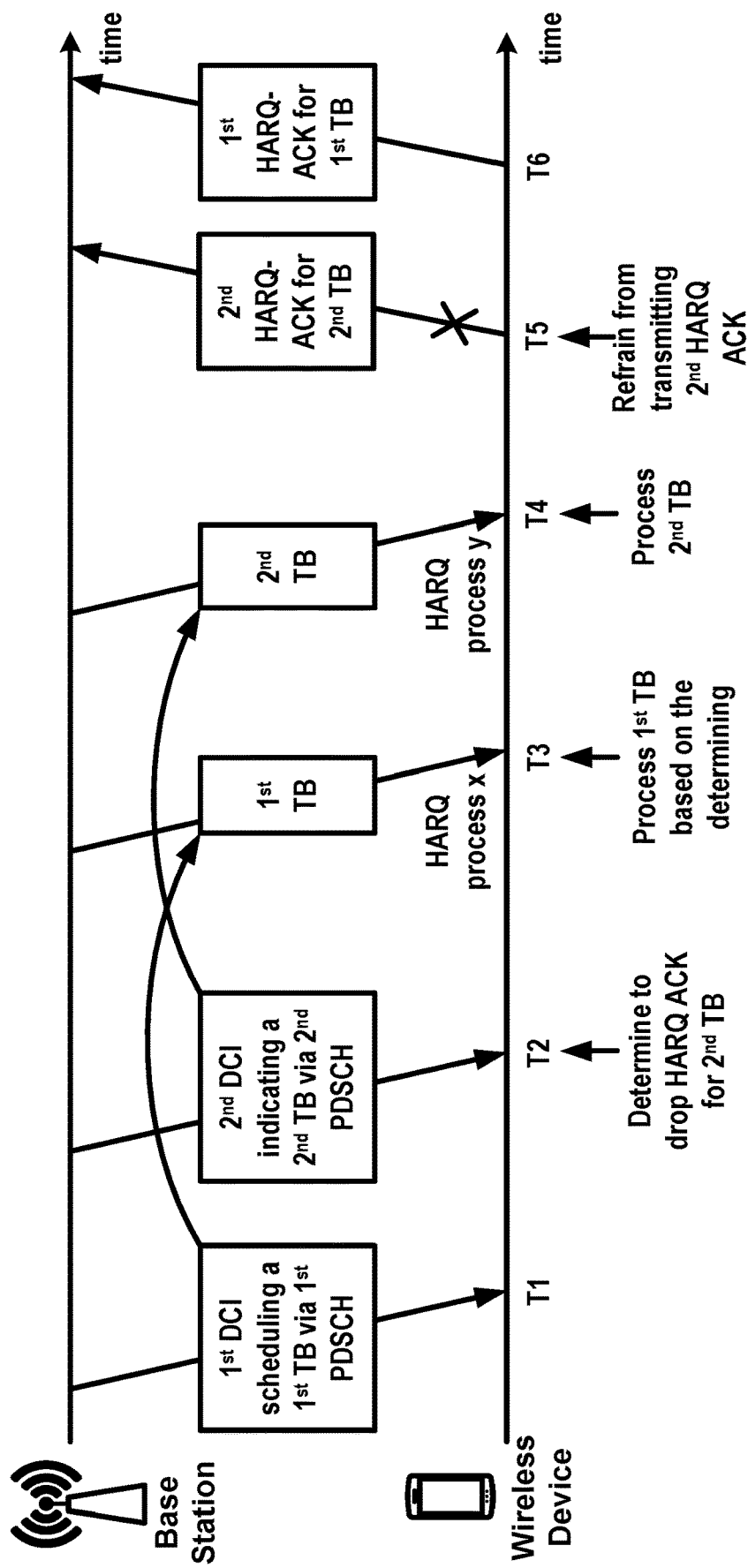
FIG. 28 shows an example of out-of-order processing.

FIG. 28 shows an example of out-of-order processing. A wireless device may receive (e.g., at or during a first time interval T1) at least a portion of first DCI indicating a PDSCH resource for transmission of a first TB. A time interval may be a symbol in a slot, a slot in a radio frame, a mini-slot in a slot/radio frame, or any other time interval/duration/period. The first DCI may indicate a time of the transmission of the first TB. The first DCI may indicate that at least a portion of the transmission of the first TB occurs at or during a third time interval T3. The first DCI may indicate a first HARQ process (e.g., HARQ process x) associated with the first TB. The first DCI may indicate a first HARQ-ACK feedback timing value for the first TB. The first HARQ-ACK feedback timing value may indicate that the wireless device is required to transmit/provide the first HARQ-ACK information at or during a sixth time interval T6. The wireless device may receive (e.g., at or during a second time interval T2) at least a portion of second DCI indicating a PDSCH resource for transmission of a second TB. The second DCI may indicate a time of the transmission of the second TB. The second DCI may indicate that at least a portion of the transmission of the second TB occurs at or during a fourth time interval T4. The second DCI may indicate a second HARQ process (e.g., HARQ process y) associated with the second TB. The second DCI may indicate a second HARQ-ACK feedback timing value for the second TB. The second HARQ-ACK feedback timing value may indicate that the wireless device is required to transmit/provide the second HARQ-ACK information at or during a fifth time interval T5. The second time interval T2 may occur a number of time intervals after the first time interval T1. The fourth time interval T4 may occur a number of time intervals after the third time interval T3. The sixth time interval T6 may occur a number of time intervals after the fifth time interval T5. The second TB may arrive before the first TB, for example, if an out-of-scheduling is supported (e.g., the second TB may arrive at or during the third time interval T3 and the first TB may arrive at or during the fourth time interval T4). The wireless device may, based on the first DCI and the second DCI, determine that a second HARQ-ACK feedback for the second TB is out-of-order, compared with the first HARQ-ACK feedback for the first TB. The wireless device may determine that the second HARQ-ACK feedback for the second TB is out-of-order, for example, based on the second HARQ-ACK feedback being scheduled to be sent/transmitted before transmitting the first HARQ-ACK feedback. The first TB may be referred to as a low-priority TB. The second TB may be referred to as a high-priority TB.

The wireless device may determine to drop a transmission of the second HARQ-ACK feedback for the second TB. The wireless device may determine that the second HARQ-ACK feedback for the second TB is not required. The wireless device may determine to drop a transmission of the second HARQ-ACK feedback for the second TB, for example, based on the second TB being scheduling by a group common DCI (e.g., a group common DCI with CRC scrambled by an RNTI addressed to a group of wireless devices). The wireless device may determine to drop a transmission of the second HARQ-ACK feedback for the second TB, for example, based on the second TB of a random access procedure (e.g., Msg 4 1314 for a random access procedure). The wireless device may determine to drop a transmission of the second HARQ-ACK feedback for the second TB, for example, based on a time gap between the fourth time interval T4 and the fifth time interval T5 being less than a HARQ-ACK processing time threshold (e.g., Tproc,1). The HARQ-ACK processing time threshold may be determined, for example, based on a PDSCH processing time capability parameter and one or more system configuration parameters configured in an RRC message. The RRC message may comprise at least one of: ServingCellConfig 1E; CellGroupConfig 1E; an RRCSetup message; and/or an RRCReconfiguration message. The PDSCH processing time capability parameter may be a PDSCH processing time (N1) for a PDSCH processing capability type (e.g., type 1, type 2, or the like) for a numerology index (u=0, 1, 2, or 3). The one or more system configuration parameters may comprise: a numerology index; an OFDM signal sample length (Tc=1/($\Delta f$ max*Nf), where $\Delta f$ max=480*10^3 Hz and Nf=4096); a number value (d1,1 being one of 0, 1, 2, ..., m, m is an integer) based on a PDSCH DM-RS location and/or a number of PDSCH OFDM symbols in a slot. Tproc, 1=(N1+d1, 1)(2048+144)*k*2^(−u)*Tc, where k=64, for example. A wireless device may determine to drop a transmission of the second HARQ-ACK feedback for the second TB, for example, based on: the second DCI not comprising a HARQ-ACK feedback timing value and/or the HARQ-ACK feedback timing value of the second DCI being set to a predefined value.

The wireless device may process the first TB (e.g., at or during the third time interval T3) and/or process the second TB (e.g., at or during the fourth time interval T4), for example, based on (e.g., after or in response to) determining dropping transmission of the second HARQ-ACK feedback for the second TB. Processing the first TB may comprise at least one of: receiving data symbols of the first TB via the first PDSCH, performing a channel estimation for the first TB based on a DM-RS of the first PDSCH, demodulating and decoding of the received data symbols of the first TB, buffering the received data symbols for the first TB, and/or generating the first HARQ-ACK information for the first TB. The wireless device may process the second TB. Processing the second TB may comprise at least one of: receiving data symbols of the second TB via the second PDSCH, performing a channel estimation for the second TB based on a DM-RS of the second PDSCH, demodulating and decoding of the received data symbols of the second TB, and/or not generating the second HARQ-ACK information for the second TB. The wireless device may not transmit (e.g., may refrain from transmitting) the second HARQ-ACK information for the second TB (e.g., at or during the fifth time interval T5), for example, based on processing the second TB. The wireless device may send/transmit the first HARQ-ACK information for the first TB (e.g., at or during the sixth time interval T6), for example, based processing the first TB. The wireless device may process both high-priority TB and low-priority TB (e.g., without dropping the processing of the low-priority TB), for example, based on (e.g., after or in response to) determining dropping of a HARQ-ACK feedback for the high-priority TB. The wireless device may process the high-priority TB and/or drop processing of the low-priority TB, for example, based on (e.g., after or in response to) determining transmitting of an out-of-order HARQ feedback for the high-priority TB. Dropping (or not dropping) processing of a low-priority TB based on determining whether to transmit an out-of-order HARQ feedback for a high-priority TB may reduce misalignment between a base station and a wireless device regarding processing of the low-priority TB and/or may improve system throughput and/or data transmission latency. As described further herein, out-of-order processing, out-of-order scheduling, out-of-order grant, and/or out-of-order HARQ processing may be performed for a configuration of multiple TRPs, a configuration of multiple CORESET groups, a configuration of multiple antenna panels, and/or a configuration of any other multiple/different resources, devices, functions, etc.

Figure 29:
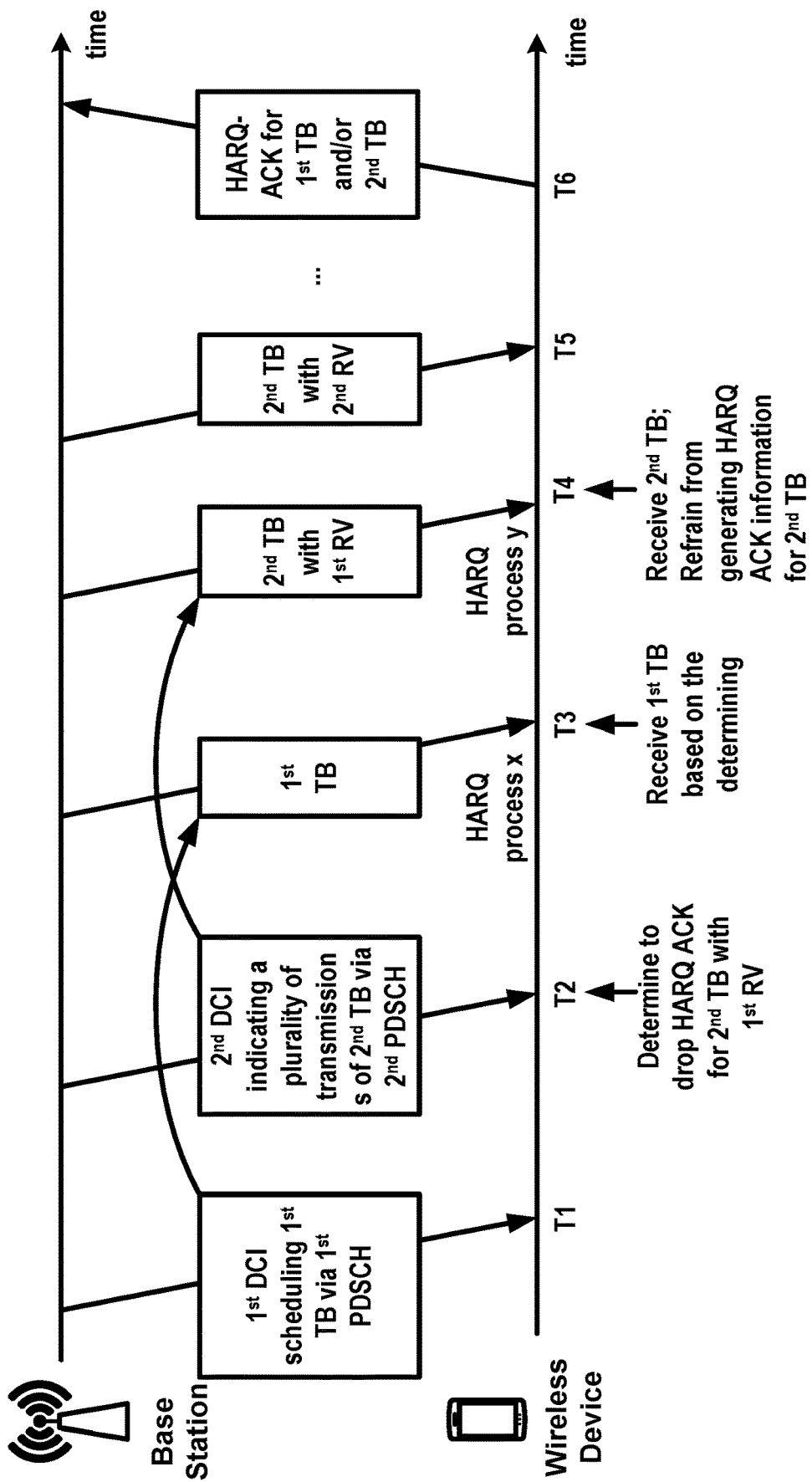
FIG. 29 shows an example out-of-order processing.

FIG. 29 shows an example of out-of-order processing. The out-of-order processing may comprise out-of-order HARQ processing, for example, in a configuration in which semi-persistent scheduling is supported. A wireless device may receive (e.g., at or during a first time interval T1) at least a portion of first DCI indicating a PDSCH resource for transmission of a first TB. The first DCI may indicate a time of the transmission of the first TB. The first DCI may indicate that the transmission of at least a portion of the first TB occurs at or during a third time interval T3. The first DCI may indicate a first HARQ process (e.g., HARQ process x) associated with the first TB. The first DCI may indicate a first HARQ-ACK feedback timing value for the first TB. The first HARQ-ACK feedback timing value may indicate that the wireless device is required to send/transmit the first HARQ-ACK information at or during a sixth time interval T6.

The wireless device may receive (e.g., at or during a second time interval T2 at least a portion of second DCI indicating a plurality of PDSCH resources for transmission repetitions of a second TB. The second DCI may indicate a first transmission of the second TB with a first redundancy version (RV) and/or a second transmission of the second TB with a second RV. The second DCI may indicate that the first transmission of the second TB with the first RV occurs at or during a fourth time interval T4, and/or that the second transmission of the second TB with the second RV occurs at or during a fifth time interval T5. The second DCI may indicate a second HARQ process (e.g., HARQ process y) associated with the second TB. The second DCI may indicate a second HARQ-ACK feedback timing value for the second TB. The second HARQ-ACK feedback timing value may indicate that the wireless device is required to send/transmit the second HARQ-ACK information at or during a quantity/number of time intervals after the wireless device processes the second TB (e.g., the first transmission of the second TB, and/or the second transmission of the second TB). The second time interval T2 may occur a quantity/number of time intervals after the first time interval T1. The fourth time interval T4 may occur a quantity/number of time intervals after the third time interval T3. The second TB may arrive before the first TB, for example, if an out-of-scheduling is supported (e.g., the second TB may arrive at or during the third time interval T3 and the first TB may arrive at or during the fourth time interval T4. The wireless device may, based on the first DCI and the second DCI, determine that a second HARQ-ACK feedback for the first transmission of the second TB is out-of-order, compared with the first HARQ-ACK feedback for the first TB. The wireless device may determine that the second HARQ-ACK feedback for the first transmission of the second TB is out-of-order, for example, based on the reception orders of the first DCI and the second DCI. The wireless device may determine that the second HARQ-ACK feedback for the first transmission of the second TB is out-of-order, for example, based on the second HARQ-ACK feedback being scheduled to be sent/transmitted before sending/transmitting the first HARQ-ACK feedback. The wireless device may, based on the first TB and the second TB, determine that the second HARQ-ACK feedback for the first transmission of the second TB is out-of-order, compared with the first HARQ-ACK feedback for the first TB. The wireless device may determine that the second HARQ-ACK feedback for the first transmission of the second TB is out-of-order, for example, based on the reception orders of the first TB and the second TB and/or based on the second HARQ-ACK feedback being scheduled to be sent/transmitted before sending/transmitting the first HARQ-ACK feedback. The first TB may be referred to as a low-priority TB. The second TB may be referred to as a high-priority TB.

The wireless device may determine to not generate (e.g., refrain from generating) HARQ-ACK information for the second TB, for example, based on determining that the second HARQ-ACK feedback for a first repetition of a second TB is out-of-order, and/or if there is a lower-priority TB pending for processing. The wireless device may generate the second HARQ-ACK information for the second TB, for example, after receiving a second repetition of the second TB (e.g., at or during the fifth time interval T5). The wireless device may process the first TB, for example, based on determining to not generate (e.g., refrain from generating) HARQ-ACK information for the second TB. The wireless device may send/transmit HARQ-ACK information for the first TB and/or the second TB (e.g., at or during a sixth time interval T6), for example, based on the processing the first TB and the second TB. Various configurations described herein may improve system throughput and/or data transmission latency, or reduce power consumption of the wireless device and/or implementation cost.

A base station may send/transmit, to a wireless device, DCI comprising a priority field indicating a prioritized PDSCH transmission. The base station may send/transmit the DCI comprising a priority field, for example, in at least some types of communications (e.g., communications by wireless devices compatible with 3GPP Release 15, earlier/later 3GPP releases, and/or any other access technologies). The wireless device may determine that processing of a first TB is prioritized over processing of a second TB, for example, based on a first priority value of a priority field in first DCI (e.g., scheduling the first TB) and a second priority value of a priority field in second DCI (e.g., scheduling the second TB). The wireless device may determine that processing of the first TB is prioritized over processing of the second TB, for example, based on the first priority value being higher than the second priority value (e.g., a higher priority value indicates a higher priority). The wireless device may determine that processing of the first TB is prioritized over processing of the second TB, for example, based on the first priority value being lower than the second priority value (e.g., a lower priority value indicates a higher priority). The first DCI and/or the second DCI, different from DCI formats (e.g., DCI format 0_0/0_1, and/or DCI format 1_0/1_1), may comprise the priority field indicating a PDSCH transmission priority or PUSCH transmission priority. The DCI formats may not comprise the priority field indicating the PDSCH transmission priority or the PUSCH transmission priority.

In some types of wireless communications (e.g., compatible with 3GPP Release 16, earlier/later 3GPP releases or generations, and/or other access technology), a wireless device may receive one or more DCI messages that do not comprise a priority field associated with a prioritized PDSCH transmission. A wireless device may determine (or be required) to send/transmit a signal and/or process a signal without having sufficient information to determine an appropriate priority for one or more signal transmissions and/or signal processing. A wireless device may not be able to compare priority values of different channels, data, and/or transmissions, for example, if a priority value for at least one channel, data, and/or transmission is absent and the different channels, data, and/or transmissions overlap with each other and/or share the same resource. The wireless device may receive first DCI comprising a priority field, for example, before receiving second DCI not comprising a priority field (or the wireless device may receive first DCI not comprising a priority field, for example, before receiving second DCI comprising a priority field). The first DCI may indicate a scheduled transmission of a first TB. The second DCI may indicate a scheduled transmission of a second TB. The scheduled transmission of the first TB may occur before the scheduled transmission of the second TB. A second HARQ-ACK feedback for the second TB may be required to be sent/transmitted before sending/transmitting a first HARQ-ACK feedback for the first TB. A wireless device may have difficulties in determining whether to drop processing of a TB, for example, if TBs are scheduled by DCI messages comprising DCI with a priority field and DCI without a priority field, and two HARQ-ACK feedbacks for the TBs are out-of-order. A wireless device may not be able to compare priority values associated with the two DCI messages (e.g., associated with different DCI configurations). As described further herein, improved out-of-order processing may be used/configured, for example, if multiple different DCI formats and out-of-order processing are supported.

As described herein, enhanced data processing may use/comprise processing based on priority. Data processing may be performed based on whether control information comprises a priority field. If control information does not comprise, or lacks, a priority field, at least one parameter may be used to determine a priority associated with the control information. A wireless device may determine a priority value associated with a second channel, second data, and/or a second transmission, for example, if the wireless device determines that a priority value associated with a first channel, first data, and/or a first transmission exists and that a priority value associated with the second channel, the second data, and/or the second transmission does not exist. The wireless device may determine the priority value associated with the second channel, the second data, and/or the second transmission, for example, based on a default value (e.g., zero or any other value) and/or a value determined based on a preset rule. The wireless device may compare the determined priority value associated with the second channel, the second data, and/or the second transmission with the priority value associated with the first channel, first data, and/or the first transmission, for example, to perform data processing. Determination and use of a priority value for one or more channels, data, and/or transmissions as described herein may provide advantages such as reduced misalignment, improved resource allocations, improved flexible data scheduling, reduced signaling overhead/retransmissions, reduced interference, reduced wireless device and/or base station battery/power consumption, and/or reduced delay/latency of communication.

Figure 30A:
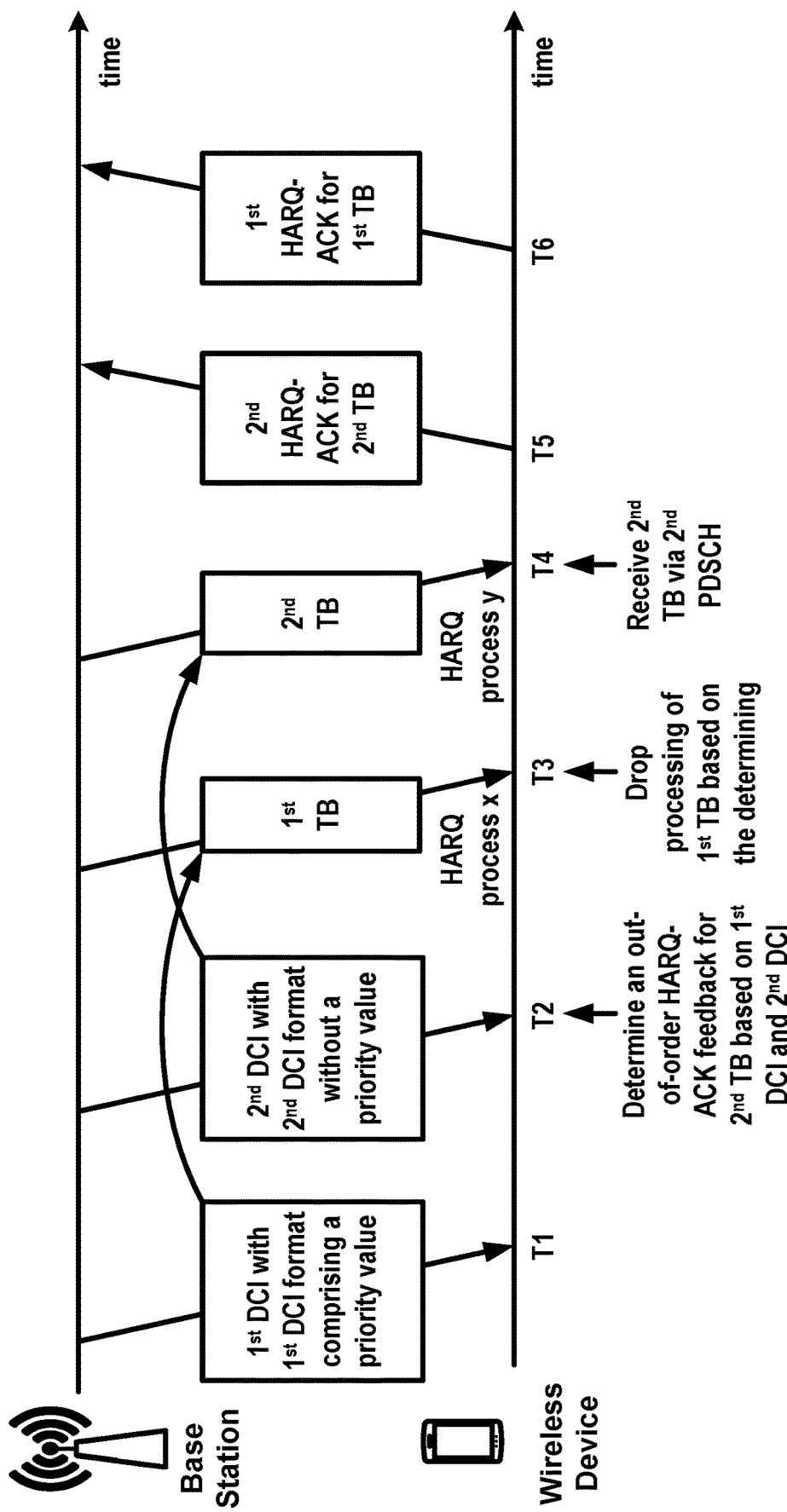
FIG. 30A and FIG. 30B show examples of out-of-order processing.

FIG. 30A shows an example of out-of-order processing. A wireless device may receive, from a base station, first DCI (e.g., at or during a first time interval T1). The base station may send/transmit the first DCI, corresponding to a first DCI format (e.g., DCI format 1_2, different from DCI format 1_0/1_1), comprising a priority field (e.g., 1, 2, or any quantity/number of bits greater than 0) with a first priority value indicating a first PDSCH transmission priority for a first TB. A priority value of the priority field of the first DCI format may indicate a priority level of PDSCH transmission of a TB. The first DCI may indicate that the first TB is scheduled to be sent/transmitted (e.g., at or during a third time interval T3). The first DCI may comprise a first HARQ-ACK feedback timing value that indicates a first HARQ-ACK feedback is required to be sent/transmitted (e.g., at or during a sixth time interval T6). The base station may have available and/or urgent data (e.g., a second TB) to be sent/transmitted to the wireless device. The base station may determine to send/transmit second DCI corresponding to a second DCI format (at or during a second time interval T2), for example, after sending/transmitting the first DCI corresponding the first DCI format. The second DCI may indicate that the second TB is scheduled to be sent/transmitted (e.g., at or during a third time interval T3). The second DCI format, different from the first DCI format, may not comprise a priority field. The second DCI format may comprise a DCI format (e.g., a 3GPP DCI format, such as DCI format 1_0/1_1). The second DCI may be sent/transmitted via a search space or a control resource set configured with a DCI format (e.g., DCI format 1_0/1_1) and configured without a new DCI format (e.g., DCI format 1_2 with a priority field). The second DCI may indicate that the second TB is scheduled to be sent/transmitted (e.g., at or during a fourth time interval T4). The second DCI may comprise a second HARQ-ACK feedback timing value indicating that a second HARQ-ACK feedback is required to be sent/transmitted (e.g., at or during a fifth time interval T5). The wireless device may determine that the second HARQ-ACK feedback for the second TB is an out-of-order HARQ feedback compared with the first HARQ-ACK feedback for the first TB, for example, based on the first HARQ-ACK feedback timing value and the second HARQ-ACK feedback timing value.

A wireless device may determine that the second TB is prioritized over the first TB. The wireless device may determine that the second TB is prioritized over the first TB, for example, based on (e.g., after or in response to) the determining that the second HARQ-ACK feedback for the second TB is out-of-order. The wireless device may determine that the second TB is prioritized over the first TB, for example, if the first DCI indicates a PDSCH transmission priority for the first TB and the second DCI does not indicate a PDSCH transmission priority for the second TB. The wireless device may determine to drop processing of the first TB (e.g., at or during a third time interval T3), for example, based on (e.g., after or in response to) the determining that the second HARQ-ACK feedback for the second TB is out-of-order. The wireless device may determine to drop processing of the first TB (e.g., at or during the third time interval T3), for example, if the first DCI indicates a PDSCH transmission priority for the first TB and the second DCI does not indicate a PDSCH transmission priority for the second TB. The wireless device may process the second TB (e.g., at or during a fourth time interval T4) and send/transmit the second HARQ-ACK information for the second TB (e.g., at or during a fifth time interval T5), for example, based on (e.g., after or in response to) dropping the processing of the first TB. The wireless device may send/transmit the first HARQ-ACK information for the first TB (e.g., at or during a sixth time interval T6), for example, based on (e.g., after or in response to) dropping the processing of the first TB. The first HARQ-ACK information may comprise a negative acknowledgment for the first TB. A wireless device may prioritize processing of a second TB scheduled by DCI corresponding to a first DCI format (e.g., DCI format 1_0/1_1 without a priority field) over processing of a first TB scheduled by DCI corresponding to a second DCI format (e.g., DCI format 1_2 with a priority field, or a new DCI format in 3GPP future releases or any other communications), for example, if a second HARQ-ACK information feedback for the second TB is out-of-order compared with a first HARQ-ACK information feedback for the first TB. A wireless device may prioritize processing of a second TB scheduled by DCI corresponding to a first DCI format (e.g., DCI format 1_0/1_1 without a priority field) over processing of a first TB scheduled by DCI corresponding to a second DCI format (e.g., DCI format 1_2 with a priority field, or a new DCI format in 3GPP future releases or any other communications), for example, if the transmission of the second TB is out-of-order before the transmission of the first TB. By specifying/applying TB processing dropping rules, advantages may be achieved such as reduced between a base station and a wireless device (e.g., regarding determining whether dropping processing of a TB occurs, for example, if mixed DCI formats are supported in the system), reduced data transmission latency, and/or increased system throughput.

The wireless device may determine a default priority value for the second TB. The wireless device may determine a default priority value for the second TB, for example, if the wireless device receives first DCI configured with a priority field for a first TB, and second DCI configured without a priority field for a second TB. The wireless device may determine the default priority value for the second TB, for example, based on the second DCI not being configured with a priority field. The priority field of the first DCI may indicate a PDSCH transmission priority value (e.g., 0, 1, 2, 3 or any number greater than 0). The default priority value may be predefined to a fixed value (e.g., 0). The wireless device may determine whether the first TB has higher priority, or the second TB has higher priority, for example, based on comparing the default priority value of the second TB and a priority value indicated by the priority field of the first DCI for the first TB.

Figure 30B:
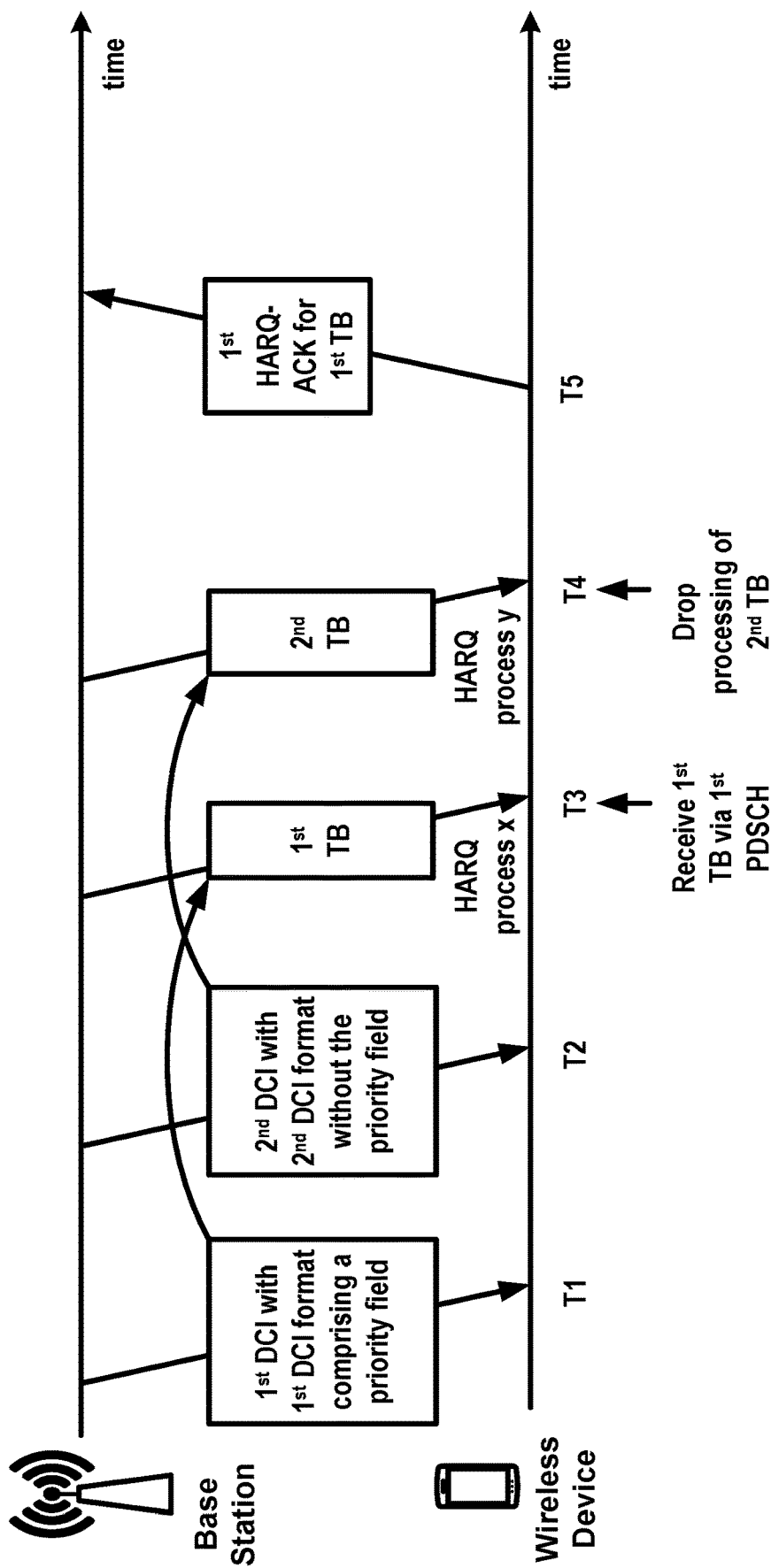

FIG. 30B shows an example of out-of-order processing. The base station and/or the wireless device may perform one or more operations similar to those described above with respect to FIG. 30A, except that the default priority value may indicate a lower priority. The base station may send/transmit, to the wireless device, first DCI corresponding to a first DCI format comprising a priority field (e.g., at or during a first time interval T1). The base station may send/transmit, to the wireless device, second DCI corresponding to a second DCI format not comprising a priority field (e.g., at or during a second time interval T2). The first DCI may schedule a transmission of a first TB (e.g., at or during a third time interval T3). The second DCI may schedule a transmission of a second TB (e.g., at or during a fourth time interval T4). The base station may send/transmit, to the wireless device, the first TB (e.g., at or during the third time interval T3). The base station may send/transmit, to the wireless device, the second TB (e.g., at or during the fourth time interval T4). The wireless device may prioritize processing of the first TB, for example, if the wireless device receives the first DCI configured with a priority field for the first TB and the second DCI configured without a priority field for the second TB. The first DCI may be sent/transmitted before sending/transmitting the second DCI. The first DCI may be sent/transmitted after sending/transmitting the second DCI The wireless device may prioritize processing of the first TB (e.g., by dropping processing of the second TB), for example, if a base station send/transmits the second TB before sending/transmitting the first TB. The wireless device may process the first TB (e.g., via HARQ process x), for example, after receiving the first TB via the first PDSCH and based on the determined priorities. The wireless device may drop processing of the second TB (e.g., dropping HARQ process y), for example, based on the determined priorities. The wireless device may prioritize processing of the first TB (e.g., by dropping processing of the second TB), for example, if a base station sends/transmits the second TB after sending/transmitting the first TB. The wireless device may prioritize processing of the first TB (e.g., by dropping processing the second TB), for example, if a second HARQ-ACK information feedback for the second TB is out-of-order compared with a first HARQ-ACK information feedback for the first TB. The wireless device may send/transmit the first HARQ-ACK information feedback for the first TB and may drop the second HARQ-ACK information feedback for the second TB (e.g., at or during a fifth time period T5), for example, based on the first DCI comprising the priority field and for the first TB and the second DCI not comprising a priority field for the second TB and/or based on a first uplink resource (e.g., PUCCH or PUSCH resource(s)) for sending/transmitting the first HARQ-ACK information feedback for the first TB overlapping (e.g., at least partially) with a second uplink resource (e.g., PUCCH or PUSCH resource(s)) for sending/transmitting the second HARQ-ACK information feedback for the second TB. The improved priority processing described herein may reduce misalignment between a base station and a wireless device (e.g., for determining whether processing of a TB is dropped) and/or may improve data transmission latency and/or system throughput.

Processing of a higher priority TB may be dropped, for example, if an HARQ-ACK feedback is out-of-order. The second DCI format may be the same (or substantially the same) as the first DCI format. The second DCI format may comprise a priority field with a second priority value indicating a second PDSCH transmission priority for a second TB. The first TB may have higher priority than the second TB, for example, based on comparing the first priority value of the first DCI and the second priority value of the second DCI. The wireless device may determine that the second HARQ-ACK feedback for the second TB is out-of-order compared with the first HARQ-ACK feedback for the first TB, while the first TB has higher priority than the second TB. The wireless device may determine to drop processing of the first TB, for example, based on the second HARQ-ACK feedback being out-of-order, if the first TB has higher priority of transmission than the second TB. The wireless device may ignore the priority and may follow the HARQ-ACK processing order (e.g., dropping the first TB and processing the second TB with out-of-order HARQ-ACK feedback), for example, if an HARQ-ACK feedback is out-of-order.

Referring back to FIG. 30A, the wireless device may process the second TB (e.g., at or during a fourth time interval T4) and/or send/transmit the second HARQ-ACK information (e.g., at or during a fifth time interval T5), for example, based on (e.g., after or in response to) dropping the processing of the first TB. The wireless device may send/transmit the first HARQ-ACK information (e.g., at or during a sixth time interval T6). The improved out-of-order processing described herein may reduce misalignment between a base station and a wireless device (e.g., for determining whether processing of a TB is dropped) and/or may improve data transmission latency and/or system throughput.

The second DCI format may be the same (or substantially the same) as the first DCI format. Both the first DCI format and the second DCI format may comprise a priority field. The second DCI format may comprise a priority field with a second priority value indicating a second PDSCH transmission priority for a second TB. The first TB may have higher priority than the second TB, for example, based on comparing the first priority value of the first DCI and the second priority value of the second DCI. The wireless device may determine that the second HARQ-ACK feedback for the second TB is out-of-order compared with the first HARQ-ACK feedback for the first TB, while the first TB has higher priority than the second TB. The wireless device may determine to drop processing of the second TB, for example, based on the first TB having higher priority of transmission than the second TB and the second HARQ-ACK feedback for the second TB being out-of-order. The wireless device may process the first TB, and/or send/transmit the first HARQ-ACK information for the first TB, for example, based on (e.g., after or in response to) dropping processing of the second TB. The improved out-of-order processing described herein may reduce misalignment between a base station and a wireless device (e.g., for determining whether processing of a TB is dropped) and/or may improve data transmission latency and/or system throughput.

A wireless device may receive configuration parameters indicating a data preparation time parameter. A wireless device may receive from a base station one or more RRC messages comprising configuration parameters indicating a PUSCH preparation time threshold (N2). N2 may be 10 (if u=0), 12 (if u=1), 23 (if u=2), or 36 (if u=3), or any other value (e.g., if u=n, where n may be any particular value), for example, if PUSCH timing capability 1 is supported by the wireless device. u is a numerology index (e.g., 0, 1, 2, or 3) indicating a numerology used in PUSCH (or PDCCH for the DCI transmission). N2 may be 5 (if u=0), 5.5 (if u=1), or 11 (if u=2 and for frequency range 1), or any other value (e.g., if u=n, where n may be any particular value), for example, if PUSCH timing capability 2 is supported by the wireless device. The one or more RRC messages may comprise at least one of: ServingCellConfig 1E; CellGroupConfig 1E; an RRCSetup message; and/or an RRCReconfiguration message. The wireless device may determine whether to send/transmit a PUSCH at a second time interval after receiving DCI at a first time interval, for example, based on the PUSCH preparation time threshold. The wireless device may determine to send/transmit the PUSCH, for example, based on a time duration between the first time interval and the second time interval being equal to or greater than a PUSCH processing time (e.g., Tproc, 2). The PUSCH processing time may be determined as Tproc, 2=max((N2+d2, 1)(2048+144)*k*2^(-u)*Tc, d2, 2), where k=64, Tc=1/(Δf max*Nf), Δf max=480*10^Hz and Nf=4096. d2, 1=0, for example, if the first symbol of the PUSCH allocation consists of DM-RS only, otherwise d2, 1=1. d2,2 may equal to a BWP switching time, for example, if the DCI triggers a BWP switching, otherwise d2,2=0. The wireless device may ignore the DCI (e.g., by not sending/transmitting the PUSCH), for example, based on the time duration between the first time interval and the second time interval being less than the PUSCH processing time.

A wireless device may perform uplink transmission(s), for example, based on an out-of-order grant. A wireless device may send/transmit a second TB via the out-of-order grant, and drop transmission of a first TB, for example, based on (e.g., after or in response to) receiving an out-of-order grant for the second TB after receiving a first grant for the first TB. Dropping transmission of a low-priority TB may improve power consumption, reduce implementation cost, or improve data transmission latency for a high-priority TB. Consistent dropping of the transmission of the first TB may reduce uplink system throughput, or increase uplink transmission latency.

Figure 31:
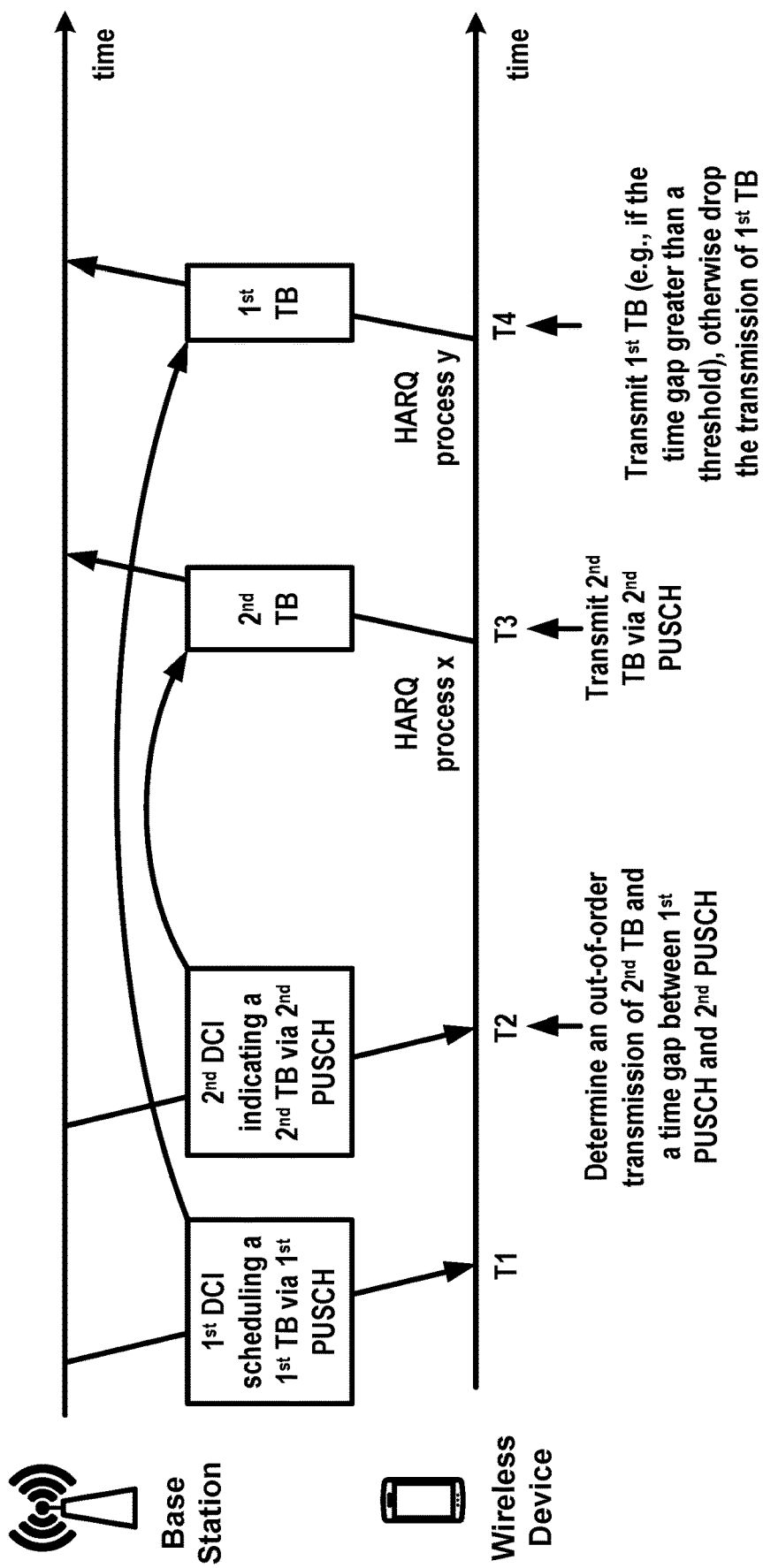
FIG. 31 shows an example of out-of-order grant processing.

FIG. 31 shows an example of out-of-order grant processing. A wireless device may receive (e.g., at or during a first time interval T1), from a base station, at least a portion of first DCI indicating a first uplink TB transmission via a first PUSCH (e.g., at or during a fourth time interval T4). The wireless device may receive (e.g., at or during a second time interval T2) second DCI indicating a second uplink TB transmission via a second PUSCH (e.g., at or during a third time interval T3). The first time interval T1 may occur before the second time interval T2. The third time interval T3 may occur before the fourth time interval T4. The first uplink TB may be associated with a first HARQ process (e.g., HARQ process y). The second uplink TB may be associated with a second HARQ process (e.g., HARQ process x). The wireless device may receive at least a portion of the first DCI before receiving at least a portion of the second DCI. The wireless device may be required to send/transmit at least a portion of the second TB (e.g., an initial portion or all of the second TB) via the second PUSCH before sending/transmitting at least a portion of the first TB (e.g., an initial portion or all of the first TB) via the first PUSCH. Sending/transmitting the second TB before sending/transmitting the first TB, and receiving the first DCI before receiving the second DCI, may be referred to as an out-of-order grant.

The wireless device may determine a time gap between a first time occasion of the first PUSCH and a second time occasion of the second PUSCH, for example, based on (e.g., after or in response to) receiving an out-of-order grant for the second TB via the second PUSCH. The first time occasion of the first PUSCH may comprise at least one of: the first uplink symbol of the first PUSCH in time domain, or the last uplink symbol of the first PUSCH in time domain. The second time occasion of the second PUSCH may be the first uplink symbol of the second PUSCH in time domain. The wireless device may send/transmit at least a portion of the second TB (e.g., at or during a third time interval T3), for example, based on (e.g., after or in response to) receiving an out-of-order grant for transmission of the second TB via the second PUSCH. The wireless device may determine whether to send/transmit the first PUSCH, for example, based on the time gap and the PUSCH processing time. The wireless device may determine to send/transmit the first TB via the first PUSCH, for example, based on the time gap being equal to or greater than the PUSCH processing time. The wireless device may determine to ignore the first DCI (e.g., by not sending/transmitting the first TB via the first PUSCH), for example, based on the time gap being less than the PUSCH processing time. The wireless device may determine whether to send/transmit a low-priority TB via a PUSCH, for example, based on a first time gap between two PUSCH transmission occasions (e.g., one being scheduled on an out-of-order grant), rather than based on a second time gap between a DCI reception and a PUSCH transmission occasion. The wireless device may determine whether to send/transmit a low-priority TB via a PUSCH, rather than always drop transmission of the low-priority TB, for example, based on a first time gap between two PUSCH transmission occasions (e.g., one being scheduled on an out-of-order grant). The wireless device may determine whether to send/transmit a low-priority TB via a PUSCH, for example, based on the first DCI being sent/transmitted from a first TRP (e.g., of the base station) and the second DCI being sent/transmitted from a second TRP (e.g., of the base station) and/or based on the first TB being sent/transmitted to the first TRP and the second TB being sent/transmitted to the second TRP. The wireless device may determine whether to send/transmit a low-priority TB via a PUSCH, for example, based on the first DCI being sent/transmitted to a first antenna panel of the wireless device and the second DCI being sent/transmitted to a second antenna panel of the wireless device and/or based on the first TB being sent/transmitted from the first antenna panel of the wireless device and the second TB being sent/transmitted from the second antenna panel of the wireless device. The improved out-of-order grant processing described herein may enable alignment between the base station and the wireless device (e.g., for determining whether a low-priority TB is sent/transmitted or not) and/or may improve data transmission latency, and/or reduce device complexity.

A wireless device may send/transmit a second TB, for example, based on (e.g., after or in response to) receiving an out-of-order grant for transmission of the second TB via a second PUSCH. The wireless device may determine to delay a transmission of a first TB via a first PUSCH, for example, based on (e.g., after or in response to) transmitting the second TB, so that a time gap between a first time of a transmission of the second TB and a second time of a delayed transmission of the first TB is equal to or greater than the PUSCH processing time. The improved out-of-order grant processing described herein may enable alignment between the base station and the wireless device (e.g., for determining whether a low-priority TB is sent/transmitted or not) and/or may improve data transmission latency, and/or reduce device complexity.

Figure 32A:
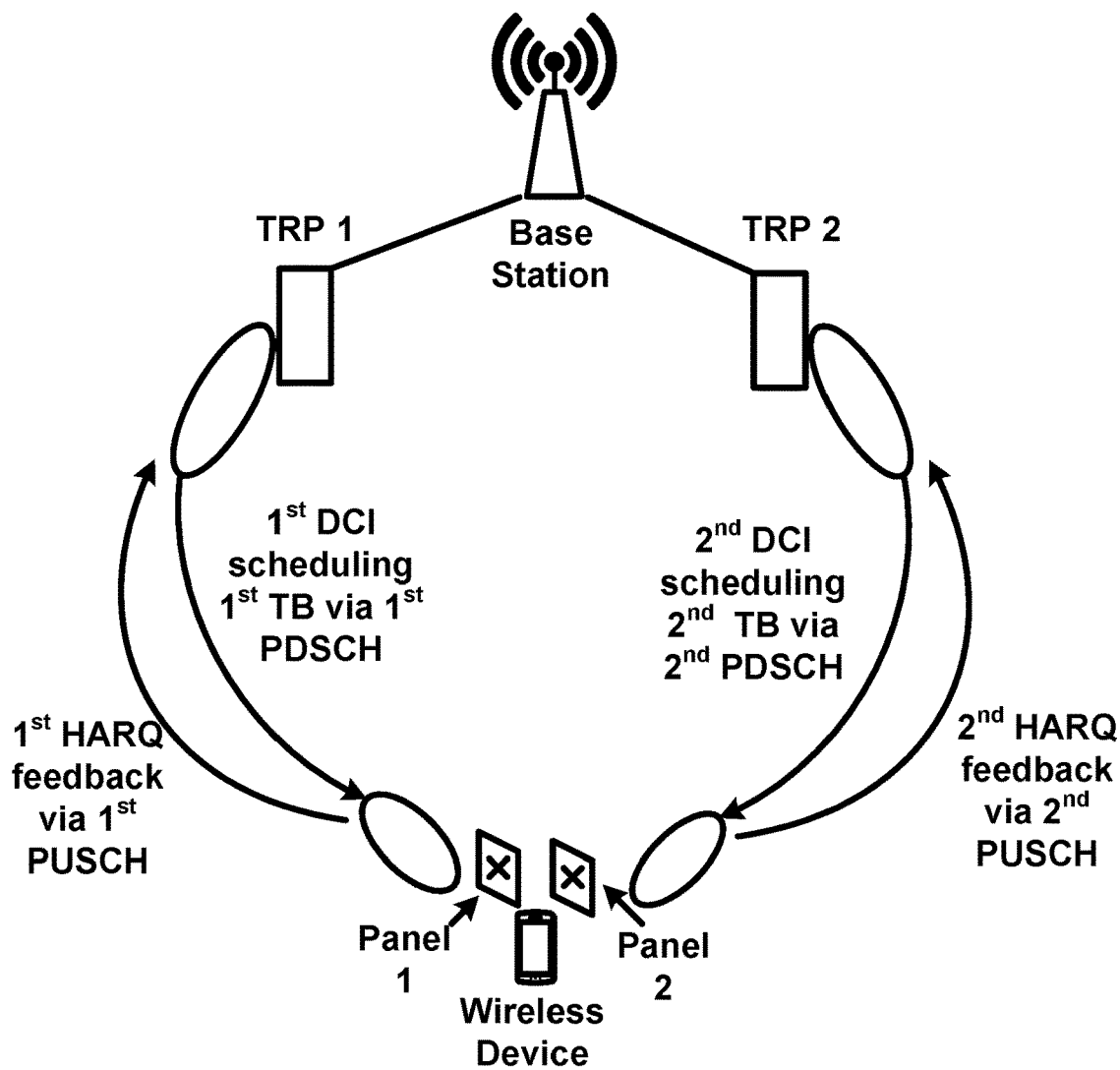
FIG. 32A shows example communications for multiple transmission reception points (TRPs) and multiple antenna panels.

FIG. 32A shows example communications for multiple TRPs and/or multiple antenna panels. A base station may be equipped with more than one TRP (e.g., TRP 1 and TRP 2 shown in FIG. 32A). A wireless device may be equipped with more than one panel (e.g., Panel 1 and Panel 2 shown in FIG. 32A). Transmission and reception using multiple TRPs and multiple antenna panels may improve system throughput and/or transmission robustness for a wireless communication in a high frequency (e.g., above 6 GHz). The TRP 1 of the base station may send/transmit first DCI scheduling a first TB. The Panel 1 of the wireless device may receive the first DCI. The first TB may be sent/transmitted via a first PDSCH. The TRP 2 of the base station may send/transmit second DCI scheduling a second TB. The Panel 2 of the wireless device may receive the second DCI. The second TB may be sent/transmitted via a second PDSCH. The TRP 1 of the base station may receive, from the Panel 1 of the wireless device, first HARQ feedback associated with the first TB. The first HARQ feedback may be sent/transmitted via a first PUSCH. The TRP 2 of the base station may receive, from the Panel 2 of the wireless device, second HARQ feedback associated with the second TB. The second HARQ feedback may be sent/transmitted via a second PUSCH. While some figures and/or descriptions herein provide one or more configurations for multiple TRPs, data processing (e.g., out-of-order processing) for multiple TRPs may be applicable to multiple antenna panels in the same or similar way. For example, a first antenna panel (e.g., Panel 1 in FIG. 32A) of a wireless device may receive first DCI and a first TB and send/transmit first HARQ-ACK feedback, and a second antenna panel (e.g., Panel 2 in FIG. 32A) of the wireless device may receive second DCI and a second TB and send/transmit second HARQ-ACK feedback.

Figure 32B:
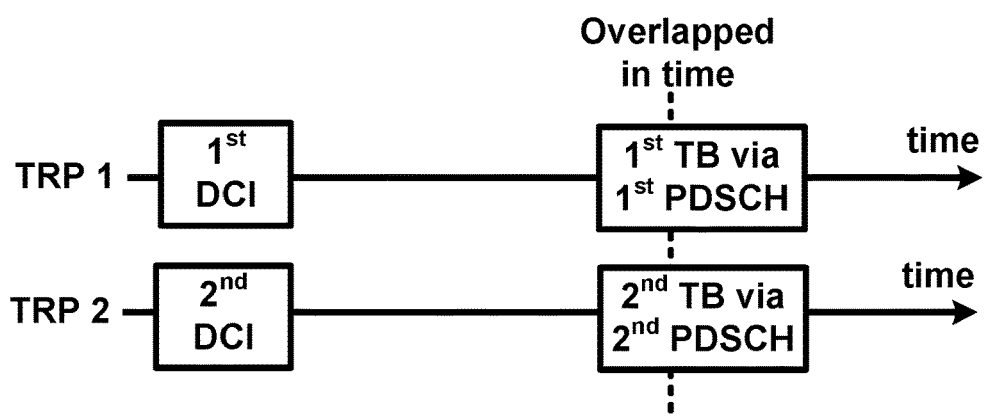
FIG. 32B shows an example of transmission and reception via multiple TRPs and/or multiple antenna panels.

FIG. 32B shows an example of transmission and reception via multiple TRPs and/or multiple antenna panels. Two PDSCH transmissions may be performed via two TRPs. Any quantity of PDSCH transmissions may be performed via any quantity of TRPs. The base station may send/transmit, to the wireless device, first DCI scheduling a first TB via a first PDSCH of the first TRP (e.g., using a first panel), for example, if the multiple TRPs and/or the multiple antenna panels are configured. The base station may send/transmit, to the wireless device, second DCI scheduling a second TB via a second PDSCH of the second TRP (e.g., using a second panel), for example, if the multiple TRPs and/or the multiple antenna panels are configured. The base station may be allowed to send/transmit the first downlink TB via the first TRP and the second downlink TB via the second TRP with a shared time and/or frequency resource (e.g., and/or with different transmission beams), for example, unlike a single TRP and/or single panel configuration. In comparison with the single TRP/panel configuration, the base station may improve system throughput or transmission robustness if multiple TRPs and/or multiple antenna panels are configured.

In some types of wireless communications (e.g., compatible with 3GPP Release 16, earlier/later 3GPP releases or generations, and/or other access technology), a wireless device may drop and/or not process a channel, data, and/or a transmission. The wireless device may drop processing due to various reasons, such as a plurality of channels, data, and/or transmissions overlap with each other in one or more resources; out-of-order processing occurs; insufficient wireless device capability, and/or any other reason for which processing may not occur. Dropping processing of low-priority channels, data, and/or transmissions as a default rule may be inefficient.

As described further herein, out-of-order processing may be improved using different resource groups (e.g., multiple TRPs, multiple antenna panels, and/or multiple other resources). Communications and/or data processing may be performed (e.g., in-order, out-of-order, and/or overlapping), based on one or more configurations of resource groups. A wireless device may determine whether to process data, for example, based on whether a plurality of channels are associated with different resource groups. The wireless device may process a plurality of channels, data, and/or transmissions, for example, for out-of-order process based on whether a first resource and a second resource being in (e.g., belonging to) different resource groups (e.g., multiple CORESETS, multiple TRPs, multiple antenna panels, etc.). As described herein, by using improved out-of-order processing and multiple resources (e.g., multiple CORESETS, multiple TRPs and/or multiple antenna panels), a base station and/or a wireless device may improve data transmission latency and/or system throughput (e.g., if multiple TRPs and/or multiple antenna panels, and out-of-order processing, are supported).

In some types of wireless communications (e.g., compatible with 3GPP Release 16, earlier/later 3GPP releases or generations, and/or other access technology), a wireless device may drop and/or not processing a channel, data, and/or a transmission. The wireless device may drop processing due to various reasons, such as a plurality of channels, data, and/or transmissions overlap with each other in one or more resources; out-of-order processing occurs;

insufficient wireless device capability; and/or any other reason for which processing may not occur. Dropping processing of low-priority channels, data, and/or transmissions as a default rule may be inefficient for at least some types of wireless communications. Yet, at least some types of wireless communications may require a wireless device to drop processing of a low-priority TB, for example, if the wireless device receives an out-of-order scheduling, and/or if the wireless device processes an out-of-order HARQ-ACK feedback. At least some types of wireless communications may allow a wireless device to determine whether to the processing of the low-priority TB, for example, if the wireless device receives the out-of-order scheduling and/or processes the out-of-order HARQ-ACK feedback, based on one or more capability parameters of the wireless device (e.g., the maximum number of carriers aggregated; the maximum number of MIMO layers or antenna ports). A base station may send/transmit a TB via a first TRP or a second TRP, for example, if multiple TRPs are supported. The base station may send/transmit a TB via both a first TRP and a second TRP, for example, if multiple TRPs are supported. In some types of wireless communications, a wireless device may have difficulties in determining dropping conditions, for example, if the wireless device receives multiple DCI messages from different TRPs (e.g., scheduling multiple PDSCHs to be sent/transmitted via the different TRPs). The wireless device may have difficulties in determining whether to drop processing of a first TB received via a first TRP (or via the first TRP and via the second TRP), for example, if the wireless performs out-of-order processing for a second TB received via a second TRP (or via the first TRP and via the second TRP), and/or if the first TB is a low-priority TB and the second TB is a high-priority TB. Reduction of system throughputs and/or increased data transmission latency may result, for example, if a wireless device experiences difficulties in determining whether to drop processing.

As described further herein, data processing may be improved using a plurality of resource groups (e.g., multiple TRPs, multiple antenna panels, and/or multiple other resources). A plurality of resources may be indicated for a wireless device to use to process data. At least some data may be indicated to be processed in-order, out-of-order, and/or overlapping with other data. Data may be processed or not processed, based on whether the plurality of resources to be used are associated with different resource groups. For example, a wireless device may be capable of processing out-of-order and/or overlapping data transmissions if the wireless device is configured to use different resource groups, whereas a wireless device may not be capable of processing out-of-order and/or overlapping data transmissions if the wireless device is not configured to use different resource groups. Communications and/or data processing may be performed (e.g., in-order, out-of-order, and/or overlapped) based on one or more configurations of resource groups. A wireless device may determine whether to process data, for example, based on whether a plurality of channels are associated with different resource groups. A wireless device may determine one or more first channels, first data, and/or first transmissions that are processed (e.g., together or in succession) without dropping, and may determine one or more second channels, second data, and/or second transmissions that are dropped from processing, for example, based on one or more rules, factors, and/or conditions in one or more configurations (e.g., associated with multiple TRPs, multiple antenna panels, and/or multiple resource groups). Dropping data processing may be determined, for example, based on whether channels, data, and/or transmissions are associated with the same or different TRPs, the same or different antenna panels, and/or the same or different resource groups (e.g., CORESETS). Channels, data, and/or transmission may be scheduled via the same or different TRPs, the same or different antenna panels, and/or the same or different resource groups, for example, based on whether or not one or more types of channels, data, and/or transmissions are allowed to be dropped. Determination of co-processing, or partial dropping of data processing, for one or more channels, data, and/or transmissions as described further herein may provide advantages such as reduced misalignment, improved resource allocations, improve flexible data scheduling, reduced signaling overhead/retransmissions, reduced interference, reduced wireless device and/or base station battery/power consumption, and/or reduced delay/latency of communication.

Figure 33:
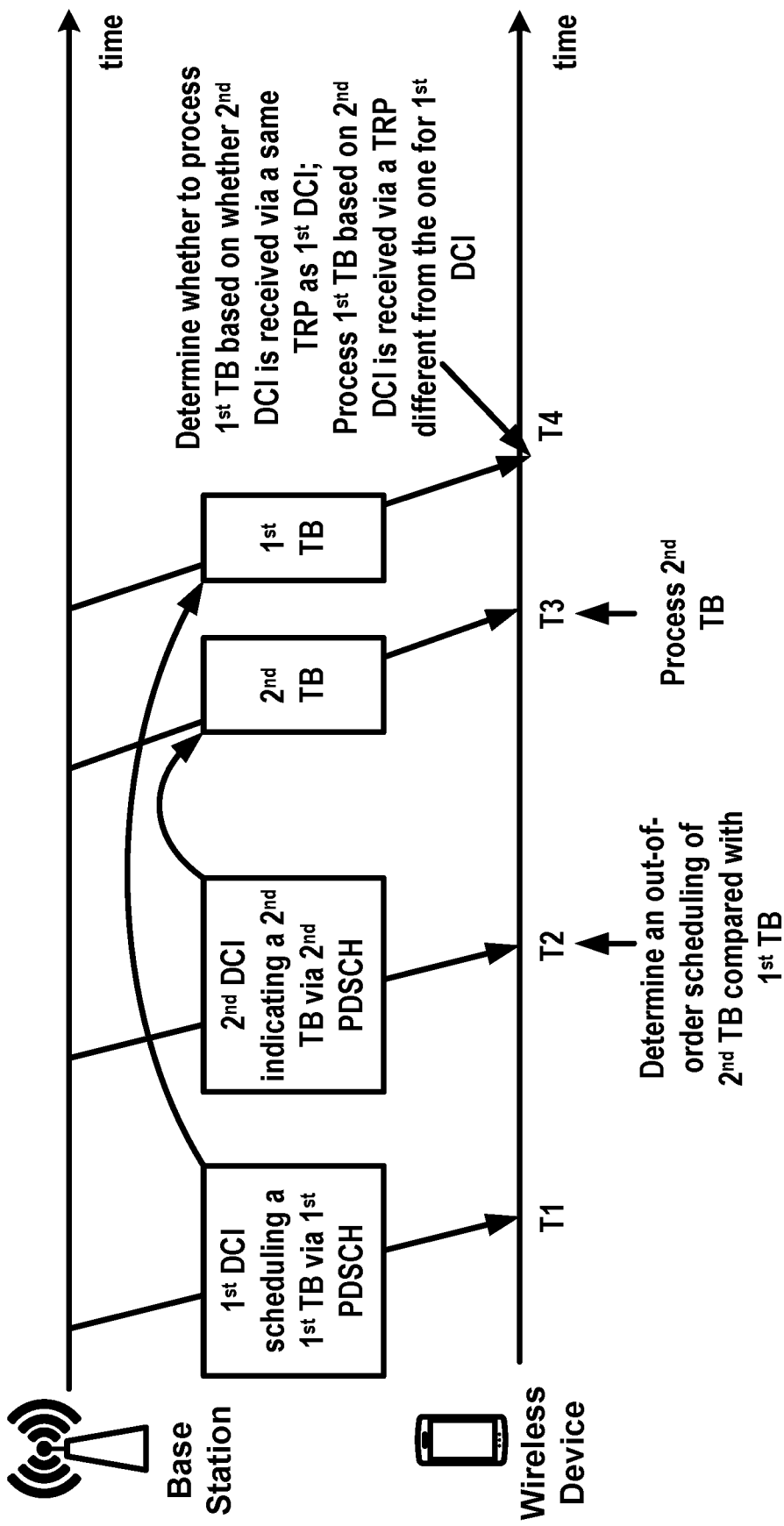
FIG. 33, FIG. 34A, and FIG. 34B show example out-of-order processing for multiple TRPs and/or multiple antenna panels.
Figure 34A:
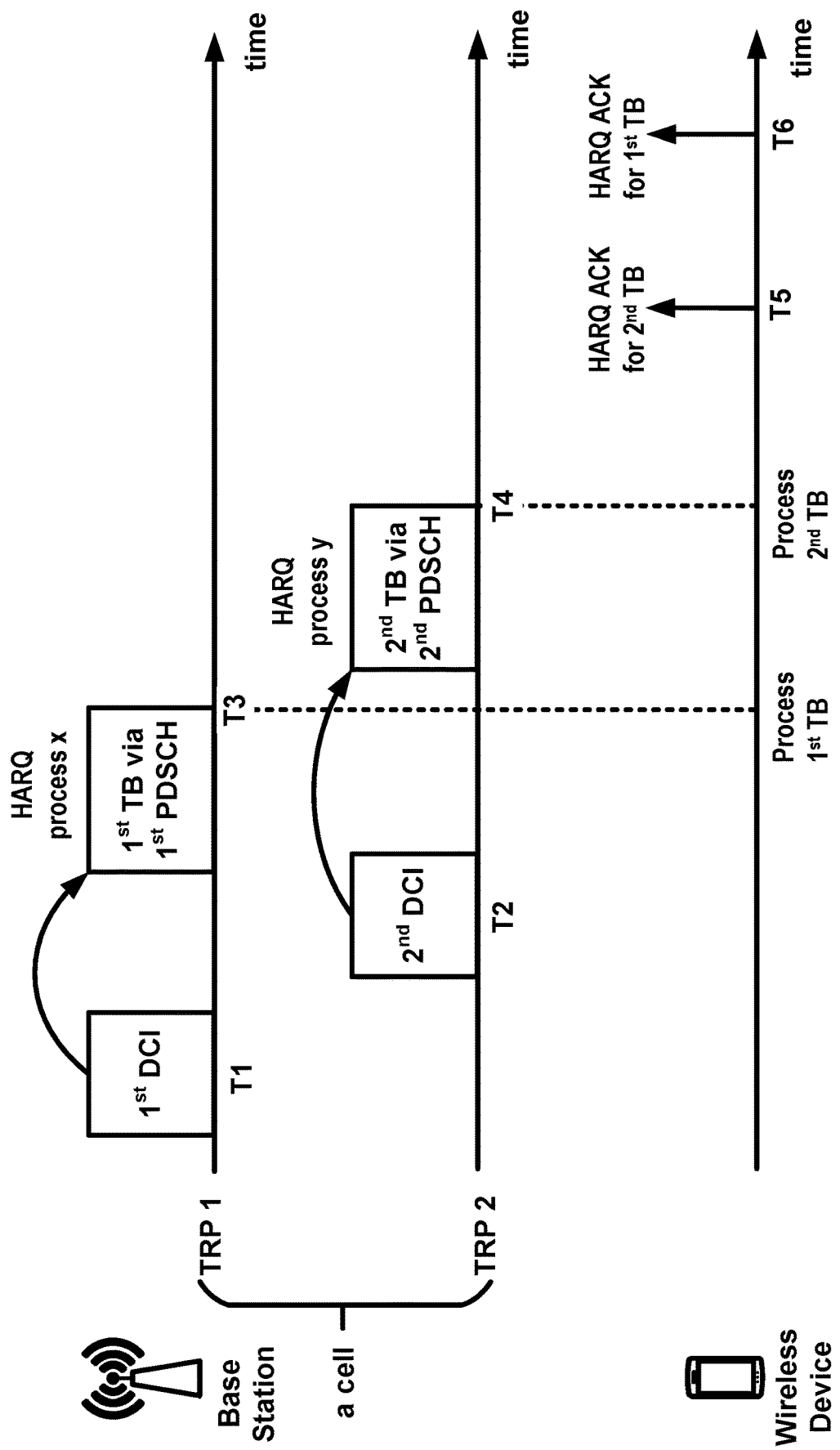
Figure 34B:
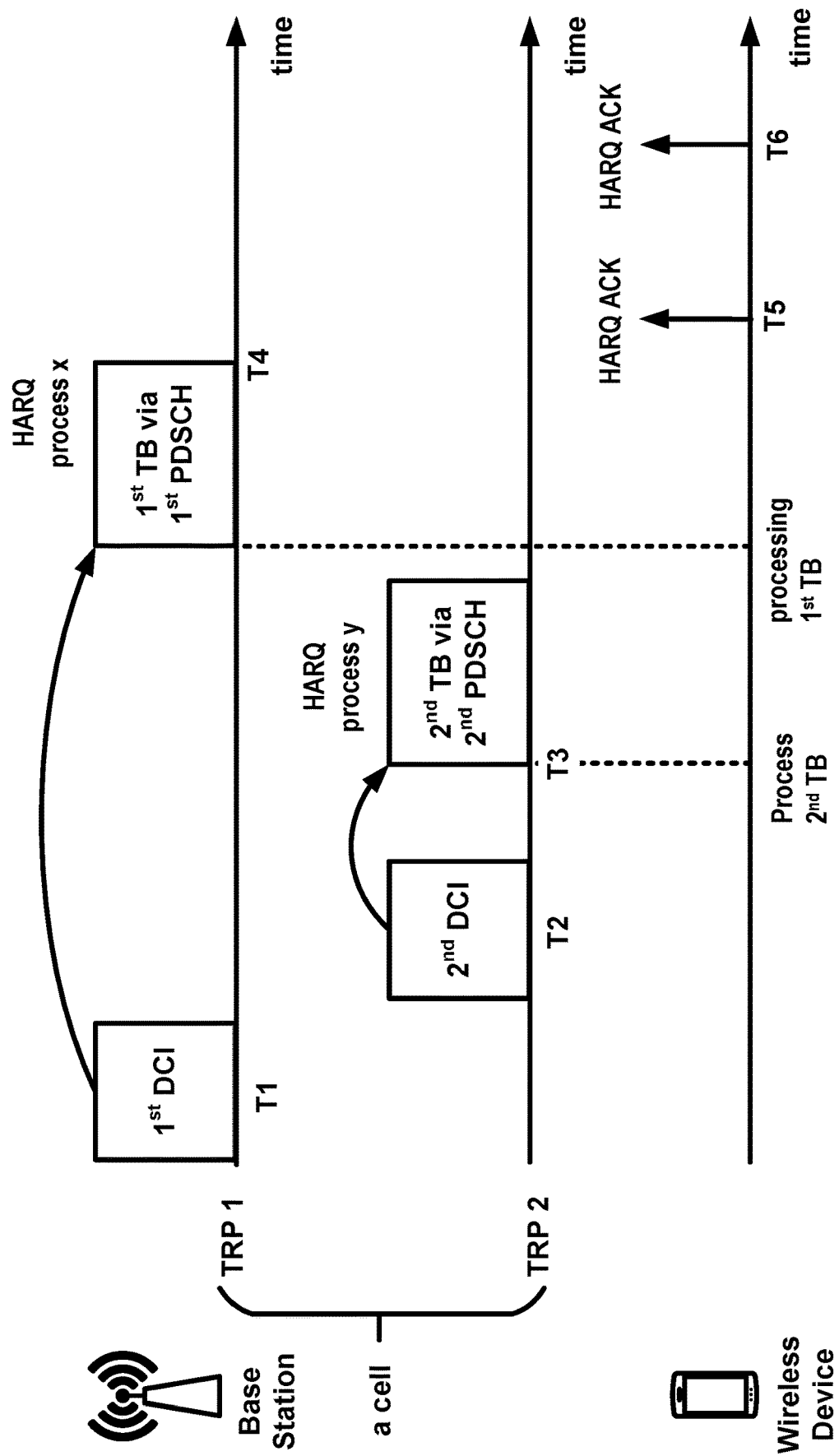

FIG. 33, FIG. 34A, and FIG. 34B show examples of out-of-order processing for multiple TRPs and/or multiple antenna panels. A base station may send/transmit, from a first TRP (e.g., TRP 1) to a wireless device, at least a portion of first DCI (e.g., at or during a first time interval T1) indicating a transmission of a first TB via a first PDSCH resource (e.g., at or during a third time interval T3, for example, as shown in FIG. 34A, or at or during a third time interval T4, for example, as shown in FIGS. 26B, 33 and 34B). The first DCI may indicate that a first HARQ-ACK feedback is to be sent/transmitted (e.g., at or during a sixth time interval T6, for example, as shown in FIG. 34A). The wireless device may determine an out-of-order scheduling of the transmission of the second TB (e.g., in comparison with the transmission of the first TB) (e.g., as shown in FIGS. 26B and 33). The wireless device may determine to process the second TB, and may determine to whether to process the first TB, for example, based on whether or not the first DCI and the second DCI being received from/via the same TRP. The wireless device may process the first TB, for example, based on determining that that second DCI is received from/via a TRP different from a TRP from/via which the first DCI is received. The wireless device may determine to process both the first TB and the second TB, for example, based on determining that the first DCI and the second DCI are received via different CORESET groups. The wireless device may process the first TB and the second TB, for example, based on determining that the first DCI is received via a CORESET of a first CORESET group and the second DCI is received via a CORESET of a second CORESET group different from the first CORESET group.

The base station may send/transmit at least a portion of the first TB via the first PDSCH resource (e.g., at or during a third time interval T3, for example, as shown in FIG. 34A, or at or during a third time interval T4, for example, as shown in FIG. 34B). The base station may send/transmit, from a second TRP (e.g., TRP 2) to the wireless device, at least a portion of second DCI (e.g., at or during a second time interval T2) indicating a transmission of a second TB via a second PDSCH resource (e.g., at or during a fourth time interval T4, for example, as shown in FIG. 34A, or at or during a third time interval T3, for example, as shown in FIGS. 26B, 33 and 34B). The second DCI may indicate that a second HARQ-ACK feedback is to be sent/transmitted (e.g., at or during a fifth time interval T5, for example, as shown in FIG. 34A). The base station may send/transmit at least a portion of the second TB via the second PDSCH resource (e.g., at or during a fourth time interval T4, for example, as shown in FIG. 34A, or at or during a third time interval T3, for example, as shown in FIG. 34B). One or more of the first DCI, the second DCI, the first TB, or the second TB may at least partially overlap in time with the other one of the first DCI, the second DCI, the first TB, or the second TB (e.g., the second DCI at least partially overlaps in time with the first TB as shown in FIG. 34A). The first TB may be associated with a first HARQ process (e.g., HARQ process x, for example, as shown in FIG. 34A). The second TB may be associated with a second HARQ process (e.g., HARQ process y, for example, as shown in FIG. 34A). The second HARQ-ACK feedback may be out-of-order, for example, based on the second HARQ-ACK information being feedbacked before the first HARQ-ACK information, while the second TB is sent/transmitted after sending/transmitting the first TB. A TRP of multiple TRPs of the base station may be determined/identified by, or associated with, at least one of: a TRP identifier (ID), a cell index, or a reference signal index. A TRP ID of a TRP may comprise a CORESET group index of a CORESET group comprising a CORESET via which DCI is sent/transmitted from the base station. A TRP ID of a TRP may comprise a TRP index indicated in the DCI. A TRP ID of a TRP may comprise a TCI state group index of a TCI state group. A TCI state group may comprise at least one TCI state with which the wireless device receives the downlink TBs, and/or with which the base station sends/transmits the downlink TBs.

The wireless device may process a plurality of TBs (e.g., in out-of-order processing), for example, if multiple TRPs and/or antenna panels are configured. As shown in FIG. 34A, the wireless device may determine to process both the first TB and the second TB, for example, based on the second HARQ-ACK being out-of-order, and/or if the first TB is scheduled to be sent/transmitted via the first TRP and the second TB is scheduled to be sent/transmitted via the second TRP. The wireless device may receive and/or process the first TB associated with the first HARQ process via the first TRP (e.g., at or during the third time interval T3), for example based on the determining to process both the first TB and the second TB. The wireless device may receive and/or process the second TB associated with the second HARQ process via the second TRP (e.g., at or during the fourth time interval T4), for example, based on the determining to process both the first TB and the second TB. The wireless device may send/transmit the second HARQ-ACK information for the second TB (e.g., at or during the fifth time interval T5) and send/transmit the first HARQ-ACK information for the first TB (e.g., at or during the sixth time interval T6), for example, based on the processing of the first TB and the second TB. The wireless device may send/transmit the first HARQ-ACK information for the first TB (e.g., at or during the fifth time interval T5) and send/transmit the second HARQ-ACK information for the second TB (e.g., at or during the sixth time interval T6), for example, based on the processing of the first TB and the second TB). The wireless device may process both the low-priority TB and a high-priority TB (e.g., without dropping the low-priority TB), for example, if the wireless device performs out-of-order processing, based on the low-priority TB and the high-priority TB being sent/transmitted from different TRPs of a base station (e.g., unlike a single TRP case where a wireless device may process a high-priority TB and drop processing of a low-priority TB while performing out-of-order processing). A wireless device may process a high-priority TB and drop a low-priority TB, for example, if the wireless device performs out-of-order processing, based on the low-priority TB and the high-priority TB being sent/transmitted from the same TRP of a base station (or via the same CORESET group). A wireless device may determine whether to drop the low-priority TB for out-of-order processing, for example, based on whether a low-priority TB and a high-priority TB are sent/transmitted from a same TRP or from different TRPs. As described herein, by using multiple TRPs and/or multiple antenna panels, a base station and/or a wireless device may improve data transmission latency and/or system throughput (e.g., if multiple TRPs and/or multiple antenna panels and out-of-order processing are supported).

Figure 35A:
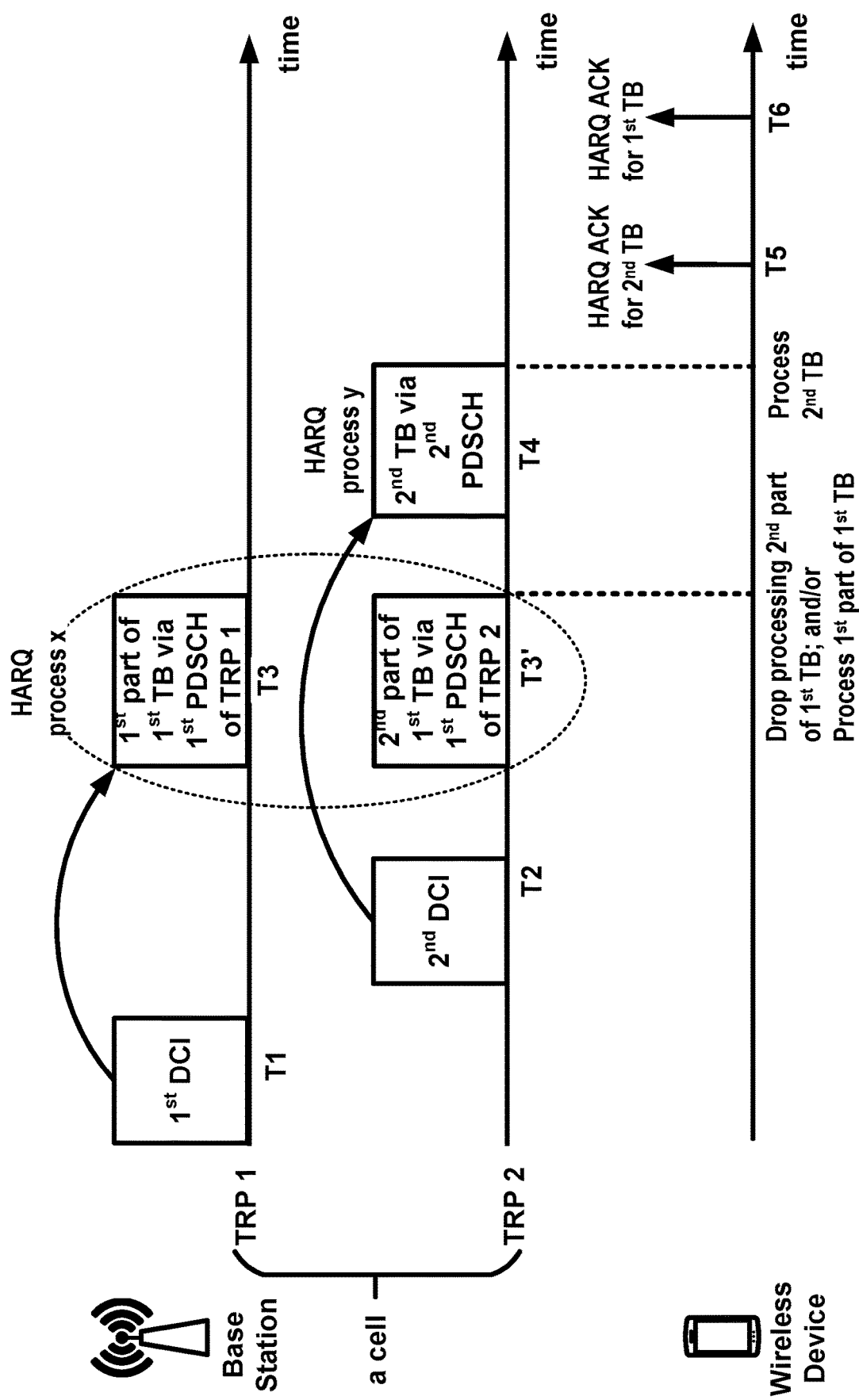
FIG. 35A and FIG. 35B show example out-of-order processing for multiple TRPs and/or multiple antenna panels.

FIG. 35A shows an example of out-of-order processing for multiple TRPs and/or multiple antenna panels. Out-of-order processing may be based on multiple TRPs and/or multiple antenna panels (e.g., if multiple TRPs and/or multiple antenna panels are supported). A base station may send/transmit, from a first TRP (e.g., TRP 1) to a wireless device, first DCI (e.g., at or during a first time interval T1), indicating transmissions (or repetitions) of a first TB via the first TRP and via a second TRP (e.g., TRP 2). The transmissions of the first TB via the first TRP and via the second TRP may comprise a transmission of the first TB using a first RV value via the first TRP (e.g., at or during a third time interval T3) and a repetition of the first TB using a second RV value via the second TRP (e.g., at or during a time interval T3', which may be in proximity to the third time interval T3). The first RV value may be the same as or different from the second RV value, and/or the third time interval T3 may be same as or different from the time interval T3. The transmissions of the first TB via the first TRP and via the second TRP may comprise a first transmission of first layers of the first TB via the first TRP (e.g., at or during the third time interval T3) and a second transmission of second layers of the first TB via the second TRP (e.g., at or during the time interval T3'). The first TB may be mapped to multiple layers comprising the first layers and the second layers, for example, if a multiple layer transmission for the first TB is supported. The first DCI may indicate a first HARQ-ACK feedback for the first TB is to be sent/transmitted (e.g., at or during a sixth time interval T6). The base station may send/transmit, from the second TRP to the wireless device, second DCI (e.g., at or during a second time interval T2) indicating a transmission of a second TB via a second PDSCH resource (e.g., at or during a fourth time interval T4). The second DCI may indicate a second HARQ-ACK feedback for the second TB is to be sent/transmitted (e.g., at or during a fifth time interval T5). The first TB may be associated with a first HARQ process (e.g., HARQ process x). The second TB may be associated with a second HARQ process (e.g., HARQ process y). The second HARQ-ACK feedback may be determined to be out-of-order, for example, based on the second HARQ-ACK information being feedbacked before the first HARQ-ACK information, while the second TB is sent/transmitted after transmissions of the first TB.

Figure 35B:
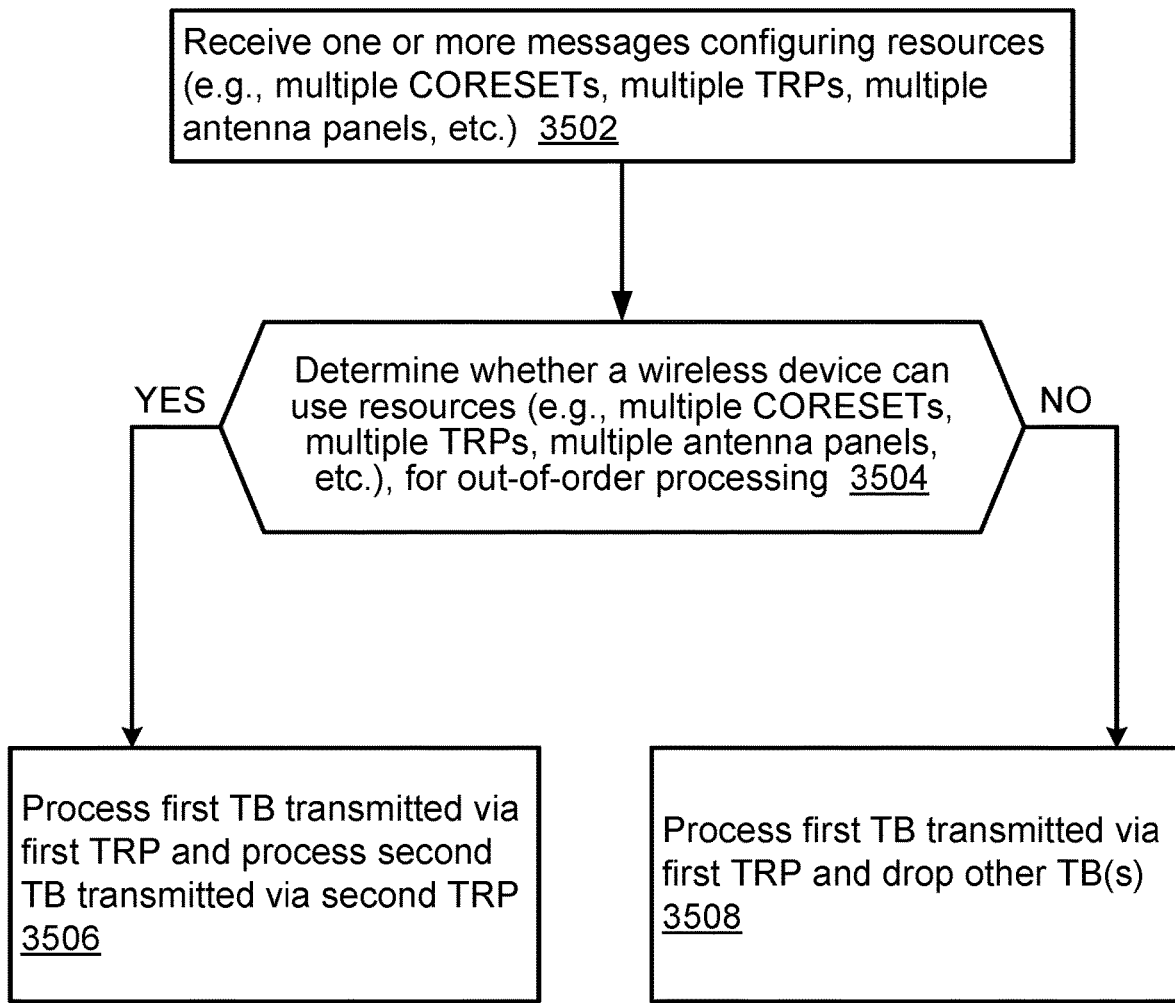

FIG. 35B shows an example of out-of-order processing for multiple TRPs and/or multiple antenna panels. The wireless device may perform an example method 3500. At step 3502, a wireless device may receive (e.g., from the base station) one or more messages configuring resources (e.g., multiple CORESETS, multiple TRPs, multiple antenna panels, etc.). At step 3504, the wireless device may determine whether the wireless device can use one or more resources (e.g., multiple CORESETS, multiple TRPs, multiple antenna panels, etc.), for example, for out-of-order processing. At step 3506, the wireless device may determine to process at least the first TB sent/transmitted via the first TRP and process the second TB sent/transmitted via the second TRP, for example, for out-of-order processing and/or if the wireless device is capable of using resources (e.g., multiple CORESETS, multiple TRPs, multiple antenna panels, etc.). The wireless device may determine to process the first TB sent/transmitted via the first TRP, drop processing the first TB sent/transmitted via the second TRP, and process the second TB sent/transmitted via the second TRP, for example, based on determining the second HARQ-ACK being out-of-order. The wireless device may determine to process the first TB sent/transmitted via the first TRP, drop processing the first TB sent/transmitted via the second TRP, and process the second TB sent/transmitted via the second TRP, for example, if the first TB sent/transmitted via the second TRP is a repetition (with the same or different RV value) of the first TB sent/transmitted via the first TRP. The wireless device may be able to process a low-priority TB, for example, if the low-priority TB are repeated on multiple TRPs, and/or if the wireless device determines (e.g., is configured/instructed/required) to process a high-priority TB with an out-of-order HARQ feedback. At step 3508, the wireless device may determine to process the first TB sent/transmitted via the first TRP and drop other TB(s), for example, for out-of-order processing and/or if the wireless device is not capable of using resources (e.g., multiple CORESETS, multiple TRPs, multiple antenna panels, etc.). As described herein, by using multiple TRPs and/or multiple antenna panels, a base station and/or a wireless device may improve data transmission latency and/or system throughput (e.g., if multiple TRPs and/or multiple antenna panels and out-of-order processing are supported).

The wireless device may determine to drop processing the first TB sent/transmitted via the first TRP, drop processing the first TB sent/transmitted via the second TRP, and process the second TB sent/transmitted via the second TRP, for example, based on the second HARQ-ACK being out-of-order. The wireless device may determine to drop processing the first TB sent/transmitted via the first TRP, drop processing the first TB sent/transmitted via the second TRP, and process the second TB sent/transmitted via the second TRP, for example, if one or more second layers of the first TB sent/transmitted via the second TRP are different from one or more first layers of the first TB sent/transmitted via the first TRP. The wireless device may be allowed to drop processing a low-priority TB, for example, if the low-priority TB is sent/transmitted with different layers via multiple TRPs, and/or if the wireless device determines (e.g., is configured/instructed/required) to process a high-priority TB with an out-of-order HARQ feedback. As described herein, by determining and dropping the processing of the low-priority TB in multiple TRPs and/or multiple antenna panels may reduce power consumption of the wireless device.

The wireless device may determine whether to drop processing of a low-priority TB sent/transmitted via multiple TRPs, for example, based on whether the transmission of the low-priority TB via the multiple TRPs are repetitions or multilayer transmissions, and/or if the wireless device determines (e.g., is configured/instructed/required) to process a high-priority TB with an out-of-order HARQ feedback. As described herein, by using multiple TRPs and/or multiple antenna panels, a base station and/or a wireless device may improve data transmission latency and/or system throughput (e.g., if multiple TRPs and/or multiple antenna panels and out-of-order processing are supported).

Figure 36:
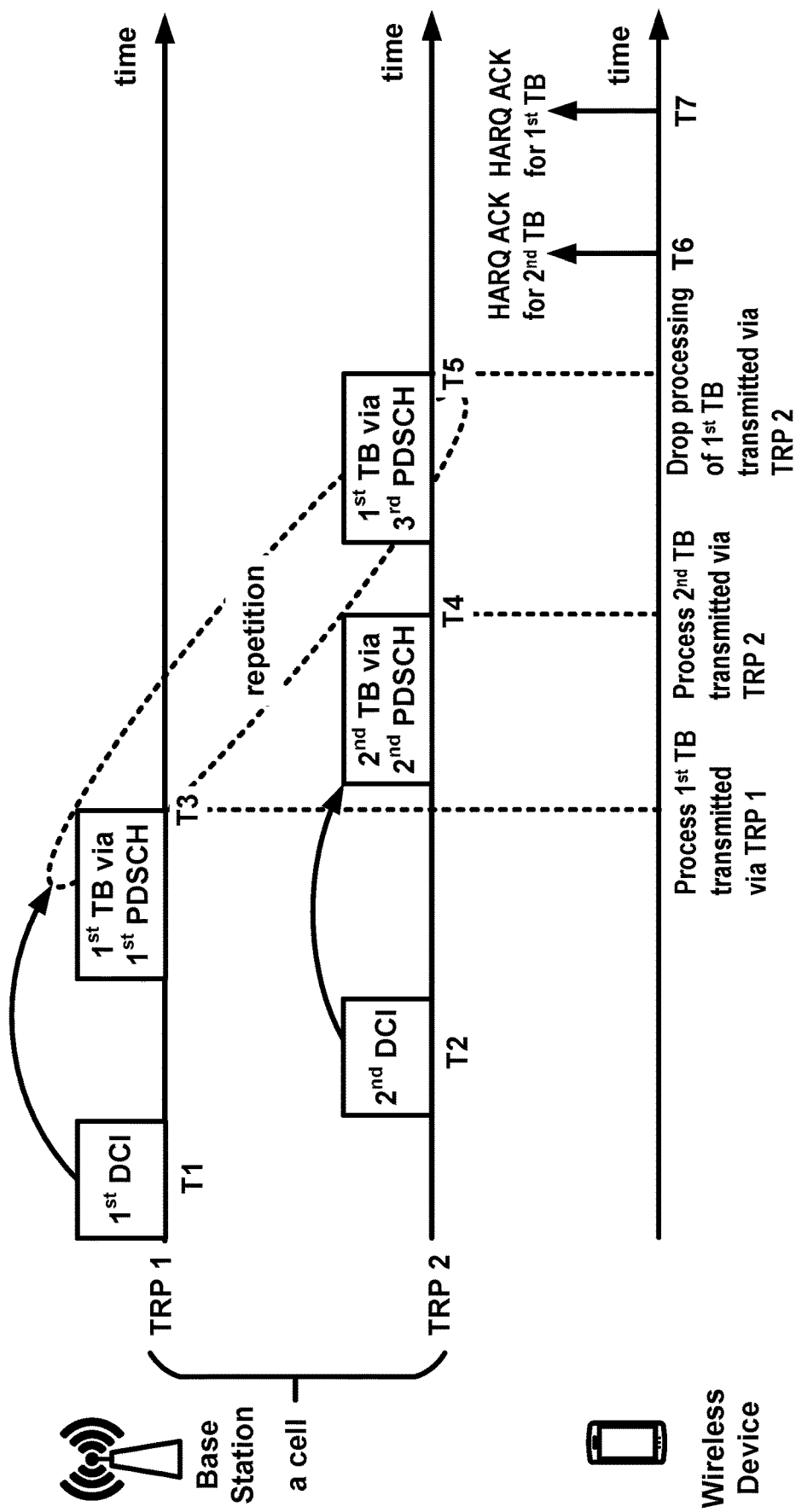
FIG. 36 shows an example of out-of-order processing for multiple TRPs and/or multiple antenna panels.

FIG. 36 shows an example of out-of-order processing for multiple TRPs and/or multiple antenna panels. Multiple TRPs and/or multiple antenna panels may be supported and out-of-order processing may be based on multiple TRPs and/or antenna panels. A base station may send/transmit, from a first TRP (e.g., TRP 1) to a wireless device, first DCI (e.g., at or during a first time interval T1) indicating transmissions (or repetitions) of a first TB via the first TRP and a second TRP (e.g., TRP 2). The first DCI may indicate semi-persistent transmissions of the first TB via multiple TRPs. The transmissions of the first TB via the first TRP and via the second TRP may comprise a transmission of the first TB associated with a first RV value via the first TRP (e.g., at or during a third time interval T3) and a repetition of the first TB associated with a second RV value via the second TRP (e.g., at or during a fifth time interval T5). The first RV value may be the same as or different from the second RV value. The first DCI may indicate the transmission of the first TB via a first PDSCH resource associated with the first TRP and the transmission of the second TB via a third PDSCH resource associated with the second TRP. The transmissions of the first TB via the first TRP and via the second TRP may comprise a first transmission of first layers of the first TB via the first TRP and a second transmission of second layers of the first TB via the second TRP. The first TB may be mapped to multiple layers comprising the first layers and the second layers, for example, if a multiple layer transmission for the first TB is supported. The first DCI may indicate that a first HARQ-ACK feedback is to be sent/transmitted (e.g., at or during a seventh time interval T7). The base station may send/transmit, from the second TRP to the wireless device, second DCI (e.g., at or during a second time interval T2) indicating a transmission of a second TB via a second PDSCH resource (e.g., at or during a fourth time interval T4). The second DCI may indicate that a second HARQ-ACK feedback is to be sent/transmitted (e.g., at or during a sixth time interval T6). The first TB may be associated with a first HARQ process (e.g., HARQ process x). The second TB may be associated with a second HARQ process (e.g., HARQ process y). The second HARQ-ACK feedback may be out-of-order, for example, based on the second HARQ-ACK information being feedbacked before the first HARQ-ACK information, while the second TB is sent/transmitted after a first transmission of the first TB via the first TRP and before a second transmission of the first TB via the second TRP.

The wireless device may determine to process the first TB sent/transmitted via the first TRP, process the second TB sent/transmitted via the second TRP, for example, based on the second HARQ-ACK being out-of-order. The wireless device may drop processing the first TB sent/transmitted via the second TRP (e.g., at or during the fifth time interval T5), for example, based on determining to process the second TB. The wireless device may determine to process the first TB sent/transmitted via the first TRP, process the second TB sent/transmitted via the second TRP, and drop processing the first TB sent/transmitted via the second TRP, for example, if the first TB sent/transmitted via the second TRP (e.g., at during the fifth time interval T5) is a repetition (with the same or different RV value) of the first TB sent/transmitted via the first TRP (e.g., at or during the third time interval T3). The wireless device may process at least a portion of a low-priority TB transmission, for example, if the low-priority TB are repeated on multiple TRPs, and/or if the wireless device determines (e.g., is configured/instructed/ required) to process a high-priority TB with an out-of-order HARQ feedback. As described herein, by using multiple TRPs and/or multiple antenna panels, a base station and/or a wireless device may improve data transmission latency and/or system throughput (e.g., if multiple TRPs and/or multiple antenna panels and out-of-order processing are supported).

FIG. 37 shows an example of out-of-order processing for multiple TRPs and/or multiple antenna panels. The wireless device may perform an example method 3700. At step 3702, a wireless device may receive one or more RRC messages comprising configuration parameters of resources (e.g., CORESETs grouped into CORESET groups, multiple TRPs, multiple antenna panels, etc.). At step 3704, the wireless device may receive first DCI (e.g., via a first resource group). The wireless device may receive, via a first CORESET of the CORESETs, first DCI indicating a first transmission of a first TB in a cell. At step 3706, the wireless device may determine whether the wireless device uses different resource groups (e.g., different CORESET groups, different TRPs, different antenna panels, etc.) For example, the wireless device may determine the first CORESET and the second CORESET are in (e.g., belonging to) different CORESET groups of the CORESET groups. At step 3708, the wireless device may receive second DCI (e.g., via a second resource group). The wireless device may receive, via a second CORESET of the CORESETs, second DCI indicating a second transmission of a second TB in the cell, for example, based on the first CORESET and the second CORESET being in (e.g., belonging to) different CORESET groups of the CORESET groups. At step 3710, the wireless device may process a plurality of channels and/or data sent/transmitted via different resource groups. The wireless device may process the second TB based on the second DCI and process the first TB based on the first DCI, for example, based on: at least a portion of the second DCI being received after receiving at least a portion of the first DCI, at least a portion of the second transmission occurring before at least a portion of the first transmission, and the first CORESET and the second CORESET being in (e.g., belonging to) different CORESET groups of the CORESET groups. The wireless device may process the second TB based on the second DCI and process the first TB based on the first DCI, for example, based on: at least a portion of the second DCI being received after receiving at least a portion of the first DCI, at least a portion of the second transmission occurring after at least a portion of the first transmission, a second HARQ-ACK feedback for the second TB being scheduled to be sent/transmitted before a first HARQ-ACK feedback for the first TB, and the first CORESET and the second CORESET being in (e.g., belonging to) different CORESET groups of the CORESET groups. The wireless device may send/transmit first HARQ-ACK information for the first TB based on the processing of the first TB, and send/transmit second HARQ-ACK information for the second TB based on processing of the second TB.

At step 3712, the wireless device may receive third DCI (e.g., via a same resource group associated with the first DCI). The wireless device may receive, via a third CORESET of the CORESETs, third DCI indicating a third transmission of a TB (e.g., a third TB) in the cell, for example, based on the first CORESET and the third CORESET being in (e.g., belonging to) the same CORESET group of the CORESET groups. At step 3714, the wireless device may process and drop channels and/or data sent/transmitted via the same resource group. The wireless device may process the second TB based on the second DCI and drop the processing of the first TB, for example, based on: at least a portion of the second DCI being received after receiving at least a portion of the first DCI, at least a portion of the second transmission occurring after at least a portion of the first transmission, a second HARQ-ACK feedback for the second TB being scheduled to be sent/transmitted before a first HARQ-ACK feedback for the first TB, and the first CORESET and the second CORESET being in (e.g., belonging to) the same CORESET group of the CORESET groups. The wireless device may send/transmit first HARQ-ACK information for the first TB based on the dropping. Processing a TB may comprise at least one of: performing a channel estimation based on a DM-RS of a PDSCH, demodulating and decoding the TB based on the channel estimation, and/or generating HARQ-ACK information for the TB. Dropping and/or not processing a TB may comprise at least one of: ignoring the TB; stopping processing the TB; avoiding processing the TB; not storing the TB; not configuring to receive the TB; not receiving the TB; not scheduling to receive the TB; skipping allocating the TB to a resource/process; skipping decoding the TB; skipping generating an ACK or NACK for the TB; refraining from performing a channel estimation based on a DM-RS of a PDSCH; refraining from demodulating and decoding the TB; and/or refraining from generating HARQ-ACK information for the TB, etc. As described herein, by using improved out-of-order processing and multiple resources (e.g., multiple CORESETS, multiple TRPs and/or multiple antenna panels), a base station and/or a wireless device may improve data transmission latency and/or system throughput (e.g., if multiple TRPs and/or multiple antenna panels and out-of-order processing are supported).

One or more transmissions of control information (e.g., DCI, UCI, a HARQ-ACK) and/or data (e.g., a TB) may be transmitted between wireless devices via a sidelink channel (e.g., a physical sidelink control channel, a physical sidelink shared channel, etc.). Multiple TRPs may be replaced with multiple base stations and/or multiple cells. Prioritizing TBs, and/or TB processing and/or a TB dropping decision may be, for example, based on device types, frequency, and/or other variables with respect to the DCI or a device sending the DCI described herein. Prioritizing HARQ-ACK information and/or HARQ-ACK information processing and/or a HARQ-ACK dropping decision may be, for example, based on device types, frequency, overlapping transmissions (e.g., TBs, HARQ-ACKs, etc.) and/or other variables with respect to the DCI or a device sending the DCI described herein.

A wireless device may perform a method comprising multiple operations. The wireless device may receive configuration parameters of a plurality of control resource sets (CORESETs) grouped into a plurality of control resource set (CORESET) groups. The plurality of CORESETs may comprise a first CORESET and a second CORESET. The wireless device may receive, via a channel associated with the first CORESET of the plurality of CORESETs, first downlink control information (DCI) indicating a first scheduled transmission of a first transport block (TB). The wireless device may receive, via a channel associated with the second CORESET of the plurality of CORESETs, second DCI indicating a second scheduled transmission of a second TB. The wireless device may receive the second DCI after receiving the first DCI and based on the first CORESET and the second CORESET being in different CORESET groups. The second scheduled transmission may start earlier than the first scheduled transmission. The wireless device may receive the second TB and the first TB. The wireless device may transmit a first acknowledgment for the first TB and a second acknowledgement for the second TB. The wireless device may process the second TB and the first TB, for example, based on the first CORESET and the second CORESET being in different CORESET groups. The wireless device may receive the second TB and the first TB, for example, based on the first CORESET and the second CORESET being in different CORESET groups. The receiving the second TB may start earlier than a start of the receiving the first TB. The receiving the second TB may start earlier than completion of the receiving the first TB. The receiving the second TB may be completed prior to a start of the receiving the first TB. Completion of the receiving the second DCI may be later than completion of the receiving the first DCI. A first CORESET group associated with a first CORESET group index may comprise the first CORESET, and a second CORESET group associated with a second CORESET group index may comprise the second CORESET. The transmitting the first acknowledgment for the first TB and the second acknowledgement for the second TB by the wireless device may comprise: based on the first CORESET and the second CORESET being in different CORESET groups, transmitting the second acknowledgement prior to transmitting the first acknowledgment. The transmitting the first acknowledgment for the first TB and the second acknowledgement for the second TB by the wireless device may comprise: based on the first CORESET and the second CORESET being in different CORESET groups, transmitting the second acknowledgement after transmitting the first acknowledgment. The wireless device may, based on the first CORESET and the second CORESET being in different CORESET groups, process a plurality of transport blocks (TBs) comprising the second TB and the first TB. The processing the plurality of TBs may comprise at least one of: receiving the plurality of TBs; allocating the plurality of TBs to different hybrid automatic repeat request (HARQ) processes; or decoding the plurality of TBs. The wireless device may, based on the first CORESET and a third CORESET being in a same CORESET group, receive the first TB; and drop a third TB indicated by third DCI associated with the third CORESET. The dropping the third TB may comprise at least one of: skipping allocating the third TB to a second hybrid automatic repeat request (HARQ) process; skipping decoding the third TB; or skipping generating a third acknowledgement for the third TB. The first acknowledgement may be associated with a first hybrid automatic repeat request (HARQ) process of the first TB, and the second acknowledgement may be associated with a second HARQ process of the second TB different from the first HARQ process. The configuration parameters of the plurality of the CORESETs may comprise at least one of: a first CORESET group index indicating a first CORESET group comprising the first CORESET; or a second CORESET group index indicating a second CORESET group comprising the second CORESET. The configuration parameters of the plurality of the CORESETs may comprise at least one of: a frequency resource indication; or a time domain duration indication. The configuration parameters of the plurality of the CORESETs may comprise an indication of control channel element (CCE) to resource element group (REG) mapping type. The wireless device may allocate the first TB to a first hybrid automatic repeat request (HARQ) process; decode the first TB; and/or generate the first acknowledgement for the first TB. The first acknowledgement may be a positive acknowledgement generated based on the decoding the first TB being successful. The first acknowledgement may be a negative acknowledgement generated based on the decoding the first TB being unsuccessful. The wireless device may allocate the second TB to a second HARQ process; decode the second TB; and/or generate the second acknowledgement for the second TB. The second acknowledgement may be a positive acknowledgement generated based on the decoding the second TB being successful. The second acknowledgement may be a negative acknowledgement generated based on the decoding the second TB being unsuccessful. The wireless device may monitor a downlink control channel via the first CORESET for receiving the first DCI. The wireless device may monitor a downlink control channel via the second CORESET for receiving the second DCI. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send/transmit the configuration parameters. A computer-readable medium may store instructions that, when executed, cause performance of the described method, additional operations and/or include the additional elements.

A wireless device may perform a method comprising multiple operations. The wireless device may receive configuration parameters of a plurality of control resource sets (CORESETs) grouped into a plurality of control resource set (CORESET) groups, wherein the plurality of CORESETs comprise a first CORESET and a second CORESET. The wireless device may receive, via a channel associated with the first CORESET, first downlink control information (DCI) indicating a first scheduled transmission of a first transport block (TB). The wireless device may receive, via a channel associated with the second CORESET, second DCI indicating a second scheduled transmission of a second TB. The wireless device may receive the second DCI after receiving the first DCI. The second scheduled transmission may start earlier than the first scheduled transmission. The wireless device may, based on the first CORESET and the second CORESET being in different CORESET groups, process the second TB and the first TB. The wireless device may transmit a first uplink signal associated with the first TB and a second uplink signal associated with the second TB. The receiving the second DCI by the wireless device may be based on the first CORESET and the second CORESET being in different CORESET groups. The processing the second TB may comprise at least one of: receiving the second TB; allocating the second TB to a second hybrid automatic repeat request (HARQ) process different from a first HARQ process for the first TB; decoding the second TB; or generating the second uplink signal to transmit the second TB. The processing the first TB may comprise at least one of: receiving the first TB; allocating the first TB to a first hybrid automatic repeat request (HARQ) process different from a second HARQ process for the second TB; decoding the first TB; or generating the first uplink signal to transmit the first TB. The first uplink signal may comprise at least one of: a first acknowledgment for the first TB; or a first uplink shared channel signal comprising the first TB. The wireless device may, based on the first CORESET and the second CORESET being in different CORESET groups, receive the second TB based on the second DCI and receive the first TB based on the first DCI. The wireless device may, based on the first CORESET and a third CORESET being in a same CORESET group, receive the first TB and drop a third TB indicated by third DCI associated with the third CORESET. The dropping the third TB may comprise at least one of: skipping allocating the third TB to a second hybrid automatic repeat request (HARQ) process; skipping decoding the third TB; or skipping generating a third acknowledgement for the third TB. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send/transmit the configuration parameters. A computer-readable medium may store instructions that, when executed, cause performance of the described method, additional operations and/or include the additional elements.

A wireless device may perform a method comprising multiple operations. The wireless device may receive configuration parameters of a plurality of control resource sets (CORESETs) grouped into a plurality of control resource set (CORESET) groups, wherein the plurality of CORESETs comprise a first CORESET and a second CORESET. The wireless device may receive, via a channel associated with the first CORESET, first downlink control information (DCI) indicating a first scheduled transmission of a first transport block (TB). The wireless device may receive, via a channel associated with the second CORESET, second DCI indicating a second scheduled transmission of a second TB. The second scheduled transmission may start earlier than the first scheduled transmission. The wireless device may, based on the first CORESET and the second CORESET being in different CORESET groups, process the second TB and process the first TB after processing the second TB. The processing the first TB may comprise generating a first uplink signal to transmit the first TB, and the processing the second TB may comprise generating a second uplink signal to transmit the second TB. The wireless device may, based on the first CORESET and the second CORESET being in different CORESET groups, transmit the second TB based on the second DCI, and transmit the first TB based on the first DCI. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send/transmit the configuration parameters. A computer-readable medium may store instructions that, when executed, cause performance of the described method, additional operations and/or include the additional elements.

A wireless device may perform a method comprising multiple operations. The wireless device may receive first downlink control information (DCI) indicating information associated with a first signal, wherein the first DCI comprises a priority indicator field indicating a first priority value. The wireless device may receive second DCI indicating information associated with a second signal. The wireless device may, based on the second DCI not comprising a priority indicator field, determine a second priority value. The wireless device may, based on the first priority value and the determined second priority value, transmit the first signal and drop transmitting the second signal. The first DCI may further indicate a first downlink signal associated with a first transport block, and the second DCI may further indicate a second downlink signal associated with a second transport block. The first signal may be an uplink control channel signal associated with a first downlink shared channel signal indicated by the first DCI, and the second signal may be an uplink control channel signal associated with a second downlink shared channel signal indicated by the second DCI. The wireless device may receive, based on the first DCI, a first transport block and/or determine a first acknowledgement for the first transport block. The transmitting the first signal may comprise transmitting, based on the information associated with the first signal, the first acknowledgment for the first transport block. The information associated with the first signal may comprise at least one of: an uplink resource associated with the first signal; or a timing value associated with the first signal. The information associated with the second signal may comprise at least one of: an uplink resource associated with the second signal; or a timing value associated with the second signal. The dropping transmitting the second signal may be based on a timing value associated with the second signal. A scheduled transmission of the first signal may overlap in time with a scheduled transmission of the second signal. The dropping transmitting the second signal may comprise at least one of: refraining from demodulating of a downlink signal indicated by the second DCI; refraining from decoding of the downlink signal indicated by the second DCI; refraining from generating acknowledgment information associated with the second signal; or clearing buffered data for a hybrid automatic repeat request (HARQ) process associated with the second signal. The dropping transmitting the second signal may be based on the first priority value being greater than the determined second priority value. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send/transmit the first DCI. A computer-readable medium may store instructions that, when executed, cause performance of the described method, additional operations and/or include the additional elements.

A wireless device may perform a method comprising multiple operations. The wireless device may receive first downlink control information (DCI) indicating a first transmission associated with a first signal, wherein the first DCI comprises a priority indicator field indicating a first priority value. The wireless device may receive second DCI indicating a second transmission associated with a second signal. The wireless device may, based on the second DCI not comprising a priority indicator field, determine a second priority value. The wireless device may, based on the first priority value being greater than the determined second priority value, transmit the first signal without transmitting the second signal. The wireless device may drop transmitting the second signal based on at least one of: the first priority value being greater than the determined second priority value; or a timing value associated with the second signal. The first priority value may be associated with the first signal, and the determined second priority value may be associated with the second signal. The first transmission may be a first downlink signal transmission associated with a first transport block, and the second transmission may be a second downlink signal transmission associated with a second transport block. The wireless device may receive, based on the first DCI, a first transport block and determine a first acknowledgement for the first transport block. The transmitting the first signal may comprise transmitting, based on information associated with the first signal, the first acknowledgment for the first transport block. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send/transmit the first DCI. A computer-readable medium may store instructions that, when executed, cause performance of the described method, additional operations and/or include the additional elements.

A wireless device may perform a method comprising multiple operations. The wireless device may receive first downlink control information (DCI) indicating information associated with a first signal, wherein the first DCI comprises a priority indicator field indicating a first priority value. The wireless device may receive second DCI indicating information associated with a second signal. The wireless device may process the first signal and dropping processing the second signal. The processing the first signal and the dropping processing the second signal may be based on: the priority indicator field indicating a first priority value; and the second DCI not comprising a priority indicator field. The wireless device may, based on the second DCI not comprising a priority indicator field, determine a second priority value. The dropping processing the second signal may be based on the first priority value being greater than the determined second priority value. The wireless device may, based on the second DCI not comprising a priority indicator field, set a second priority value associated with the second signal as a first value. The first DCI may further indicate a first downlink signal associated with a first transport block, and the second DCI may further indicate a second downlink signal associated with a second transport block. The dropping processing the second signal may comprise at least one of: refraining from receiving a transport block indicated by the second DCI; refraining from demodulating of the transport block indicated by the second DCI; refraining from decoding of the transport block indicated by the second DCI; refraining from generating acknowledgment information for the transport block indicated by the second DCI; clearing buffered data for a hybrid automatic repeat request (HARQ) process associated with the second signal; or refraining from transmitting an acknowledgement for the transport block indicated by the second DCI. The processing the first signal may comprise at least one of: receiving a transport block indicated by the first DCI; demodulating the transport block indicated by the first DCI; decoding the transport block indicated by the first DCI; generating acknowledgment information for the transport block indicated by the first DCI; buffering data for a hybrid automatic repeat request (HARQ) process associated with the first signal; or transmitting an acknowledgement for the transport block indicated by the first DCI. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send/transmit the first DCI. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device, first downlink control information (DCI) indicating information associated with a first signal, wherein the first DCI comprises a priority indicator field indicating a first priority value;
receiving second DCI indicating information associated with a second signal;
based on the second DCI not comprising a priority indicator field, determining a second priority value; and
based on the first priority value and the determined second priority value:
transmitting the first signal; and
dropping transmitting the second signal.

2. The method of claim 1, wherein the first DCI further indicates a first downlink signal associated with a first transport block, and the second DCI further indicates a second downlink signal associated with a second transport block.

3. The method of claim 1, wherein the first signal is an uplink control channel signal associated with a first downlink shared channel signal indicated by the first DCI, and wherein the second signal is an uplink control channel signal associated with a second downlink shared channel signal indicated by the second DCI.

4. The method of claim 1, further comprising:
receiving, based on the first DCI, a first transport block; and
determining a first acknowledgement for the first transport block,
wherein the transmitting the first signal comprises transmitting, based on the information associated with the first signal, the first acknowledgment for the first transport block.

5. The method of claim 1, wherein the information associated with the first signal comprises at least one of:
an uplink resource associated with the first signal; or
a timing value associated with the first signal.

6. The method of claim 1, wherein the information associated with the second signal comprises at least one of:
an uplink resource associated with the second signal; or
a timing value associated with the second signal.

7. The method of claim 1, wherein the dropping transmitting the second signal is based on a timing value associated with the second signal.

8. The method of claim 1, wherein a scheduled transmission of the first signal overlaps in time with a scheduled transmission of the second signal.

9. The method of claim 1, wherein the dropping transmitting the second signal comprises at least one of:
refraining from demodulating of a downlink signal indicated by the second DCI;
refraining from decoding of the downlink signal indicated by the second DCI;
refraining from generating acknowledgment information associated with the second signal; or
clearing buffered data for a hybrid automatic repeat request (HARQ) process associated with the second signal.

10. The method of claim 1, wherein the dropping transmitting the second signal is based on the first priority value being greater than the determined second priority value.

11. A method comprising:
receiving, by a wireless device, first downlink control information (DCI) indicating a first transmission associated with a first signal, wherein the first DCI comprises a priority indicator field indicating a first priority value;
receiving second DCI indicating a second transmission associated with a second signal;
based on the second DCI not comprising a priority indicator field, determining a second priority value; and based on the first priority value being greater than the determined second priority value, transmitting the first signal without transmitting the second signal.

12. The method of claim 11, further comprising dropping transmitting the second signal based on at least one of:
    the first priority value being greater than the determined second priority value; or
    a timing value associated with the second signal.

13. The method of claim 11, wherein the first priority value is associated with the first signal, and wherein the determined second priority value is associated with the second signal.

14. The method of claim 11, wherein the first transmission is a first downlink signal transmission associated with a first transport block, and the second transmission is a second downlink signal transmission associated with a second transport block.

15. The method of claim 11, further comprising:
    receiving, based on the first DCI, a first transport block; and
    determining a first acknowledgement for the first transport block,
    wherein the transmitting the first signal comprises transmitting, based on information associated with the first signal, the first acknowledgment for the first transport block.

16. A method comprising:
    receiving, by a wireless device, first downlink control information (DCI) indicating information associated with a first signal, wherein the first DCI comprises a priority indicator field indicating a first priority value;
    receiving second DCI indicating information associated with a second signal; and
    processing the first signal and dropping processing the second signal, wherein the processing the first signal and the dropping processing the second signal are based on:
    the priority indicator field indicating a first priority value; and
    the second DCI not comprising a priority indicator field.

17. The method of claim 16, further comprising:
    based on the second DCI not comprising a priority indicator field, determining a second priority value,
    wherein the dropping processing the second signal is based on the first priority value being greater than the determined second priority value.

18. The method of claim 16, further comprising:
    based on the second DCI not comprising a priority indicator field, setting a second priority value associated with the second signal as a first value.

19. The method of claim 16, wherein the first DCI further indicates a first downlink signal associated with a first transport block, and the second DCI further indicates a second downlink signal associated with a second transport block.

20. The method of claim 16, wherein the dropping processing the second signal comprises at least one of:
    refraining from receiving a transport block indicated by the second DCI;
    refraining from demodulating of the transport block indicated by the second DCI;
    refraining from decoding of the transport block indicated by the second DCI;
    refraining from generating acknowledgment information for the transport block indicated by the second DCI;
    clearing buffered data for a hybrid automatic repeat request (HARQ) process associated with the second signal; or
    refraining from transmitting an acknowledgement for the transport block indicated by the second DCI.

21. The method of claim 16, wherein the processing the first signal comprises at least one of:
    receiving a transport block indicated by the first DCI;
    demodulating the transport block indicated by the first DCI;
    decoding the transport block indicated by the first DCI;
    generating acknowledgment information for the transport block indicated by the first DCI;
    buffering data for a hybrid automatic repeat request (HARQ) process associated with the first signal; or
    transmitting an acknowledgement for the transport block indicated by the first DCI.

* * * * *

UNITED STATES PATENT AND TRADEMARK OFFICE
CERTIFICATE OF CORRECTION

PATENT NO. : 11,477,792 B2
APPLICATION NO. : 16/936046
DATED : October 18, 2022
INVENTOR(S) : Zhou et al.

It is certified that error appears in the above-identified patent and that said Letters Patent is hereby corrected as shown below:

In the Specification

Column 4, Detailed Description, Line 25:
Delete "(JAB)" and insert --(IAB)-- therefor Column 9, Detailed Description, Line 49:
Delete "SDAPS" and insert --SDAPs-- therefor Column 12, Detailed Description, Line 32:
Delete "223" and insert --212-- therefor Column 39, Detailed Description, Line 65:
Delete "10" and insert --1_0-- therefor Column 40, Detailed Description, Line 4:
Delete "21" and insert --2_1-- therefor Column 40, Detailed Description, Line 8:
Delete "22" and insert --2_2-- therefor Column 64, Detailed Description, Line 55:
Delete "(JOT)," and insert --(IOT),-- therefor Column 67, Detailed Description, Line 27:
Delete "T)." and insert --T1).-- therefor Column 70, Detailed Description, Line 16:
Delete "1E;" and insert --IE;-- therefor Signed and Sealed this
Second Day of July, 2024

Katherine Kelly Vidal
*Director of the United States Patent and Trademark Office*

CERTIFICATE OF CORRECTION (continued)
U.S. Pat. No. 11,477,792 B2

Column 70, Detailed Description, Line 16:
Delete "1E;" and insert --IE;-- therefor Column 70, Detailed Description, Line 23:
Delete "($\Delta$f max*Nf)," and insert --($\Delta$fmax*Nf),-- therefor Column 70, Detailed Description, Line 23:
Delete "($\Delta$f max" and insert --($\Delta$fmax-- therefor Column 70, Detailed Description, Line 27:
Delete "d1, 1)" and insert --d1,1)-- therefor Column 77, Detailed Description, Line 45:
Delete "1E;" and insert --IE;-- therefor Column 77, Detailed Description, Line 45:
Delete "1E;" and insert --IE;-- therefor Column 77, Detailed Description, Lines 55-56:
Delete "2=max((N2+d2, 1)" and insert --2=max((N2+d2,1)-- therefor Column 77, Detailed Description, Line 56:
Delete "d2, 2)," and insert --d2,2),-- therefor Column 77, Detailed Description, Lines 56-57:
Delete "Tc=1/($\Delta$f max*Nf)," and insert --Tc=1/($\Delta$fmax*Nf),-- therefor Column 77, Detailed Description, Line 57:
Delete "$\Delta$f max" and insert --$\Delta$fmax-- therefor Column 77, Detailed Description, Line 57:
Delete "d2, 1=0," and insert --d2,1=0,-- therefor Column 77, Detailed Description, Line 59:
Delete "d2, 1=1." and insert --d2,1=1.-- therefor Column 84, Detailed Description, Line 27:
Delete "T3." and insert --T3'.-- therefor